(12) United States Patent
Horii et al.

(10) Patent No.: US 7,600,045 B2
(45) Date of Patent: Oct. 6, 2009

(54) INFORMATION PROCESSOR

(75) Inventors: Yuki Horii, Kyoto (JP); Yoshio Kawakami, Kadoma (JP); Yasushi Waki, Soraku-gun (JP)

(73) Assignee: Panasonic Corporation, Osaka (JP)

( * ) Notice: Subject to any disclaimer, the term of this patent is extended or adjusted under 35 U.S.C. 154(b) by 267 days.

(21) Appl. No.: 10/530,927

(22) PCT Filed: Oct. 9, 2003

(86) PCT No.: PCT/JP03/12932

§ 371 (c)(1),
(2), (4) Date: Apr. 8, 2005

(87) PCT Pub. No.: WO2004/034698

PCT Pub. Date: Apr. 22, 2004

(65) Prior Publication Data

US 2006/0080474 A1 Apr. 13, 2006

(30) Foreign Application Priority Data

Oct. 9, 2002 (JP) .............................. 2002-296234

(51) Int. Cl.
*G06F 15/16* (2006.01)
*G06F 3/00* (2006.01)
(52) U.S. Cl. .......................................... 709/246; 710/8
(58) Field of Classification Search ................. 709/246
See application file for complete search history.

(56) References Cited

U.S. PATENT DOCUMENTS

| | | | | |
|---|---|---|---|---|
| 5,121,113 A | * | 6/1992 | Kedge et al. | ................. 345/168 |
| 5,537,626 A | * | 7/1996 | Kraslavsky et al. | ............. 710/8 |
| 5,887,193 A | | 3/1999 | Takahashi et al. | |
| 6,140,992 A | | 10/2000 | Matsuzaki et al. | |
| 6,151,074 A | * | 11/2000 | Werner | ..................... 348/425.1 |
| 6,744,472 B1 | * | 6/2004 | MacInnis et al. | ............ 348/441 |
| 7,227,582 B2 | * | 6/2007 | MacInnis et al. | ............ 348/512 |

FOREIGN PATENT DOCUMENTS

| | | |
|---|---|---|
| EP | 1020858 A1 | 7/2000 |
| JP | 7-44477 | 2/1995 |
| JP | 11-317991 | 11/1999 |
| JP | 2001-356649 | 12/2001 |
| JP | 2002-238003 | 8/2002 |
| WO | 01/77897 | 10/2001 |

OTHER PUBLICATIONS

Supplemental European Search Report (in English language), issued Sep. 12, 2008 in European Application No. 03751392.6.

* cited by examiner

*Primary Examiner*—William C Vaughn, Jr.
*Assistant Examiner*—Ninos Donabed
(74) *Attorney, Agent, or Firm*—Wenderoth, Lind & Ponack, L.L.P.

(57) ABSTRACT

An information processor capable of easily dealing with addition or alteration of a format engine is provided. The information processor includes format engine management means and operation control means. The format engine managing means pre-defines common states which define operating states of each format engine in a representation common to all the format engines, and manages an operation of each format engine. The operation control means is provided in correspondence with each format engine, and pre-defines a correspondence between the common states and individual states which define the operating states of each format engine in a representation different for each format engine, and controls operations of the format engines such that each format engine is in an arbitrary individual state.

7 Claims, 52 Drawing Sheets

| COMMON STATE | INDIVIDUAL STATE OF THE FIRST FORMAT ENGINE |
|---|---|
| DURING EXECUTION | IN OPERATION |
| TERMINATED | AT A STOP |
| | AT A PAUSE |

(b)

| COMMON STATE | INDIVIDUAL STATE OF THE SECOND FORMAT ENGINE |
|---|---|
| DURING EXECUTION | ACTIVE |
| TERMINATED | NON-ACTIVE |

FIG. 18

| SUB PROGRAM | SID |
|---|---|
| ALL | 0 |
| NAVIGATOR | 1 |
| Java MIDDLEWARE | 2 |
| HTML BROWSER | 3 |
| MAILER | 4 |
| COMBINING SECTION | 5 |

FIG. 19

| MESSAGE | MID | FORMAT ID |
|---|---|---|
| FORMAT ENGINE STATE REQUEST | 1 | NOT AVAILABLE |
| FORMAT ENGINE STATE RESPONSE | 2 | F 0 1 |
| FORMAT ENGINE STATE CHANGED | 3 | NOT AVAILABLE |
| EXECUTE FORMAT ENGINE | 4 | NOT AVAILABLE |
| TERMINATE FORMAT ENGINE | 5 | NOT AVAILABLE |
| PAUSE FORMAT ENGINE | 6 | NOT AVAILABLE |
| APPLICATION/DATA LIST REQUEST | 1 1 | NOT AVAILABLE |
| APPLICATION/DATA LIST RESPONSE | 1 2 | F 0 2 |
| APPLICATION/DATA LIST CHANGED | 1 3 | NOT AVAILABLE |
| EXECUTE APPLICATION/DATA | 1 4 | F 0 3 |
| TERMINATE APPLICATION/DATA | 1 5 | F 0 3 |
| PAUSE APPLICATION/DATA | 1 6 | F 0 3 |
| PRIVATE | 2 1 | — |

FIG. 20
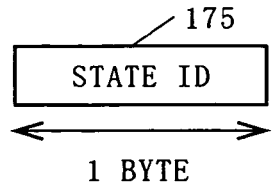
FIG. 21
| STATE NAME | MEANING | OPERATING STATE ID |
|---|---|---|
| DURING EXECUTION | USING A MINIMUM RESOURCE | 1 |
| AT A PAUSE | USING SHARABLE RESOURCE | 2 |
| AT A STOP | NOT USING A RESOURCE | 3 |
FIG. 22
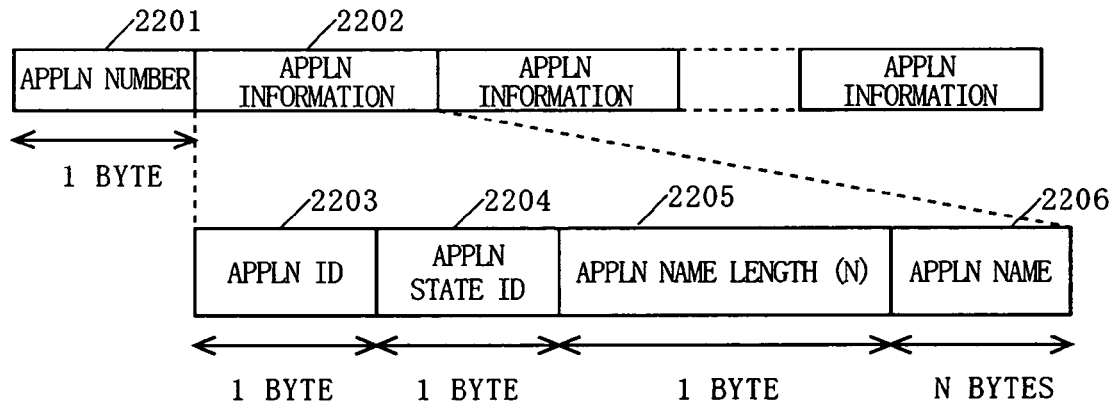
FIG. 23
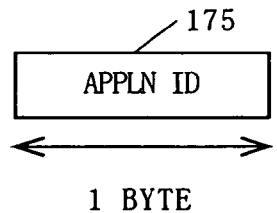

F I G. 3 2

| F I D | FORMAT ENGINE NAME | STATE ID | APPLN INFORMATION |
|---|---|---|---|
| 2 | Java MIDDLEWARE | 3 | 0x5678 |
| 3 | HTML BROWSER | 3 | 0x7162 |
| 4 | MAILER | 3 | NULL |

F I G. 3 3

| A I D | APPLN NAME | STATE ID |
|---|---|---|
| 1 | E P G | 3 |
| 2 | CARD GAME | 3 |

F I G. 3 4

| DATA ID | APPLN NAME | STATE ID |
|---|---|---|
| 1 | WEATHER FORECAST | 1 |
| 2 | HOLIDAY OUTING INFORMATION | 1 |

FIG. 35
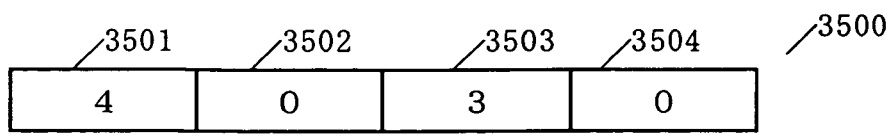
FIG. 36
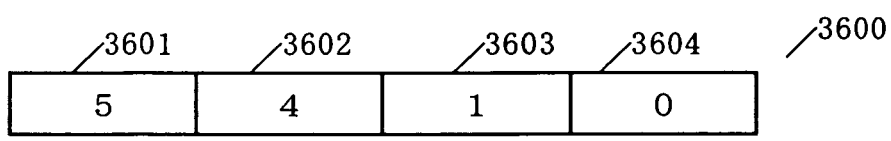
FIG. 37
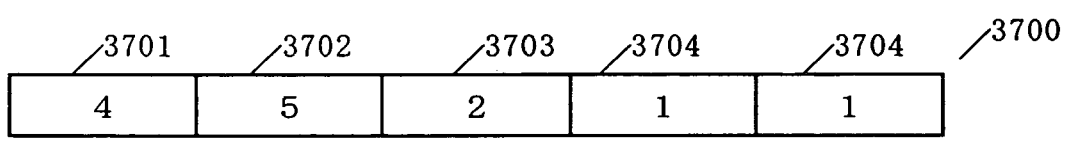
FIG. 38
| FID | FORMAT ENGINE NAME | STATE ID | APPLN INFORMATION |
|---|---|---|---|
| 2 | Java MIDDLEWARE | 3 | 0x5678 |
| 3 | HTML BROWSER | 3 | 0x7162 |
| 4 | MAILER | 1 | NULL |

FIG. 40

| FID | PROCESS ID |
|---|---|
| 2 | 100 |
| 3 | 110 |
| 4 | 120 |

FIG. 41

| FID | PRIORITY LEVEL |
|---|---|
| 2 | 2 |
| 3 | 1 |
| 4 | 3 |

FIG. 42

| 4 |
|---|

FIG. 43

| RID | RESOURCE |
|---|---|
| 1 | TUNER |
| 2 | TS DECODER |
| 3 | AUDIO DECODER |
| 4 | VIDEO DECODER |
| 5 | NETWORK INTERFACE |

FIG. 44

```
#define RESOURCE_ID_TUNER         1
#define RESOURCE_ID_TSDECODER     2
#define RESOURCE_ID_AUDIODECODER  3
#define RESOURCE_ID_VIDEODECODER  4
#define RESOURCE_ID_NETWORK       5
```

FIG. 45
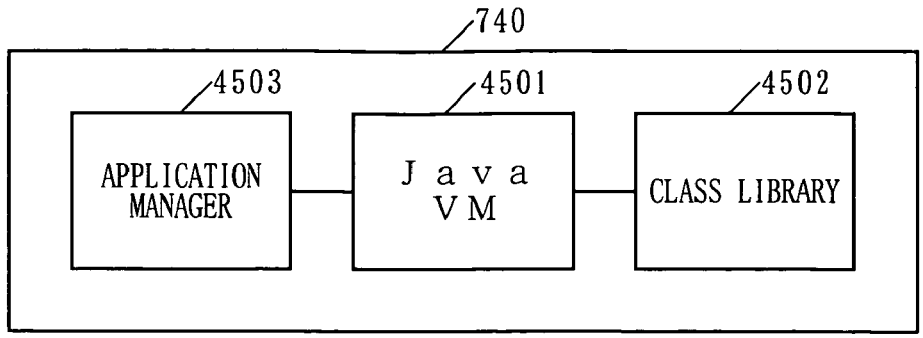
FIG. 46
| AID | CONTROL INFORMATION | APPLN NAME | APPLN PRIORITY LEVEL |
|---|---|---|---|
| 1 | autostart | EPG | 64 |
| 2 | present | CARD GAME | 32 |
FIG. 47
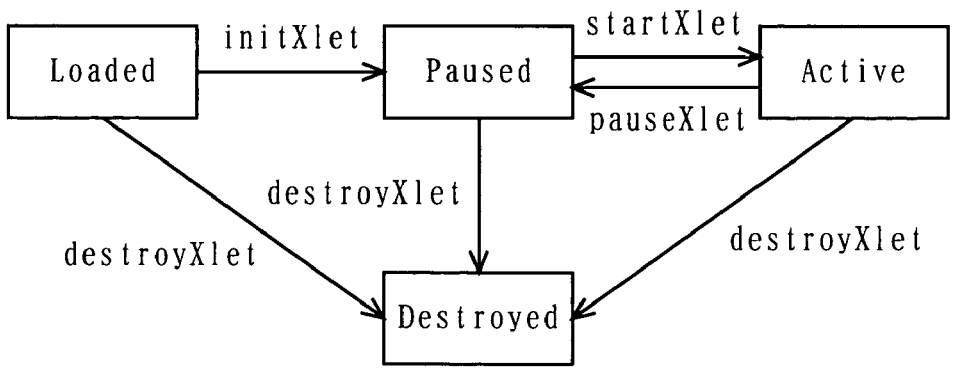
FIG. 48
| AID | CONTROL INFORMATION | APPLN NAME | APPLN PRIORITY LEVEL |
|---|---|---|---|
| 1 | kill | EPG | 64 |
| 2 | present | CARD GAME | 32 |

FIG. 49

| STATE OF THE APPLICATION | STATE OF THE Java MIDDLEWARE |
|---|---|
| AT LEAST ONE APPLICATION IS IN THE "Active" STATE | DURING EXECUTION |
| NO APPLICATION IS IN THE "Active" STATE AND AT LEAST ONE APPLICATION IS IN THE "Paused" STATE | AT A PAUSE |
| OTHER THAN THE ABOVE | AT A STOP |

FIG. 50

| STATE OF THE APPLICATION | STATE DEFINED BY THE COMBINING SECTION |
|---|---|
| Active | DURING EXECUTION |
| Paused | AT A PAUSE |
| OTHER THAN THE ABOVE | AT A STOP |

FIG. 51

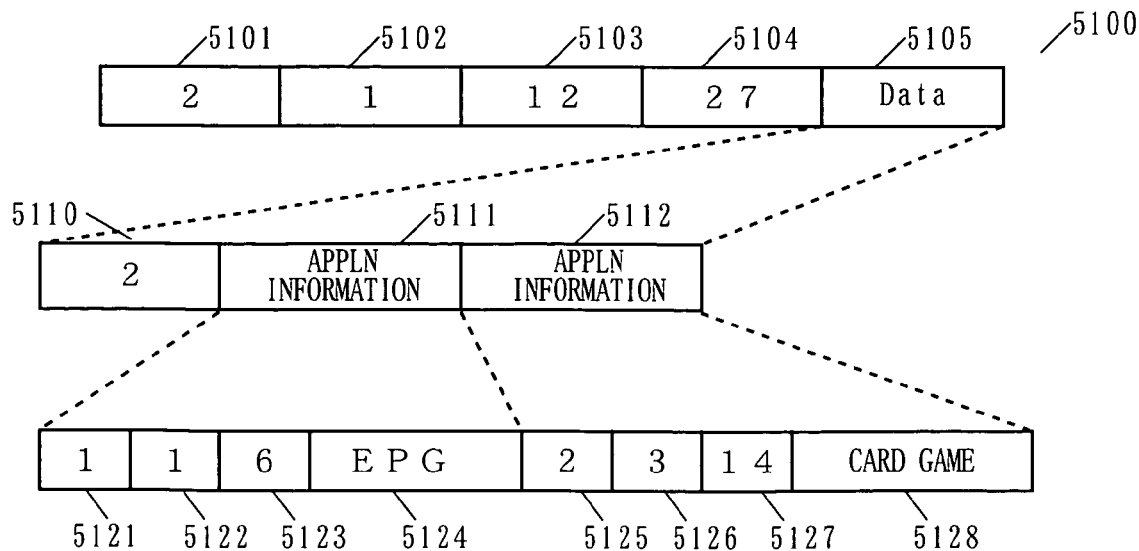

F I G. 5 3

```
<?xml version="1.0"?>
<!DOCTYPE html PUBLIC "-//DVB//DTD XHTML DVB-
HTML 1.0//EN"
"http://www.dvb.org/mhp/dtd/dvbhtml-1-0.dtd">
<html xmlns="http://www.w3c.org/1999/xhtml">
<head>
<link rel="stylesheet" href="sampleCSS.css" type="text/css">
</head>
<body id="body">                                          ⟋— 5311
<H1> INTRODUCE WEATHER FORECAST SERVICES OF VARIOUS COUNTRIES </H1>
<a class="param1" href="dvb://1.2.1/Japan_Weather.html">
Japan</a>                                                  ⟋— 5312
<br></br>
<a class="param2" href="dvb://1.2.2/USA_Weather.html">
USA</a>                                                    ⟋— 5313
<br></br>
<a class="param3"                              ⟋— 5314
href="dvb://1.2.3/Germany_Weather.html">
Germany</a>
</body>
</html>
```

F I G. 5 4

```
H1{position:absolute;top:50px;left:50px;}
a.param1{position:absolute;top:200px;left:100px;}
a.param2{position:absolute;top:300px;left:100px;}
a.param3{position:absolute;top:400px;left:100px;}
```

FIG. 57

```
WEATHER FORECAST
    TOKYO         CLOUDY
    OSAKA         FINE
    FUKUOKA       RAIN
```

FIG. 58

```xml
<?xml version="1.0"?>
<!DOCTYPE html PUBLIC "-//DVB//DTD XHTML DVB-HTML
1.0//EN"
"http://www.dvb.org/mhp/dtd/dvbhtml-1-0.dtd">
<html xmlns="http://www.w3c.org/1999/xhtml">
<head>
<script type="text/javascript">                    5801
<!--
   function ChangeDOMTree(){
   ...
   }
//-->
</script>
</head>
<body>
<table>
 <tr>
    <td> SEA </td>
 </tr>
 <tr>
    <td> MOUNTAIN </td>
 </tr>
</table>                                           5802
<form>
 <input type="button" value="DETAILED INFORMATION"
 onclick= ChangeDOMTree() >
 </input>
</form>
</body>
<html>
```

| DATA ID | CONTROL INFORMATION | DATA NAME | APPLN PRIORITY LEVEL |
|---|---|---|---|
| 1 | autostart | WEATHER FORECAST | 5 4 |
| 2 | present | HOLIDAY OUTING INFORMATION | 2 2 |

| DATA ID | CONTROL INFORMATION | DATA NAME | APPLN PRIORITY LEVEL |
|---|---|---|---|
| 1 | kill | WEATHER FORECAST | 5 4 |
| 2 | present | HOLIDAY OUTING INFORMATION | 2 2 |

FIG. 69

| STATE OF THE HTML DATA | STATE OF THE HTML BROWSER |
|---|---|
| AT LEAST ONE HTML DATA IS IN THE "Active" STATE | DURING EXECUTION |
| NO HTML DATA IS IN THE "Active" STATE AND AT LEAST ONE HTML DATA IS IN THE "Paused" STATE | AT A PAUSE |
| OTHER THAN THE ABOVE | AT A STOP |

FIG. 70

| STATE OF THE HTML DATA | STATE DEFINED BY THE COMBINING SECTION |
|---|---|
| Active | DURING EXECUTION |
| Paused | AT A PAUSE |
| OTHER THAN THE ABOVE | AT A STOP |

FIG. 71

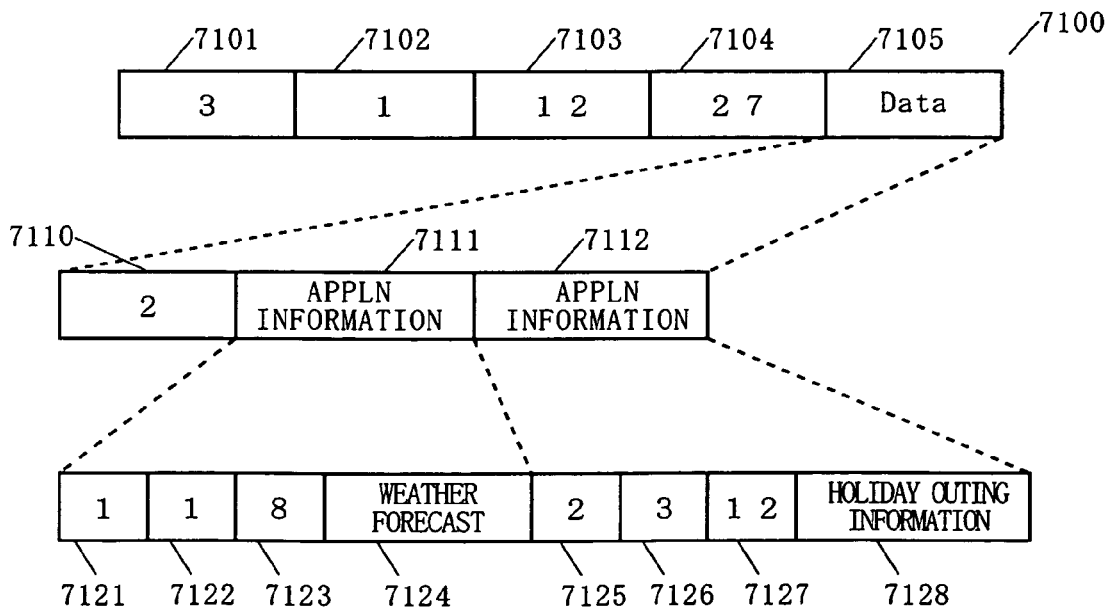

| STATE OF THE MAILER | STATE DEFINED BY THE COMBINING SECTION |
|---|---|
| ACTIVE | DURING EXECUTION |
| AT A STOP | AT A STOP |

F I G. 8 6
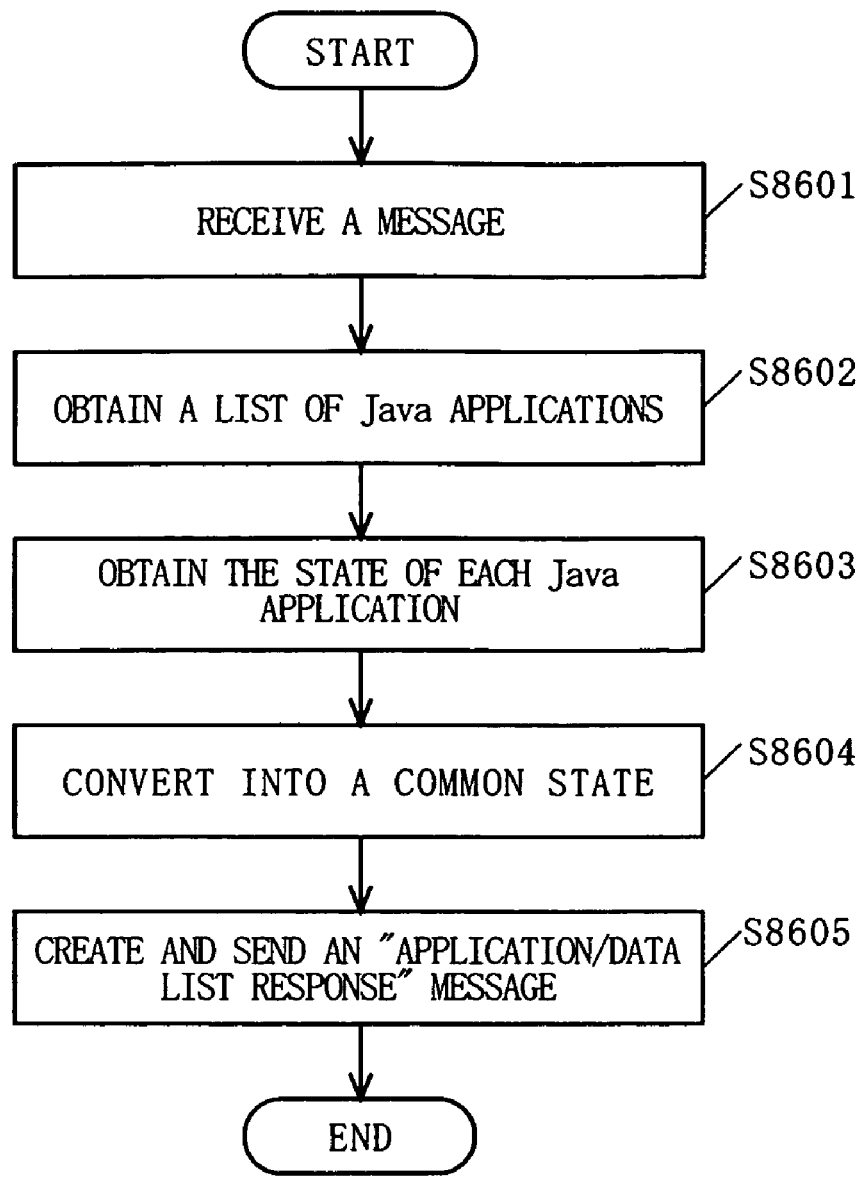

FIG. 93

| Java MIDDLEWARE | HTML BROWSER | MAILER |
|---|---|---|
| AT A STOP | AT A STOP | AT A STOP |
| AT A PAUSE | AT A STOP | AT A STOP |
| AT A STOP | AT A PAUSE | AT A STOP |
| AT A PAUSE | AT A PAUSE | AT A STOP |

INFORMATION PROCESSOR

TECHNICAL FIELD

The present invention relates to an information processor, and more specifically to an information processor for managing an operation of a format engine executing an application described in a specific format such as Java, HTML or the like.

BACKGROUND ART

Recently, in information processors such as digital TVs, mobile information terminals and cellular phones, applications described in a specific format such as Java programs, HTML contents or the like are actively executed. Software for executing such an application or reproducing data will be referred to as a format engine. A format engine is, for example, Java middleware for executing the above-mentioned Java programs or a browser for displaying HTML contents. In addition to such a format engine, a format engine for reproducing PDF data, music data or the like which are today executed on personal computers will be executed in the digital TVs mentioned above.

In general, one format engine is stored in an information processor such as the above-mentioned digital TV. FIG. 94 is a diagram showing one structure example of a conventional digital broadcast receiver. This digital broadcast receiver is for executing and managing an application (Java program) included in the broadcast data. In FIG. 94, a digital broadcast receiver 9402 is connected to a TV monitor 9401. A digital broadcast receiver 9402 includes a display manager 9411, an application manager 9412, a rule 9414, and a signal monitor 9413.

In FIG. 94, the signal monitor 9413 in the digital broadcast receiver 9402 receives a broadcast data stream. The signal monitor 9413 determines whether an application is included in the broadcast data stream or not, and outputs signal data indicating whether there is an application or not to the application manager 9412. Based on the input signal data, the application manager 9412 determines whether an application is included in the broadcast data stream or not. When an application is included in the broadcast data stream, the application manager 9412 reads and executes the application. When the application is executed, display information which is to be displayed on a TV monitor is provided to a display manager 9411 as a display context. The display manager 9411 provides appropriate display information to the TV monitor 9401. The application manager 9412 operates in accordance with the rule 9414, and transits the state of each application to either one of a loaded state, a paused state, an active state, and a deleted state. The rule is, for example, "placing only one application to an active state at a time" or "allowing only one application to be displayed at a time". The digital broadcast receiver 9402 can manage a plurality of applications by using such a rule.

For the case where an information processor such as a digital TV, a mobile information terminal, a cellular phone or the like includes a plurality of format engines, technologies for managing the plurality of format engines have been studied. As compared to a CPU, an information processor such as a digital TV, a mobile information terminal, a cellular phone or the like has limited resources usable for executing format engines. A resource is hardware used by a format engine; for example, a memory. For example, resources possessed by a digital TV include a tuner for receiving broadcast waves and decoding data, a decoder for decoding video or audio data included in the broadcast waves, a network interface for connecting the digital TV to the Internet, and the like in addition to a memory. For executing a format engine, a resource usable by the format engine to be executed needs to be obtained. Therefore, in an information processor having limited resources as described above, execution of each format engine is managed. For example, some types of digital TVs switch format engines to be executed. Hereinafter, a technology for managing a plurality of format engines in a conventional digital TV will be described.

FIG. 95 is a diagram showing one structure example of a middleware switching device used in a conventional digital TV. This middleware switching device switches a plurality of pieces of middleware (format engines) to be executed. In FIG. 95, the middleware switching device includes a middleware determination section 9501, a middleware reading section 9502, a middleware execution section 9503, and a middleware storing section 9504.

In FIG. 95, the middleware storing section 9504 stores first through n'th middleware. The middleware determination section 9501 determines the middleware to be executed among the first through n'th middleware. The middleware reading section 9502 reads the middleware determined by the middleware determination section 9501 from the middleware storing section 9504. The middleware execution section 9503 executes the middleware read by the middleware reading section 9502. With the above-described structure, the first through n'th middleware are switched to be executed. Thus, the device shown in FIG. 95 allows a plurality of pieces of middleware to coexist in one digital TV.

DISCLOSURE OF THE INVENTION

However, with the structure shown in FIG. 95, it is difficult to deal with addition or alteration of middleware. Hereinafter, this will be described in detail.

A case where new middleware is to be added to the device shown in FIG. 95 will be discussed as an example. In general, a unique state is defined for each individual format engine. Accordingly, the managing side of the format engines (the middleware reading section 9502 and the middleware execution section 9503) needs to grasp the states which are different for each format engine. In other words, when new middleware is to be added, the middleware reading section 9502 and the middleware execution section 9503 should be altered so as to be able to understand the states defined for that middleware. For this reason, when new middleware is to be added, the new middleware is added to the middleware storing section 9504, and also the middleware reading section 9502 and the middleware execution section 9503 should be altered so as to correspond to the new middleware. Thus, when middleware is added or altered while designing the middleware managing device shown in FIG. 95, the developer should alter the middleware reading section 9502 and the middleware execution section 9503. This alternation operation is a huge load on the developer.

Therefore, the present invention has an object of providing an information processor capable of easily dealing with addition or alternation of a format engine.

To achieve the above objects, the present invention has the following aspects. The present invention is directed to an information processor storing a plurality of format engines each for executing data described in a different format. The information processor comprises format engine managing means for pre-defining common states which define operating states of each format engine in a representation common to all the format engines, and managing an operation of each format engine; and operation control means, provided in correspondence with each format engine, for pre-defining a correspondence between the common states and individual states which define the operating states of each format engine in a representation different for each format engine, and controlling operations of the format engines such that each format engine is in an arbitrary individual state. For changing a format engine to a predetermined common state, the format engine managing means sends a message including common state information indicating the predetermined common state to the operation control means provided in correspondence with the format engine. When the message is sent from the format engine managing means, each operation control means controls the format engine such that the format engine is in the individual state corresponding to the common state indicated by the common state information included in the message.

The information processor may further comprise table storage means, provided in correspondence with each format engine, for storing a table including sets of an individual state of each format engine and a common state corresponding to the individual state. In this case, each operation control means determines the individual state from the common state by referring to the table.

The information processor may further comprise individual state obtaining means, provided in correspondence with each format engine, for obtaining an individual state of each format engine and sending common state information indicating the common state corresponding to the obtained individual state to the format engine managing means. In this case, the format engine managing means manages an operation of each format engine based on the common state indicated by the common state information which is output from the individual state obtaining means.

The information processor may further comprise a minimum resource which is used by a format engine during execution and cannot be used simultaneously by a plurality of format engines. In this case, when the individual state obtained from a format engine shows an operating state using the minimum resource, the individual state obtaining means outputs common state information indicating a predetermined state to the format engine managing means as the common state information of the format engine. When the individual state obtained from a format engine show an operating state not using the minimum resource, the individual state obtaining means outputs common state information indicating a state other than the predetermined state to the format engine managing means as the common state information of the format engine. The format engine managing means manages the operation of each format engine such that the common state information of only one format engine indicates the predetermined state.

The format engine managing means may comprise activation receiving means, common state obtaining means, operation stopping means, and activation means. The activation receiving means receives an activation request for activating a format engine. The common state obtaining means obtains common state information of each format engine from the individual state obtaining means in response to the activation receiving means receiving the activation request. The operation stopping means, when the common state information of a format engine obtained by the common state obtaining means indicates a during-execution state, sends a message for stopping the operation of the format engine to the operation control means provided in correspondence with the format engine. The activation means, after the operation of the format engine is stopped by the operation stopping means, sends a message for activating a format engine corresponding to the activation request to the operation control means provided in correspondence with the format engine.

The information processor may further comprise a minimum resource, resource control means, and priority level information storing means. The minimum resource is a resource which is used by a format engine during execution and cannot be used simultaneously by a plurality of format engines. The resource control means permits a format engine to use the resource in response to a request from a format engine. The priority level information storing means stores priority level information indicating a relative priority level of each format engine regarding use of the minimum resource. Permission determination means, when there are overlapping requests to use the minimum resource from a plurality of format engines, determines a format engine which is to be permitted to use the minimum resource based on the priority level information. In this case, when there are overlapping requests to use the minimum resource from a plurality of format engines, the resource control means permits only the format engine determined by the permission determination means to use the minimum resource; and when there are no overlapping requests to use the minimum resource from a plurality of format engines, the resource control means permits the format engine, which made the request, to use the minimum resource.

A plurality of the minimum resources may be provided. In this case, a plurality of resource control means are provided in correspondence with the plurality of the minimum resources.

The present invention may be provided in the form of a program executable by a computer of an information processor storing format engines each for executing data described in a different format.

According to the present invention, the format engine managing means manages the operating states of each format engine with common states. Therefore, even when a format engine is added or altered, the structure of the format engine managing means does not need to be significantly altered. Thus, addition or alteration of the format engine can be easily dealt with. The communication from the format engine managing means to the operation control means is performed by a message including common state information. Therefore, the format engine managing means can manage the operating states of each format engine without being concerned with the difference among the format engines, and thus can easily control a plurality of format engines simultaneously.

By the information processor further comprising table storing means, conversion between the individual states and the common states can be easily performed.

By the information processor further comprising individual state obtaining means, the format engine managing means can easily obtain the operating state of each format engine.

By the format engine managing means managing the operation of each format engine such that the common state information of only one format engine indicates a predetermined state, the following effects can be obtained. The format engine managing means can manage the operations of the format engines such that there is no competition for use of a minimum resource. In other words, the format engine managing means can simultaneously execute a plurality of format engines in the range that there is no competition for use of a minimum resource.

In the case where the format engine managing means comprises the activation receiving means, common state obtaining means, operation stopping means, and activation means, the following effects can be obtained. The format engine managing means can activate the format engine corresponding to an activation request with certainty, and can continue execution of the format engine which is active in the range that there is no competition for use of a minimum resource.

In the case where the information processor comprises a minimum resource, resource control means, and priority level information storing means, the following effects can be obtained. The format engine managing means can manage the operations of the format engines such that there is no competition for use of a minimum resource. In other words, the format engine managing means can simultaneously execute a plurality of format engines in the range that there is no competition for use of a minimum resource. In this case, a plurality of different format engines can simultaneously use a plurality of different minimum resources.

In the case where a plurality of minimum resources are provided, each format engine can use a different minimum resource simultaneously.

BRIEF DESCRIPTION OF THE DRAWINGS

FIG. 5 shows exemplary tables stored in a table storing section 44.

FIG. 18 shows an exemplary table of sub program IDs.

FIG. 19 shows an exemplary table of message IDs stored in a Message ID field 173.

FIG. 20 is a diagram showing an exemplary format of a Data field 175 in a "format engine state response" message.

FIG. 21 shows an exemplary table indicating the correspondence between the operating states of format engines and the operating state IDs.

FIG. 22 is a diagram showing an exemplary format of the Data field 175 in an "application/data list response" message.

FIG. 23 is a diagram showing an exemplary format of the Data field 175 in an "execute application/data" message, a "stop application/data" message, and a "pause application/data" message.

FIG. 32 shows an example of information held by a state managing section 732.

FIG. 33 shows an example of information held by the state managing section 732.

FIG. 34 shows an example of information held by the state managing section 732.

FIG. 35 is a diagram showing an example of a "format engine state changed" message.

FIG. 36 is a diagram showing an example of a message sent by the state managing section 732.

FIG. 37 is a diagram showing an example of a message sent by a mailer 760.

FIG. 38 shows a state after the state in FIG. 32 is changed.

FIG. 40 shows an example of information stored in a process memory section 3901.

FIG. 41 shows an example of information stored in a priority level memory section 3902.

FIG. 42 shows an example of information stored in a latest activation memory section 3903.

FIG. 43 shows an example of information stored in a resource ID memory section 3904.

FIG. 44 shows an example of definitions of resource IDs described in the C language, which is a programming language.

FIG. 45 is a block diagram showing a structure of Java middleware 740.

FIG. 46 schematically shows a main part of an AIT.

FIG. 47 is a state transition diagram showing four operating states of a Java application and transitions between the operating states.

FIG. 48 schematically shows a main part of an AIT.

FIG. 49 shows an exemplary conversion table indicating the correspondence between the operating states of all the Java applications executable by the Java middleware 740 and the operating states of the Java middleware 740.

FIG. 50 shows an exemplary conversion table for converting the operating states of each Java application into common states.

FIG. 51 is a diagram showing an specific example of a message sent by a first converting section 741.

FIG. 53 shows exemplary DVB-HTML data.

FIG. 54 shows an exemplary style sheet for determining the layout of the DVB-HTML.

FIG. 57 shows exemplary DVB-HTML data.

FIG. 58 shows exemplary DVB-HTML data.

FIG. 69 shows an exemplary conversion table indicating the correspondence between the states of all the HTML data displayable by the HTML browser 750 and the operating states of the HTML browser 750.

FIG. 70 shows an exemplary conversion table for converting the states of each HTML data into common states.

FIG. 71 is a diagram showing a specific example of a message sent by a second converting section 751.

FIG. 86 is a flowchart showing a flow of processing when the first converting section 741 receives an "application/data list request" message.

FIG. 93 shows combinations of states which do not influence the other format engines even when one format engine is executed.

BEST MODE FOR CARRYING OUT THE INVENTION

Hereinafter, embodiments of an information processor according to the present invention will be described with reference to the drawings. In the following embodiments, a digital TV will be used as an example of the information processor, but the present invention is applicable to a cellular phone, a mobile information terminal and the like.

(Hardware Structure)

Figure 1:
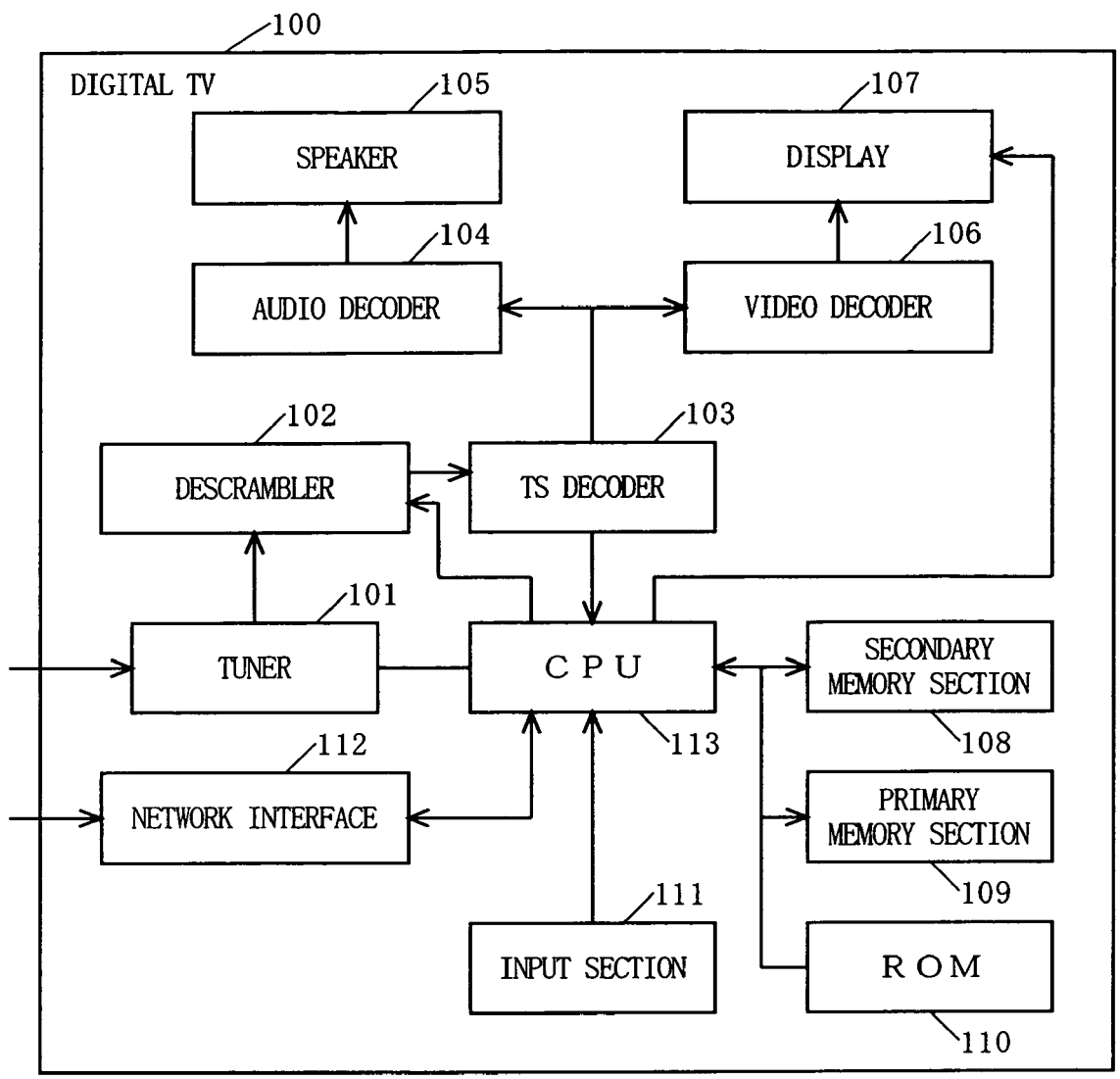
FIG. 1 is a block diagram showing a hardware structure of a digital TV as an example of an information processor according to this embodiment.

First, with reference to FIG. 1 through FIG. 3, a hardware structure of an information processor will be described. FIG. 1 is a block diagram showing a hardware structure of a digital TV as an example of the information processor according to this embodiment. In FIG. 1, a digital TV 100 includes a tuner 101, a descrambler 102, a TS decoder 103, an audio decoder 104, a speaker 105, a video decoder 106, a display 107, a secondary memory section 108, a primary memory section 109, a ROM 110, an input section 111, a network interface 112, and a CPU 113.

Figure 2:
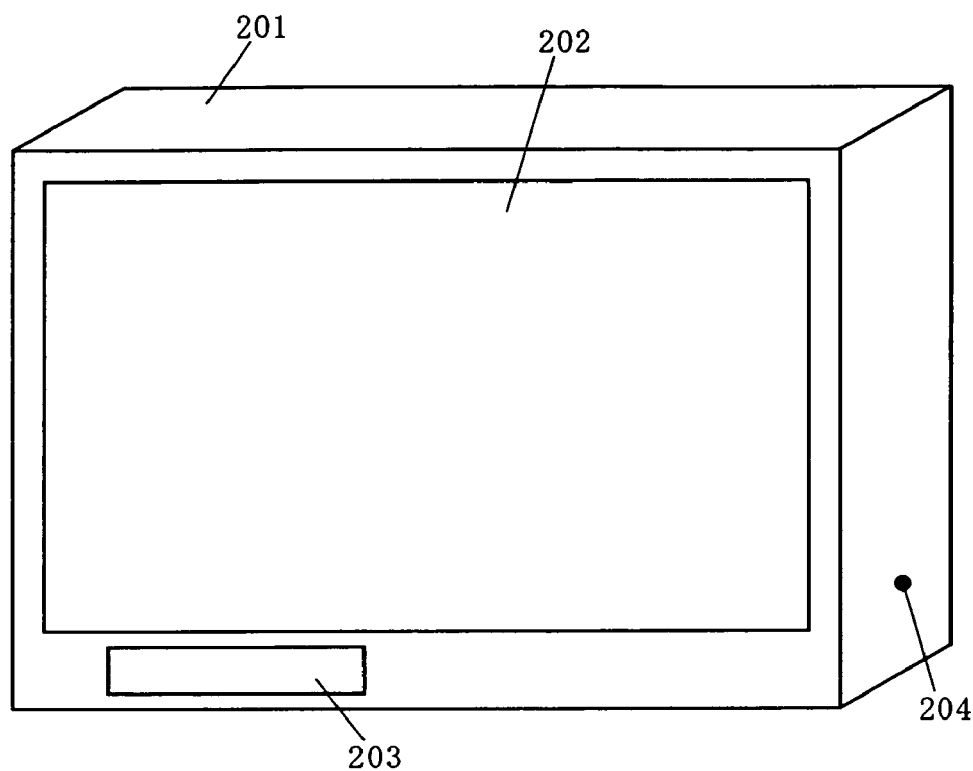
FIG. 2 is a view showing an external appearance of the digital TV 100 shown in FIG. 1.
Figure 3:
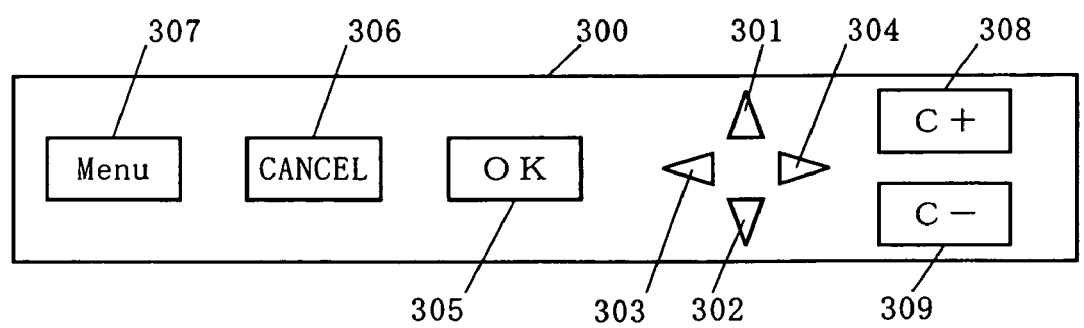
FIG. 3 is a view showing an exemplary front panel forming an input section 111.

FIG. 2 is a view showing an external appearance of the digital TV 100 shown in FIG. 1. The digital TV 100 shown in FIG. 1 is implemented as, for example, a flat panel TV as shown in FIG. 2. As shown in FIG. 2, the digital TV 100 further includes a housing 201 and a signal input terminal 204 in addition to the structure shown in FIG. 1. A display 202 corresponds to the display 107 shown in FIG. 1. A front panel section 203 corresponds to the input section 111 shown in FIG. 1. The front panel section 203 includes a plurality of buttons. A detailed structure of the front panel section 203 is shown in FIG. 3 described later. The signal input terminal 204 is a terminal for inputting a broadcast signal from a terrestrial broadcast station, a satellite antenna, or a cable TV station system to the digital TV 100. The signal input terminal 204 is connected to the tuner 101 shown in FIG. 1. The digital TV 100 has a network pin for connecting the digital TV 100 to the Internet. The network pin is connected to the network interface 112.

Next, a basic operation of the digital TV 100 will be described. The tuner 101 receives a broadcast signal, which is sent, via the signal input terminal 204. The tuner 101 demodulates the input broadcast signal in accordance with tuning information which indicates a frequency specified by the CPU 113. The demodulated broadcast signal is passed to the descrambler 102. The descrambler 102 decodes the demodulated broadcast signal. A key necessary for the decoding is given by the CPU 113. An MPEG2 transport stream obtained by the decoding is output to the TS decoder 103.

The TS decoder 103 filters the MPEG2 transport stream received from the descrambler 102, and passes necessary data to the audio decoder 104, the video decoder 106 or the CPU 113. An MPEG2 transport stream is described in detail in the MPEG Standards, "ISO/IEC13818-1" and will not be described in detail herein. An MPEG2 transport stream includes a plurality of fixed-length packets, and each packet stores video data, audio data, subtitles data, an application, and the like. Each packet is given a packet ID. The TS decoder 103 obtains an instruction by the CPU 113 on a set of a packet ID and an output destination of the packet having the packet ID. The output destination of a packet is either one of the "audio decoder 104", the "video decoder 106" and the "CPU 113". When, for example, the CPU 113 outputs an instruction that the output destination of the packet having a packet ID "123" is the "video decoder 106" to the TS decoder 103, the TS decoder 103 extracts the packet having the packet ID "123" from the MPEG2 transport stream, and passes the packet to the video decoder 106. The TS decoder 103 can execute a plurality of types of filtering processing in parallel.

The audio decoder 104 connects audio data buried in each packet passed from the TS decoder 103, performs digital-analog conversion, and outputs the resultant signal to the speaker 105. The speaker 105 outputs the signal, which is output from the audio decoder 104, as a voice. The video decoder 106 connects video data buried in each packet passed from the TS decoder 103, performs digital-analog conversion, and outputs the resultant video signal to the display 107. The display 107 typically includes a CRT, a liquid crystal display device or the like, and outputs the video signal which is output from the video decoder 106. The display 107 also occasionally displays a message or the like instructed by the CPU 113.

The secondary memory section 108 typically includes a flash memory, a hard disc or the like, and stores data and programs instructed by the CPU 113. The stored data and programs are referred to by the CPU 113. The stored data and programs are kept stored even in the state where the digital TV 100 is turned off. The primary memory section 109 typically includes a RAM or the like, and temporarily stores data and programs instructed by the CPU 113. The stored data and programs are referred to by the CPU 113. The stored data and programs are deleted when the digital TV 100 is turned off. The ROM 110 is an unrewritable memory device, and typically includes a ROM, a CD-ROM, a DVD or the like. The ROM 110 stores programs to be executed by the CPU 113.

The input section 111 typically includes a front panel or a remote control, and receives inputs from the user. FIG. 3 is a diagram showing an exemplary front panel forming the input section 111. In FIG. 3, a front panel 300 includes nine buttons; i.e., an upward cursor button 301, a downward cursor button 302, a leftward cursor button 303, a rightward cursor button 304, an OK button 305, a cancel button 306, a MENU button 307, a C+ button 308, and a C− button 309. When the user presses one of the buttons, an identifier indicating the pressed button is notified to the CPU 113.

The network interface 112 typically includes a modem, an Ethernet connector or the like, and provides the digital TV 100 with a function of connecting the digital TV with a network such as the Internet, an intranet or the like. In accordance with an instruction from the CPU 113, the network interface 112 sends and receives data to and from other information devices connected to the network. When, for example, the network interface 112 includes a modem, the network interface 112 receives a telephone number or communication parameter information of a connection destination from the CPU 113 and establishes a communication path with the network.

The CPU 113 executes a program stored in the ROM 110. In accordance with an instruction of the program, the CPU 113 controls the operation of the tuner 101, the descrambler 102, the TS decoder 103, the display 107, the secondary memory section, the primary memory section 109, and the ROM 110. The operation of the CPU 113 will be described in detail later.

(Operation Overview)

Next, a detailed structure and operation of the information processor will be described. Before that, an operation overview of the information processor for achieving the object of the present invention will be described with reference to FIG. 4 through FIG. 6. Here, two operation examples, i.e., a first operation example and a second operation example will be described as operation examples of the information processor.

FIRST OPERATION EXAMPLE

Figure 4:
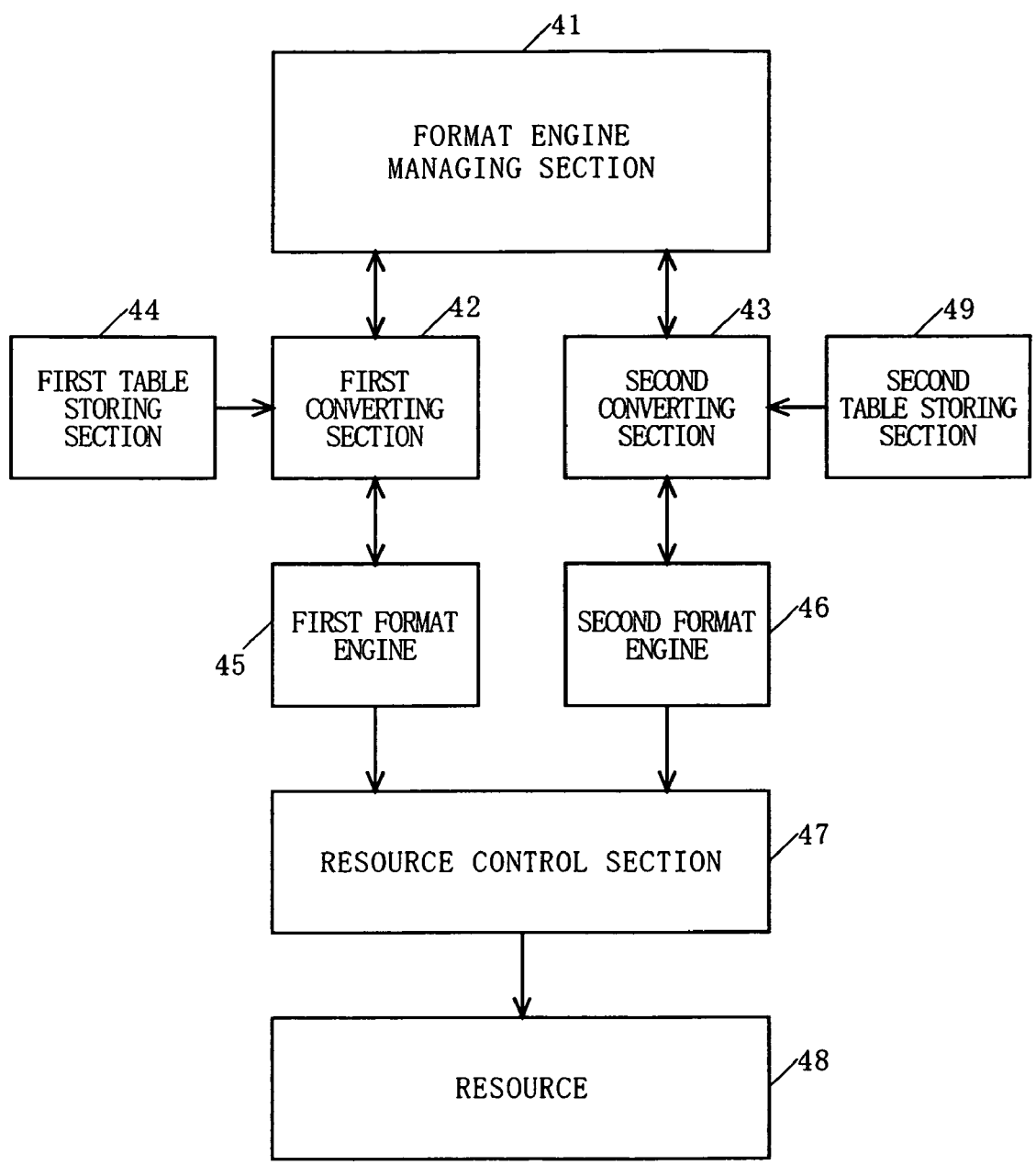
FIG. 4 is a block diagram showing a functional structure of the digital TV shown in FIG. 1 for performing a first operation example.

First, with reference to FIG. 4 and FIG. 5, an overview of the first operation example will be described. FIG. 4 is a block diagram showing a functional structure of the digital TV shown in FIG. 1 for performing the first operation example. In FIG. 4, the digital TV includes a format engine managing section 41, a first converting section 42, a second converting section 43, a first table storing section 44, a second table storing section 49, a first format engine 45, a second format engine 46, a resource control section 47, and a resource 48. In FIG. 4, the elements other than the resource 48 are implemented by the CPU 113 shown in FIG. 1 executing a program stored in the ROM 110 using the primary memory section 109 and the secondary memory section 108. The resource 48 is hardware usable by format engines. The resource 48 is, for example, a memory (the first memory section 109 or the secondary memory section 108), the tuner 101, the TS decoder 103, the network interface 112 or the like. With FIG. 4, the digital TV 100 will be described as having two format engines for the sake of simplicity, but the number of the format engines may be more than two.

The format engines 45 and 46 can each be in any one of a plurality of types of operating states. In more detail, the format engines 45 and 46 can each be in, an "executed state", a "non-executed state" or the like. Hereinafter, in the description of the operation overview of the information processor with reference to FIG. 4 through FIG. 6, the first format engine 45 can be in any one of the three states represented as "in operation", "at a stop" and "at a pause". The second format engine 46 can be in either one of the two states of "active" and "non-active". An operating state defined for each individual format engine is referred to as an individual state. Namely, for the first format engine 45, individual states including the three types of operating states represented as "in operation", "at a stop" and "at a pause" are defined. For the second format engine 46, individual states including the two types of operating states of "active" and "non-active" are defined. In general, each format engine may be in any of various types of operating states.

The format engine managing section 41 manages the operation of each of the format engines 45 and 46. Specifically, the format engine managing section 41 instructs each of the format engines 45 and 46, for example, to be active or to be at a stop. In the format engine managing section 41, an operating state in which each format engine can be placed is pre-defined as a common state. A common state is an operating state of a format engine conceptually defined by a representation common to all the format engines. In FIG. 4, in the format engine managing section 41, common states including two types of operating states represented as "during execution" and "terminated" are defined. Thus, a common state may be in a different representation from that of an operating state defined for each of the format engines 45 and 46 (i.e., an individual state). The number of types of operating states included in common states are not necessarily two. As the common states, the number of types of operating states required by the format engine managing section 41 to manage the format engines may be defined.

The format engine managing section 41 also makes an operation instruction to the format engines in accordance with, for example, an instruction from the user. At this point, the format engine managing section 41 makes an instruction using common state information. Common state information is information which represents an operating state of a format engines with a common state. In FIG. 4, for example, for making an instruction such that the first format engine 45 is in a predetermined operating state, the format engine managing section 41 outputs common state information indicating the predetermined operating state to the first converting section 42. Similarly, for making an operation instruction to the second format engine 46, the format engine managing section 41 outputs common state information to the second converting section 43.

The format engine managing section 41 receives common state information which is output from each of the converting sections 42 and 43 and thus grasps the operating state of each of the format engines 45 and 46 by the representation of the common state. The format engine managing section 41 can manage the operation of each of the format engines 45 and 46 using the common state grasped in this manner.

The first converting section 42 controls the operation of the first format engine 45 based on the common state information which is output from the format engine managing section 41. In more detail, the first converting section 42 pre-defines the correspondence between the common states defined in the format engine managing section 41 and the individual states defined for the first format engine 45. When common state information is output from the format engine managing section 41, the first converting section 42 specifies the individual state corresponding to the common state indicated by the common state information based on the correspondence. The first converting section 42 then controls the operation of the first format engine 45 such that the first format engine 45 is in the specified individual state.

The first converting section 42 obtains the operating state of the first format engine 45 (represented with the individual state) and notifies the obtained operating state to the format engine managing section 41 in a form represented with the common state. Namely, the first converting section 42 outputs common state information indicating the operating state obtained from the first format engine 45 to the format engine managing section 41. For outputting the common state information to the format engine managing section 41 also, the correspondence between the common states and the individual states mentioned above is used. In more detail, when obtaining the individual state from the first format engine 45, the first converting section 42 specifies the common state corresponding to the obtained individual state based on the above-mentioned correspondence. The first converting section 42 then outputs the common state information indicating the specified common state to the format engine managing section 41.

The second converting section 43 performs substantially the same processing as that of the first converting section 42. Namely, the second converting section 43 controls the operation of the second format engine 46 based on the common state information which is output from the format engine managing section 41. The second converting section 43 also obtains the operating state of the second format engine 46 (represented with the individual state) and notifies the obtained operating state to the format engine managing section 41 in a form represented with the common state. Such an operation is performed in substantially the same manner as the operation in the first converting section 42.

The first table storing section 44 stores a table associating the common states defined in the format engine managing section 41 and the individual states defined for the first format engine 45 to each other. The second table storing section 49 stores a table associating the common states defined in the format engine managing section 41 and the individual states defined for the second format engine 46 to each other. FIG. 5 shows an exemplary table stored in each of the table storing sections 44 and 49. FIG. 5(a) shows an exemplary table stored in the table storing section 44, and FIG. 5(b) shows an exemplary table stored in the table storing section 49. In FIG. 5(a), the common state "during execution" is associated with the individual state "inoperation". The common state "terminated" is associated with the individual states "at a stop" and "at a pause". In FIG. 5(b), the common state "during execution" is associated with the individual state "active". The common state "terminated" is associated with the individual state "non-active". The converting sections 42 and 43 each refer to the table shown in FIG. 5 to specify the individual state corresponding to the common state indicated by the common state information which is output from the format engine managing section 41. The converting sections 42 and 43 each refer to the table shown in FIG. 5 to specify the common state corresponding to the individual state obtained from the respective format engine 45 or 46.

When, for example, the first converting section 42 obtains common state information indicating "during execution", the first converting section 42 refers to the table shown in FIG. 5(a) to specify the individual state "inoperation". The first converting section 42 then controls the first format engine 45 such that the first format engine 45 is in the specified operating state "in operation". When, for example, the second converting section 43 obtains the individual state indicating "non-active" from the second format engine 46, the second converting section 43 refers to the table shown in FIG. 5(b) to specify the common state "terminated". The second converting section 43 then outputs the common state information indicating the "terminated" thus specified to the format engine managing section 41.

In FIG. 4, the resource control section 47 permits each of the format engines 45 and 46 to use the resource 48 in response to a request from each of the format engines 45 and 46.

The above-described operation is substantially the same in the second operation example described later.

Here, a case where the resource 48 is a minimum resource. A minimum resource is a resource which is used while a format engine is during execution and cannot be used simultaneously by a plurality of format engines. For example, the tuner 101, the TS decoder 103, the network interface 112 are minimum resources. A minimum resource is a resource, the number of which possessed by the digital TV 100 is limited, and the use of which is possibly attempted simultaneously and competed for by a plurality of format engines. For example, the tuner 101 can only tune the digital TV 100 to one frequency band. When a plurality of format engines tries to tune the digital TV 100 to different frequency bands, competition occurs. Such a minimum resource cannot be simultaneously used by a plurality of format engines, and therefore the resource control section 47 needs to prevent a plurality of format engines from being permitted to simultaneously use the minimum resource. If the resource control section 47 permits a plurality of format engines to simultaneously use the minimum resource, the format engines may not possibly operate normally. Thus, in FIG. 4, the following method is adopted for normally operating the format engines.

In FIG. 4, the common states and the individual states are associated with each other in the table stored in each of the table storing sections 44 and 49 as follows. With an individual state indicating an operating state in which the format engine uses the minimum resource, the common state "during execution" is associated. With an individual state indicating an operating state in which the format engine does not use the minimum resource, the common state "terminated" is associated. In FIG. 4, it is assumed that the first format engine 45 uses the minimum resource only in the individual state "in operation" and does not use the minimum resource in the other individual states. It is also assumed that the second format engine 46 uses the minimum resource only in the individual state "active" and does not use the minimum resource in the other individual state. In such a state, the tables mentioned above are as shown in FIG. 5.

In addition to making the association in the tables as described above, the format engine managing section 41 controls the operation of each of the format engines 45 and 46 such that one format engine is in the common state "during execution". In this manner, the format engine managing section 41 can manage the operation of each of the format engines 45 and 46 such that one format engine uses the minimum resource. There are various possible specific management methods usable by the format engine managing section 41. Specific management methods will be described in the processing examples later.

SECOND OPERATION EXAMPLE

Figure 6:
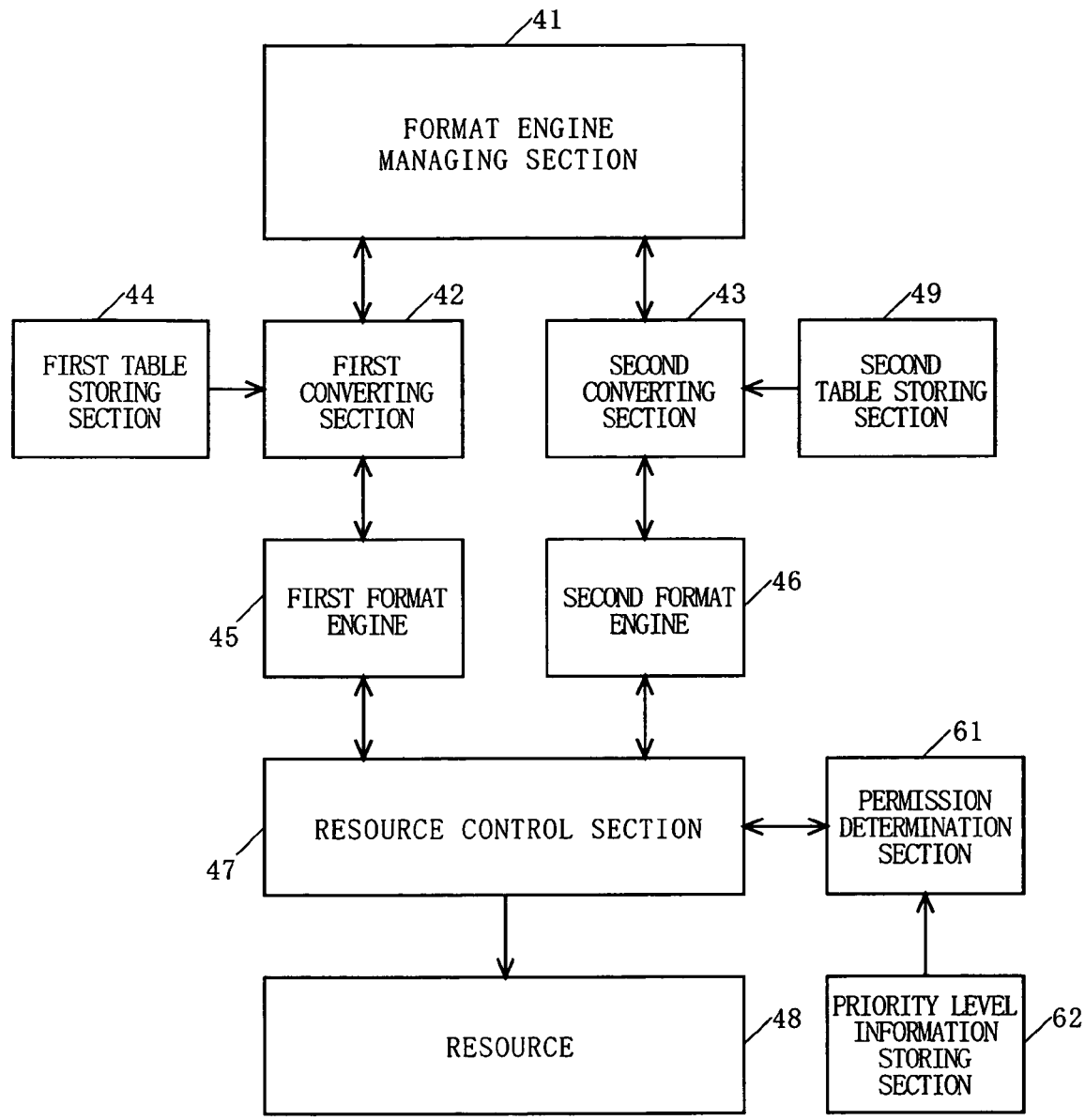
FIG. 6 is a block diagram showing a functional structure of the digital TV shown in FIG. 1 for performing a second operation example.

Next, with reference to FIG. 6, a second operation example will be described. FIG. 6 is a block diagram showing a functional structure of the digital TV shown in FIG. 1 for performing the second operation example. In FIG. 6, the digital TV includes a permission determination section 61 and a priority level information storing section 62 in addition to the structure shown in FIG. 4. In FIG. 6, elements identical to those in FIG. 4 bear the same reference numerals. In FIG. 6, the permission determination section 61 and the priority level information storing section 62 are implemented by the CPU 113 shown in FIG. 1 executing a program stored in the ROM 110 using the primary memory section 109 and the secondary memory section 108.

A difference between the operation in FIG. 4 and the operation in FIG. 6 is in the method for normally operating the format engines when the resource 48 is a minimum resource. The other operations, for example, the operation for managing each of the format engines 45 and 46 by the format engine managing section 41 using the common states, and the operation for converting a common state into an individual state or vice versa by each of the converting sections 42 and 43, are substantially the same in FIG. 4 and in FIG. 6. Accordingly, a method for normally operating the format engines in the second operation example will be described hereinafter.

In the second operation example, it is not necessary to associate the common state "during execution" to an individual state indicating an operating state in which each format engine uses the minimum resource in each of the table storing sections 44 and 49. It is not necessary either that the format engine managing section 41 manages the operation of each of the format engines 45 and 46 such that only format engine is in the common state "during execution". In the second operation example, when the resource control section 47 receives overlapping requests to use the resource 48, the format engine which can use the resource is selected based on priority level information. The details will be described below.

The priority level information storing section 62 stores priority level information. Priority information is information indicating relative priority levels of the format engines regarding use of the resource 48, which is a minimum resource. In FIG. 6, the priority level information is information indicating whether the first format engine 45 or the second format engine 46 has priority.

When receiving overlapping requests to use the resource 48, i.e., when a plurality of format engines make a request to use the resource 48 simultaneously, the resource control section 47 outputs a notice that there are overlapping requests to the permission determination section 61.

When receiving the notice that there are overlapping requests from the resource control section 47, the permission determination section 61 determines the format engine which is permitted to use the resource 48 based on the priority level information stored in the priority level information storing section 62. The permission determination section 61 then outputs information indicating the determined format engine to the resource control section 47. The resource control section 47 permits the format engine indicated by the information to use the resource 48. By the above-described operation, the operation of each of the format engines 45 and 46 can be managed such that one format engine uses the minimum resource. The format engine which was not permitted to use the resource may be notified that the use was not permitted by the resource control section 47 or the format engine managing section 41.

As described above, according to the first and second operation examples, the format engine managing section 41 manages the operation of each of the format engines 45 and 46 using the common states. A common state is separate from an individual state defined for each format engine, and is not related to the format engines to be managed. Therefore, even when a format engine is added or altered, it is not necessary to alter the content defined as a common state. Namely, it is not necessary to alter the format engine managing section 41. When a format engine is added, it is only necessary to add the format engine and to add a converting section corresponding thereto. Namely, it is only necessary to add the correspondence between the individual states defined for the added format engine and the common states. As described above, according to the first and second operation examples, even when a format engine is added or altered, such addition or alteration can be easily dealt with.

In the case where the resource 48 is a minimum resource, according to the first and second operation examples, the operation of each format engine is managed such that a plurality of format engines do not simultaneously use the minimum resource. Thus, the plurality of format engines can be prevented from abnormally operating by using the minimum resource simultaneously.

In the first and second operation examples, there is one resource 48. There may be a plurality of resources. In the case where there are a plurality of resources, the same number of resource control sections need to be provided such that one resource control section is provided for one resource. In the first operation example, even in the case where there are a plurality of resources, the common state "during execution" is associated with an individual state indicating an operating state in which a format engine uses the minimum resource as described above. In the first operation example, even in the case where there are a plurality of resources, the format engine managing section 41 manages the operation of each of the format engines 45 and 46 such that one format engine is in the common state "during execution" as described above.

In the second operation example, in the case where there are a plurality of resources, the resource control sections provided in correspondence with the minimum resources perform substantially the same operation as described above. Thus, when there are a plurality of minimum resources, each minimum resource can be prevented from being used simultaneously by a plurality of format engines. In the second operation example, a plurality of different format engines can simultaneously use a plurality of different minimum resources. Namely, while a format engine A uses a minimum resource A, another format engine B can use another minimum resource B. In the first operation example, even when there are a plurality of minimum resources, the plurality of minimum resources cannot be used simultaneously. By contrast, in the second operation example, the plurality of minimum resources can be simultaneously used, and on this point, the format engines can be executed more efficiently than in the first operation example.

In the first and second examples, the converting sections 42 and 43 are structured separately from the format engines, but may be integrally structured with the format engines. In other words, the format engines may have the functions of the converting sections. The description on the overview of the first and second operation examples is now completed.

SPECIFIC STRUCTURE EXAMPLE

Next, with reference to FIG. 7 through FIG. 73, a specific structure of the information processor according to the present invention will be described. The structure described below can realize both the first and second operation examples. The structure described below include elements unnecessary for performing only the first operation example and elements unnecessary for performing only the second operation example, which will be specified in the description when necessary.

Figure 7:
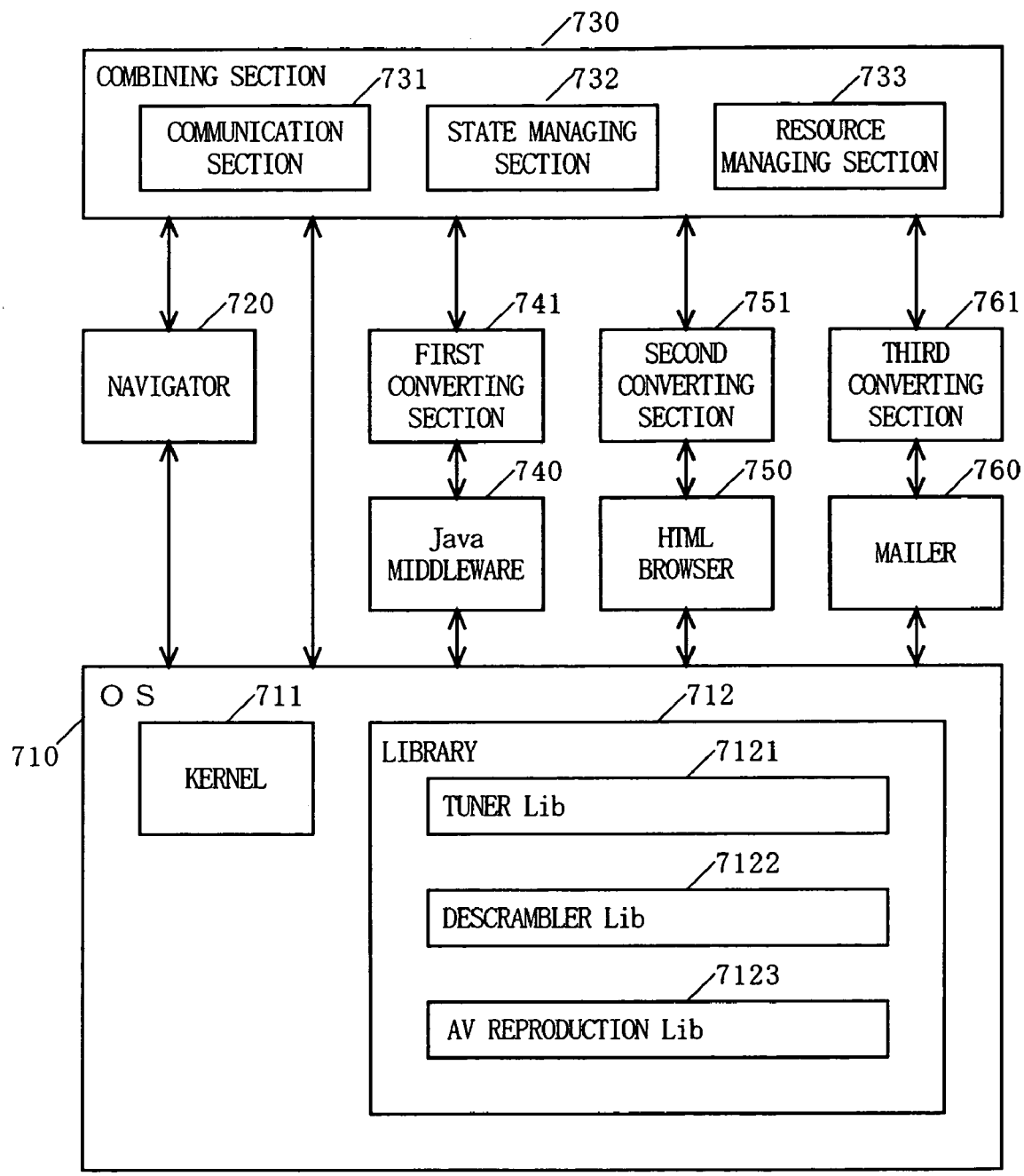
FIG. 7 is a view showing a functional structure of the information processor more specifically.

FIG. 7 is a diagram showing a functional structure of the information processor more specifically. Each element shown in FIG. 7 is implemented by the CPU 113 shown in FIG. 1 executing a program stored in the ROM 110 using the primary memory section 109 and the secondary memory section 108.

In other words, FIG. 7 is a diagram showing a structure of a program stored in the ROM 110 and executed by the CPU 113.

In FIG. 7, the information processor includes an OS 710, a navigator 720, a combining section 730, Java middleware 740, an HTML browser 750, a mailer 760, a first converting section 741, a second converting section 751, and a third converting section 761. These are sub programs of the program stored in the ROM 110. The format engine managing section 41 shown in FIG. 4 is implemented as a part of the functions of the navigator 720 and the combining section 730.

Among the sub programs shown in FIG. 7, the Java middleware 740, the HTML browser 750, and the mailer 760 are format engines for performing, for example, execution of an application described in a predetermined format or display of data described in a predetermined format. In the specific structure example described below, these three types of format engines will be described as examples, but a format engine may be a word processor program, a spread sheet program or the like. The number of format engines included in the information processor is not limited to three, and may be one, two, or four or more. It is necessary, though, to provide the same number of converting sections as the number of the format engines.

The OS 710 is a sub program which is activated by the CPU 113 when the digital TV 100 is turned on. The OS 710 is an acronym of operation system, and is, for example, Linux or the like. The OS 710 is a generic term of a group of programs including a kernel 711, a library 712 and the like which execute the other sub programs in parallel, and will not be described in detail. In this structure example, the kernel 711 of the OS 710 activates the navigator 720, the Java middleware 740, the HTML browser 750, and the mailer 760 as sub programs after the power is turned on. When the OS 710 is Linux, the OS 710 activates an individual process for each of the sub programs, and executes an individual sub program in each process.

The library 712 of the OS 710 provides the other sub programs with a plurality of functions for controlling the hardware element (resource) possessed by the digital TV 100. Namely, the resource control section 47 shown in FIG. 4 is implemented as a part of the function of the library 712. In this structure example, a tuner library (tuner Lib) 7121, a descrambler library (descrambler Lib) 7122, and an AV reproduction library (AV reproduction Lib) 7123 will be described as examples of the plurality of functions. These libraries implement the functions of the resource control section 47 shown in FIG. 4.

The tuner Lib 7121 provides the sub program with a function of controlling the tuner 101. In more detail, the tuner Lib 7121 receives, from the sub program, tuning information including the frequency to be given to the tuner 101. The tuner Lib 7121 gives the received information to the tuner 101 and instructs the tuner 101 to perform tuning.

The descrambler Lib 7122 provides the sub program with a function of controlling the descrambler 102. In more detail, the descrambler Lib 7122 receives decoding information including a key or the like from the sub program. The descrambler Lib 7122 gives the received information to the descrambler 102 and instructs the descrambler 102 to perform decoding.

The AV reproduction Lib 7123 provides the sub program with a function of controlling the TS decoder 103 and performing video and audio reproduction. In more detail, the AV reproduction Lib 7123 receives a packet ID of the video data to be reproduced and a packet ID of audio data to be reproduced from the sub program. The AV reproduction Lib 7123 gives a set of the received packet ID of the video data and the output destination "video decoder 106" and a set of the received packet ID of the audio data and the output destination "audio decoder 104" to the TS decoder 103, and instructs the TS decoder 103 to perform filtering. By this operation, after the packet including the audio data is passed to the audio decoder 104, the audio data is reproduced via the speaker 105; and after the packet including the video data is passed to the video decoder 106, the video data is reproduced via the display 107.

The navigator 720 instructs a format engine to be active or to be at a stop in accordance with, for example, an instruction from the user. The navigator 720 also instructs, for example, channel switching of the digital TV, and execution and stop of an application and reproduction and stop of data by a format engine. The navigator 720 is a sub program activated by the kernel 711 of the OS 710.

Next, an operation of channel switching by the navigator 720 will be described. It is assumed that the input section 111 is the front panel shown in FIG. 3. When the user presses the C+ button 308 or the C− button 309, the navigator 720 receives an identifier of the pressed button and switches the channel in which data is being reproduced. Here, the C+ button 308 changes the channel to a larger number of channel, and the C− button 309 changes the channel to a smaller number of channel. It is assumed, for example, that data can be reproduced in channels "1", "2", "4", "6" and "8", and data is now being reproduced in channel "6". When the user presses the C+ button 308, the navigator 720 changes the channel for reproduction from "6" to "8". When the user presses the C− button 309, the navigator 720 changes the channel for reproduction from "6" to "4". The channel switching is performed by giving the packet IDs including the video data and audio data corresponding to the channel to the AV reproduction Lib 7123 included in the library 712 of the OS 710. This operation is a basic function of currently commercially available TVs and thus will not be described in detail.

Figure 8:
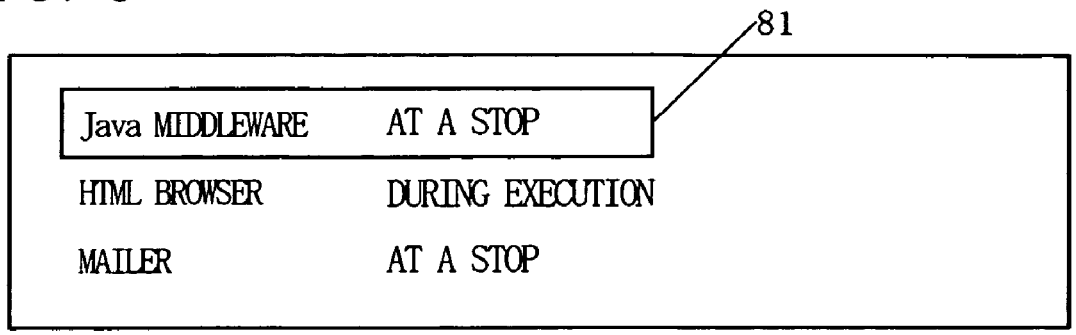
FIG. 8 shows an exemplary list of format engines displayed on a display 107.
Figure 9:
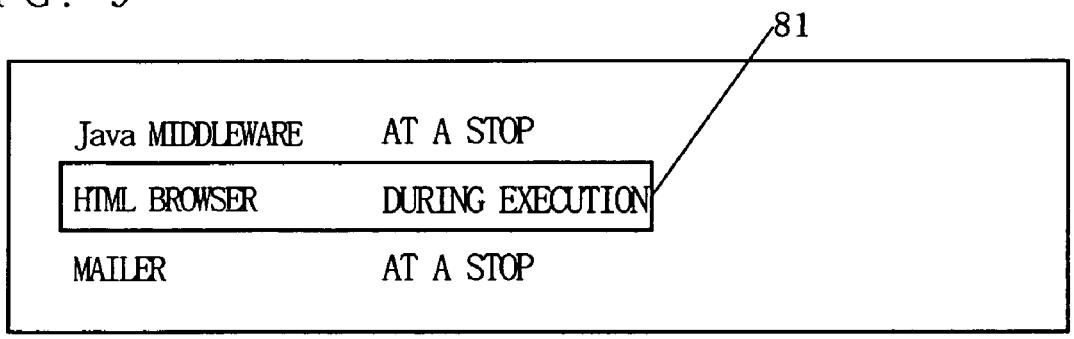
FIG. 9 shows an exemplary list of format engines displayed on the display 107.
Figure 10:
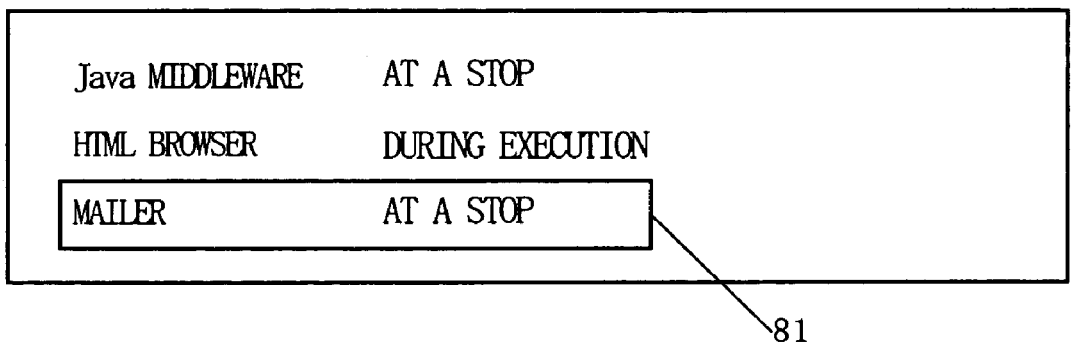
FIG. 10 shows an exemplary list of format engines displayed on the display 107.

Next, with reference to FIG. 8 through FIG. 16, an operation of the navigator 720 when the user instructs activation of a format engine or the like will be described. When the user presses the MENU button 307 of the input section 111, the navigator 720 displays a list of executable format engines on the display 107. FIG. 8, FIG. 9 and FIG. 10 show exemplary lists of format engines displayed on the display 107. In FIG. 8 through FIG. 10, sets of a name of a format engine and a state thereof are displayed as a list of format engines. In addition, a cursor 81 is displayed for selecting a format engine. The cursor 81 moves as the user presses the upward cursor button 301 or the downward cursor button 302 of the input section 111. When the downward cursor button 302 is pressed in the state shown in FIG. 8, the cursor 81 moves downward by one line to realize the state shown in FIG. 9. When the downward cursor button 302 is pressed in the state shown in FIG. 9, the cursor 81 moves downward by one line to realize the state shown in FIG. 10. When the upward cursor button 301 is pressed in the state shown in FIG. 9, the cursor 81 moves upward by one line to realize the state shown in FIG. 8. In FIG. 8 through FIG. 10, the state of each format engine displayed (the Java middleware 740, the HTML browser 750, and the mailer 760) is obtained from the combining section 730 by the navigator 720.

Figure 11:
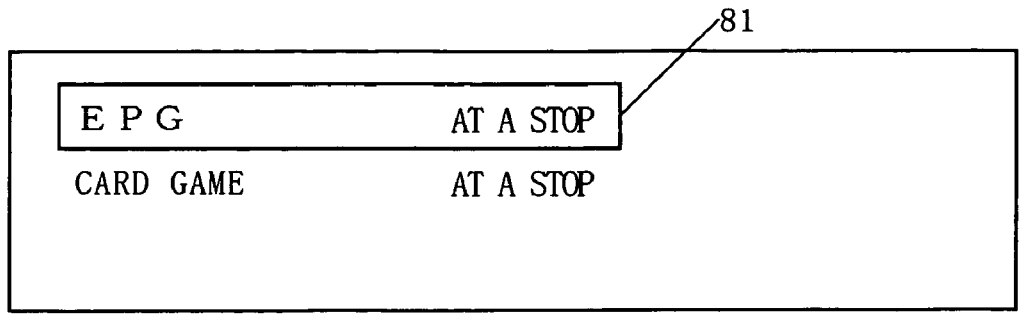
FIG. 11 shows an exemplary list of executable applications displayed on the display 107.
Figure 12:
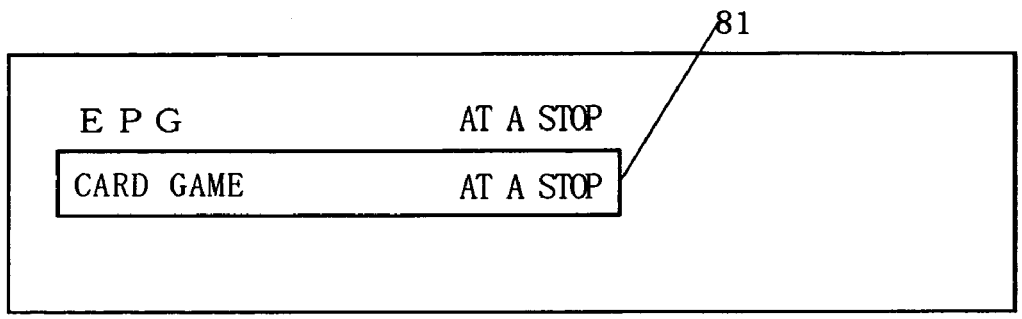
FIG. 12 shows an exemplary list of executable applications displayed on the display 107.

When the user presses the OK button 305 of the input section 111 in the state shown in FIG. 8, the navigator 720 displays a list of applications executable by the Java middleware 740. FIG. 11 and FIG. 12 show exemplary lists of executable applications which are displayed on the display 107. In FIG. 11 and FIG. 12, sets of a name of an application and a state thereof are shown as a list of executable applications. In addition, the cursor 81 is displayed for selecting an application. The cursor 81 moves as the user presses the upward cursor button 301 or the downward cursor button 302 of the input section 111. When the downward cursor button 302 is pressed in the state shown in FIG. 11, the cursor 81 moves downward by one line to realize the state shown in FIG. 12. When the upward cursor button 301 is pressed in the state shown in FIG. 12, the cursor 81 moves upward by one line to realize the state shown in FIG. 11. In FIG. 11 and FIG. 12, the state of each application displayed is obtained from the combining section 730 by the navigator 720.

When the user presses the OK button 305 of the input section 111 in the state shown in FIG. 11, the navigator 720 instructs the combining section 730 to activate an application "EPG". When the user presses the OK button 305 of the input section 111 in the state shown in FIG. 12, the navigator 720 instructs the combining section 730 to activate an application "card game".

Figure 13:
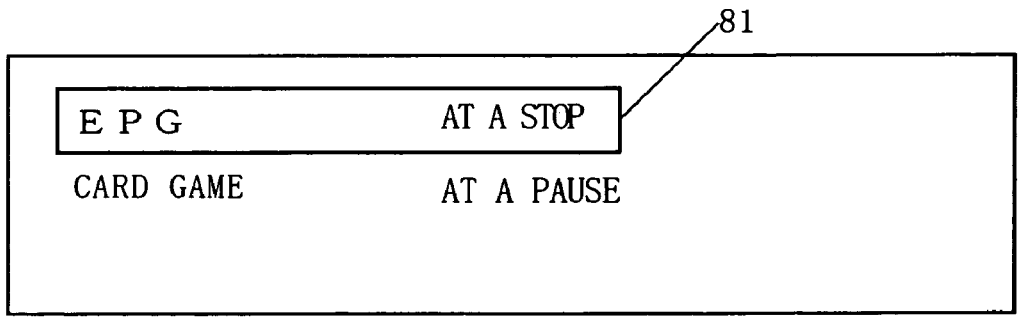
FIG. 13 shows another exemplary list of executable applications displayed on the display 107.
Figure 14:
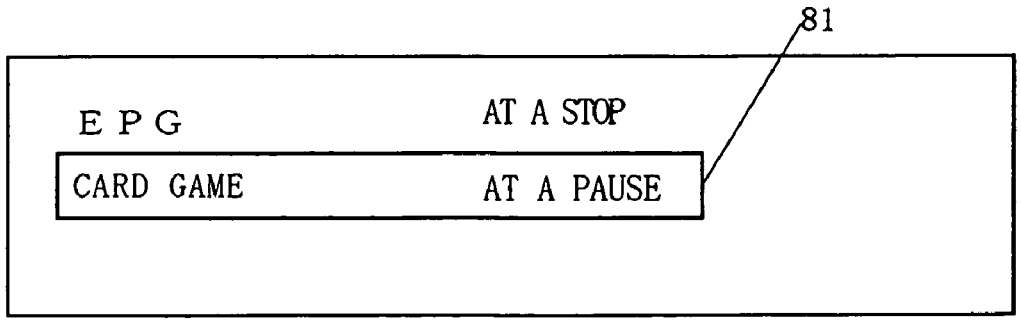
FIG. 14 shows another exemplary list of executable applications displayed on the display 107.

In FIG. 11 and FIG. 12, all the applications are "at a stop". There are cases where an application is "at a pause" or "during execution". FIG. 13 and FIG. 14 show other exemplary lists of executable applications which are displayed on the display 107. In FIG. 13 and FIG. 14, the operating state of the "EPG" is "during execution", and the operating state of the "card game" is "at a pause". When the user presses the OK button 305 of the input section 111 in the state shown in FIG. 13, the navigator 720 instructs the combining section 730 to stop the application "EPG". When the user presses the OK button 305 of the input section 111 in the state shown in FIG. 14, the navigator 720 instructs the combining section 730 to stop the application "card game". In summary, when the user presses the OK button 305 of the input section 111 in the state where an application "at a stop" is selected by the cursor 81, the navigator 720 instructs the combining section 730 to activate the application. When the user presses the OK button 305 of the input section 111 in the state where an application "during execution" or "at a pause" is selected by the cursor 81, the navigator 720 instructs the combining section 730 to stop the application.

Figure 15:
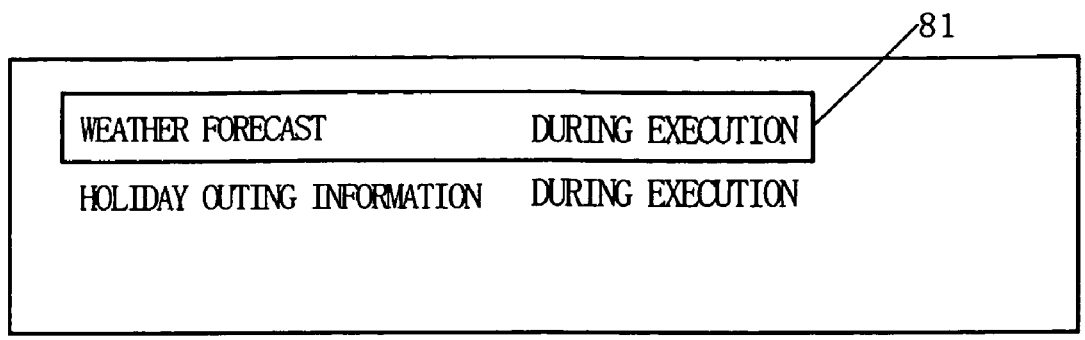
FIG. 15 shows an exemplary list of executable HTML data displayed on the display 107.
Figure 16:
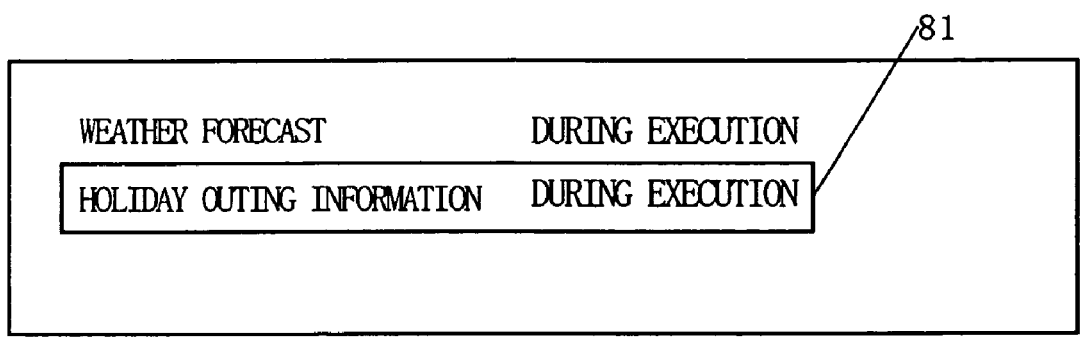
FIG. 16 shows an exemplary list of executable HTML data displayed on the display 107.

When the user presses the OK button 305 of the input section 111 in the state shown in FIG. 9, the navigator 720 displays a list of data displayable by the HTML browser 750. In FIG. 15 and FIG. 16, sets of data and states thereof are displayed as a list of executable data. In addition, the cursor 81 is displayed for the user to select data. The cursor 81 moves as the user presses the upward cursor button 301 or the downward cursor button 302. When the downward cursor button 302 is pressed in the state shown in FIG. 15, the cursor 81 moves downward by one line to realize the state shown in FIG. 16. When the upward cursor button 301 is pressed in the state shown in FIG. 16, the cursor 81 moves upward by one line to realize the state shown in FIG. 15. The state of each data displayed is obtained from the combining section 730 by the navigator 720. When the user presses the OK button 305 in the state shown in FIG. 15, the navigator 720 instructs the combining section 730 to stop data "weather forecast". When the user presses the OK button 305 in the state shown in FIG. 16, the navigator 720 instructs the combining section 730 to stop data "holiday outing information".

When the user presses the OK button 305 of the input section 111 in the state shown in FIG. 10, the navigator 720 instructs the combining section 730 to activate the mailer 760. The mailer 760 does not have any operating state of individual data to be dealt with (e.g., at a stop, during execution, at a pause), and defines only the operating state of the mailer 760 itself. Accordingly, even when the user presses the OK button 305 of the input section 111 in the state shown in FIG. 10, no list of applications or data dealt with by an individual format engine such as the Java middleware 740 or the HTML browser 750 is displayed. When attempting to obtain a list of states of applications or data dealt with by the mailer 760 from the combining section 730, the navigator 720 learns that the mailer 760 does not hold any operating state of individual applications or data. Alternatively, the navigator 720 may know in advance that the mailer 760 does not hold any operating state of individual applications or data.

The navigator 720 operates as follows for a format engine which does not hold any operating state of individual applications or data described above. When the user presses the OK button 305 of the input section 111 in the state where a format engine in the operating state "at a stop" is selected by the cursor 81, the navigator 720 instructs the combining section 730 to activate the format engine. When the user presses the OK button 305 of the input section 111 in the state where a format engine in the operating state "in operation" or "at a pause" is selected by the cursor 81, the navigator 720 instructs the combining section 730 to stop the format engine.

When the user presses the MENU button 307 of the input section 111 in the state where a list of format engines or a list of applications or data dealt with by a format engine is displayed (FIG. 8 through FIG. 16), the navigator 720 stops displaying the list.

Returning to FIG. 7, the combining section 730 is a module for combining the navigator 720 and a plurality of format engines. The combining section 730 includes a communication section 731, a state managing section 732, and a resource managing section 733.

The communication section 731 communicates between the navigator 720 and each format engine. Herein, communication refers to data sending and receiving of message data. Specifically, for making an instruction to a format engine, the navigator 720 sends a message indicating the instruction to the format engine via the communication section 731. For example, for making an instruction to stop the application which is being executed by the Java middleware 740, the navigator 720 sends a message indicating an instruction to stop to the Java middleware 740 via the communication section 731.

Since the navigator 720 and each format engine operate in different processes or threads, it is necessary to perform inter-process communication or inter-thread communication. In the case where the OS is Linux, the inter-process communication or the inter-thread communication can be realized by using the function of the OS 710 such as Socket, PIPE or the like.

If an individual communication method is determined between the navigator 720 and each format engine, the navigator 720 and each format engine need to have a plurality of types of communication methods installed thereon. This increases the code amount of all the programs and also the number of steps for development. The communication section 731 defines a common communication method usable by the navigator 720 and the format engines. Herein, the navigator 720 uses the Socket communication, but the common communication method may be realized by alternatively using another method such as FIFO or the like. The communication section 731 further defines a unique message format on the protocol of the Socket communication.

Figure 17:
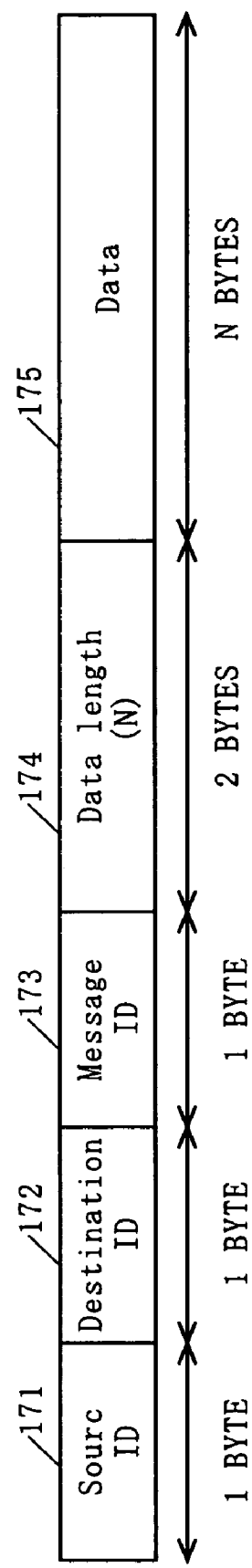
FIG. 17 shows an exemplary message format.

Next, with reference to FIG. 17 through FIG. 31, message formats will be described in detail. FIG. 17 is a diagram showing an exemplary message format. In FIG. 17, a message includes five fields. A Source ID field 171 stores information indicating a sub program which is a sending source of the message. A sub program is assigned a sub program ID for identifying the sub program (see FIG. 18 described later). The Source ID field 171 stores a sub program ID of the sub program which is the sending source of the message. Specifically, the Source ID field 171 stores a subprogram ID in 1 byte indicating the navigator 720 or a format engine which has sent the message. A subprogram ID will be described in detail later.

A Destination ID field 172 stores a sub program ID (SID) in 1 byte indicating a sub program which receives the message. A format engine ID will be described in detail later. A Message ID field 173 stores a message ID in 1 byte indicating the content of the message. A message ID will be described in detail later. A Data Length field 174 stores the length of data stored in a Data field 175 in 2 bytes. The Data field 175 stores detailed data corresponding to the message ID. The format of the data stored is defined in correspondence with the message ID.

FIG. 18 shows an exemplary table of the subprogram IDs stored in the Source ID field 171 and the Destination ID field 172 shown in FIG. 17. In the table shown in FIG. 18, the sub programs are shown in the left column, and the corresponding sub program IDs are shown in the right column. "ALL" in the left column refers to all the format engines. Here, sub program IDs are provided to the navigator 720, the combining section 730, the java middleware 740, the HTML browser 750, and the mailer 760 in addition to "ALL". Namely, these sub programs are sub programs for sending and receiving messages.

FIG. 19 shows an exemplary table of the message IDs stored in the Message ID field 173. In the table shown in FIG. 19, the messages are shown in the left column, the message IDs (MIDs) are shown in the middle column, and the format IDs of the data stored in the Data field 175 are shown in the right column. Hereinafter, each message will be described in detail.

In FIG. 19, in the second row from the top, a "format engine state request" message for requesting a format engine to notify the state of the format engine is shown. This is used when, for example, the navigator 720 wishes to know the operating state of each format engine. This message does not use the Data field 175.

In FIG. 19, in the third row from the top, a "format engine state response" message for responding to the "format engine state request" is shown. When, for example, the Java middleware 740 receives a "format engine state request" from the navigator 720, the Java middleware 740 uses the "format engine state response" message to notify the state of the format engine. This message stores the state of the format engine in the Data field 175. FIG. 20 shows an exemplary format of the Data field 175 in a format engine state response message. In the Data field 175, an operation ID is stored in 1 byte indicating the operating state of the format engine.

FIG. 21 shows an exemplary table indicating the correspondence between the operating states of a format engine and the operating state IDs. In FIG. 21, the operating states of the format engine are shown in the left column, the meanings of the operating states are shown in the middle column, and the operation IDs are shown in the right column. Here, three operating states of "during execution", "at a pause", and "at a stop" are defined. These operating states defined in FIG. 21 are common states which are common to all the format engines. Namely, the operating states included in messages are represented with the common states. The common state "during execution" means that a minimum resource possessed by the digital TV 100 is being used.

Returning to FIG. 19, in the fourth row from the top, a "format engine state changed" message is shown, which is used by a format engine to notify the navigator 720 or the other format engines that the state of the format engine has been changed. This message does not use the Data field 175.

In the fifth through seventh rows from the top, an "execute format engine" message, a "stop format engine" message, and a "pause format engine" message are shown, which are used by the navigator 720 or the like to instruct the other format engines to change the state to "during execution", "at a stop" and "at a pause" respectively. These messages do not use the Data field 175.

In the eighth row from the top, an "application/data list request" message for requesting a format engine to notify a list of applications executable by, or data displayable by, the format engine is shown. This is used when, for example, the navigator 720 wishes to know a list of applications executable by the Java middleware 740. This message does not use the Data field 175.

In the ninth row from the top, an "application/data list response" message for responding to the "application/data list request" is shown. When, for example, the Java middleware 740 receives an "application/data list request" from the navigator 720, the Java middleware 740 uses the "application/data list response" message to notify a list of applications executable by the Java middleware 740 and the states thereof. This message stores the application/data list in the Data field 175.

FIG. 22 shows an exemplary format of the Data field 175 in an application/data list response message. In FIG. 22, in an application number (shown as "APPLN NUMBER" in FIG. 22) field 2201, the number of applications executable by, or data displayable by, the format engine is stored in 1 byte.

Subsequent to the application number field 2201, the Data field 175 includes application information fields 2202. The number of the application information fields 2202 is equal to the number stored in the application number field 2201.

At the leading end of each application information field 2202, an application ID field 2203 is provided. In the application ID field 2203, an application ID for identifying an executable application or displayable data in 1 byte. This application ID is assigned by the format engine.

Subsequent thereto, the application information field 2202 includes an application state (shown as "APPLN STATE" in FIG. 22) ID field 2204. In the application state ID field 2204, an application state ID indicating the state of the application or data is stored in 1 byte. In this structure example, the correspondence between the application states and the application state IDs is the same as the correspondence shown in FIG. 21, i.e., the correspondence between the operating states of the format engine and the operating state IDs.

Subsequent thereto, the application information field 2202 includes an application name length (shown as "APPLN NAME LENGTH" in FIG. 22) field 2205. In the application name length field 2205, the length of the name of the application or data is stored.

At the trailing end of each application information field 2202, an application name (shown as "APPLN NAME" in FIG. 22) field 2206 is provided. In the application name field 2206, an application name having the length specified by the data stored in the application name length field 2205 is stored.

Returning to FIG. 19, in the tenth row from the top, an "application/data list changed" message is shown, which is used by a format engine to notify the navigator 720 or the other format engines that the state of the application which is being executed or the data which is being displayed has been changed. This message does not use the Data field 175.

In the 11th through 13th rows from the top, an "execute application/data" message, a "stop application/data" message, and a "pause application/data" message are shown, which are used by the navigator 720 or the like to instruct the other format engines to change the state to "during execution", "at a stop" and "at a pause" respectively. These messages store an application ID for identifying the application or data which is the target of the state change in the Data field 175.

FIG. 23 shows an exemplary format of the Data field 175 in the "execute application/data" message, the "stop application/data" message, and the "pause application/data" message. In the Data field 175, an application ID (shown as "APPLN ID" in FIG. 23) for identifying the application or data is stored in 1 byte. The application ID uses the value which is returned by the format engine in the "application/data list response" message.

Returning to FIG. 19, in the 14 throw from the top, a "private" message is shown, which is used for sending or receiving unique data between the navigation 720 and the other format engines. The Data field 175 is used in the state where unique data is buried in a format uniquely defined between the navigation 720 and the other format engines.

In this structure example, the operating states defined for a format engine and the operating states defined for the application/data are the same, but they may be different. The messages and the message formats described in this structure example are exemplary. Alternatively, for example, other messages may be included, other formats may be used, or a part of, or the entirety of, the messages described in this structure example may not be used. An important point is that the combining section 730 or an equivalent element thereto defines a common state of a format engine and a common state of application/data which are used between the navigator 720 and a plurality of format engines and thus provides common communication means.

Figure 24:
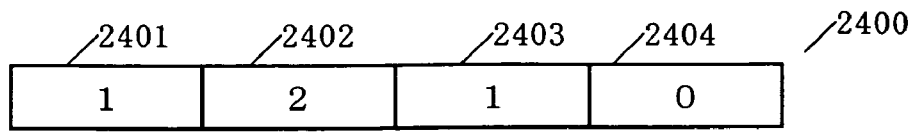
FIG. 24 is a diagram showing an specific example of a "format engine state request" message.
Figure 25:
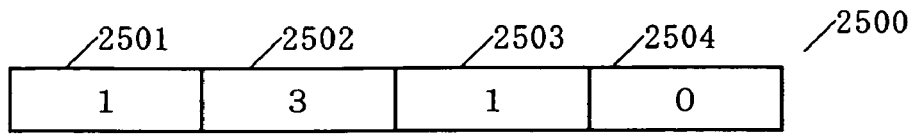
FIG. 25 is a diagram showing an specific example of a "format engine state request" message.
Figure 26:
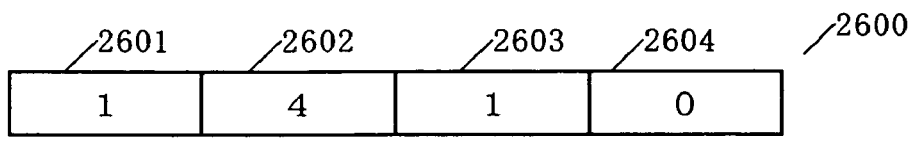
FIG. 26 is a diagram showing an specific example of a "format engine state request" message.

Next, specific examples of the messages corresponding to the operations of the navigator 720 will be described. For displaying a list of format engines as shown in FIG. 8, the navigator 720 passes three "format engine state request" messages shown in FIG. 24 through FIG. 26 to the combining section 730. FIG. 24 through FIG. 26 show specific examples of the "format engine state request" message. A message 2400 shown in FIG. 24 is a "format engine state request" from the navigator 720 to the Java middleware 740. In a Source ID field 2401, "1" is stored as the sub program ID indicating the navigator 720 (see FIG. 18). In a Destination ID field 2402, "2" is stored as the sub program ID indicating the Java middleware 740 (see FIG. 18). In a Message ID field 2403, "1" indicating the "format engine state request" is stored (see FIG. 19). In a Data Length field 2404, "0" is stored as the data length. A message 2500 shown in FIG. 25 is a "format engine state request" from the navigator 720 to the HTML browser 750. The message 2400 and the message 2500 are different only in that in the message 2500, ID "3" indicating the HTML browser 750 is stored in a Destination ID field 2502 (see FIG. 18). The messages 2400 and 2500 are the same on the other points. A message 2600 shown in FIG. 26 is a "format engine state request" from the navigator 720 to the mailer 760. The message 2400 and the message 2600 are different only in that in the message 2600, ID "4" indicating the mailer 760 is stored in a Destination ID field 2602 (see FIG. 18). The messages 2400 and 2600 are the same on the other points.

Figure 27:
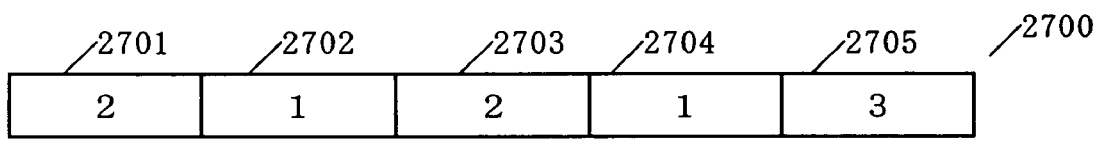
FIG. 27 is a diagram showing an specific example of a "format engine state response" message.
Figure 28:
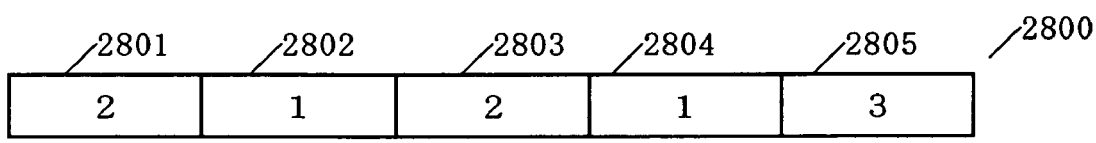
FIG. 28 is a diagram showing an specific example of a "format engine state response" message.
Figure 29:
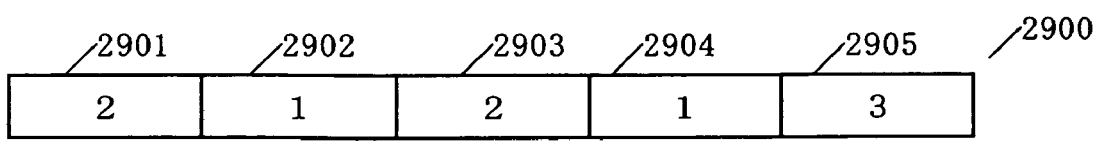
FIG. 29 is a diagram showing an specific example of a "format engine state response" message.

After the "format engine state request" messages are sent, the navigator 720 receives three "format engine state response" messages shown in FIG. 27 through FIG. 29 from the combining section 730. FIG. 27 through FIG. 29 show specific examples of the "format engine state response" message. A message 2700 is a "format engine state response" from the Java middleware 740 to the navigator 720. In a Source ID field 2701, sub program ID "2" indicating the Java middleware 740 is stored (see FIG. 18). In a Destination ID field 2702, "1" is stored as the sub program ID indicating the navigator 720 (see FIG. 18). In a Message ID field 2703, "2" is stored as the message ID indicating the "format engine state response" (see FIG. 19). In a Data Length field 2704, the data length "1" is stored. In a Data field 2705, "3" is stored as the operating state ID indicating "at a stop" (see FIG. 21). A message 2800 is a "format engine state response" from the HTML browser 750 to the navigator 720. The message 2700 and the message 2800 are different only in that in the message 2800, "3" is stored as the sub program ID indicating the HTML browser 750 in a Destination ID field 2801. The messages 2700 and 2800 are the same on the other points. A message 2900 is a "format engine state response" from the mailer 760 to the navigator 720. The message 2700 and the message 2900 are different only in that in the message 2900, "4" is stored as the sub program ID indicating the mailer 760 in a Source ID field 2901, referring to FIG. 18. The messages 2700 and 2900 are the same on the other points. By sending the three "format engine state request" messages to the combining section 730 and receiving the three "format engine state response" messages from the combining section 730 as described above, the navigator 720 can display a list of format engines shown in FIG. 8.

Figure 30:
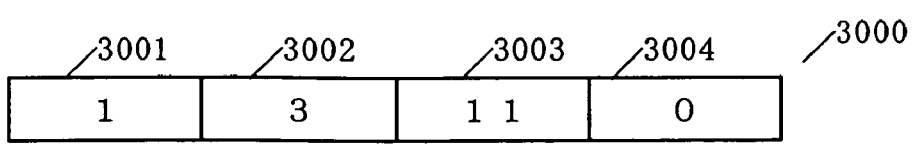
FIG. 30 is a diagram showing an specific example of an "application/data list request" message.

Next, a case where the navigator 720 displays a list of data displayable by the HTML browser 750 as shown in FIG. 15 will be described. In this case, the navigator 720 passes an "application/data list request" message shown in FIG. 30 to the combining section 730. FIG. 30 shows a specific example of the "application/data list request" message. A message 3000 shown in FIG. 30 is an "application/data list request" from the navigator 720 to the HTML browser 750. In a Source ID field 3001, "1" is stored as the sub program ID indicating the navigator 720 (see FIG. 18). In a Destination ID field 3002, "3" is stored as the sub program ID indicating the HTML browser 750 (see FIG. 18). In a Message ID field 3003, "11" is stored as the message ID indicating the "application/data list request" (see FIG. 19). Ina Data Length field 3004, "0" indicating the data length is stored.

Figure 31:
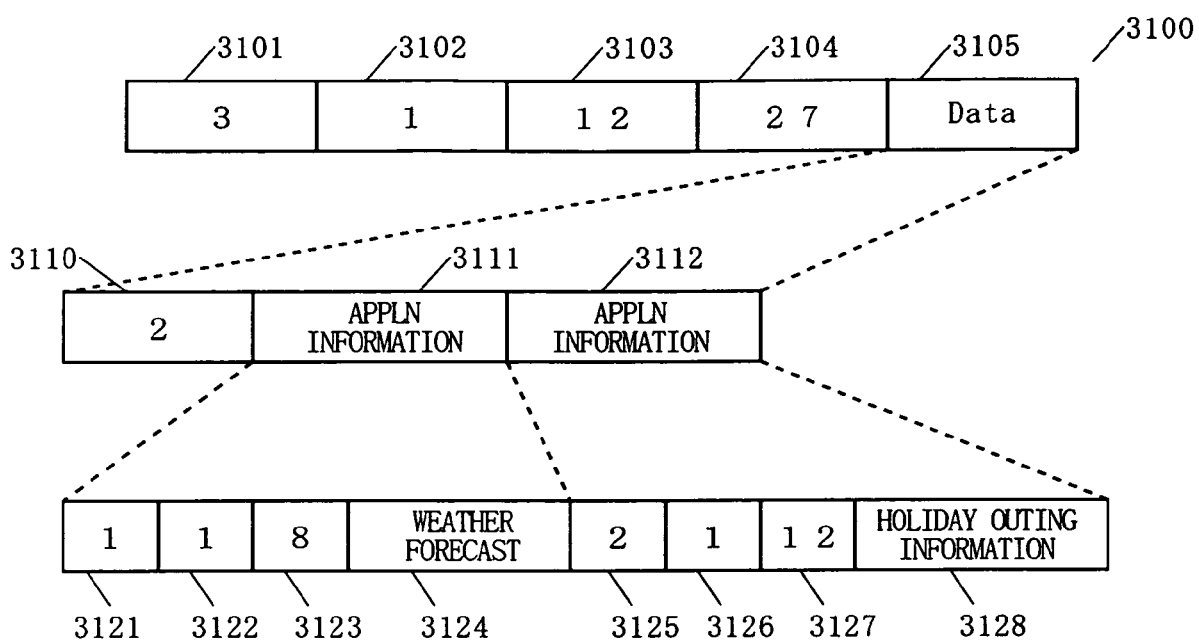
FIG. 31 is a diagram showing an specific example of an "application/data list response" message.

After the "application/data list request" messages are sent, the navigator 720 receives three "application/data list response" messages shown in FIG. 31 from the combining section 730. FIG. 31 shows a specific example of the "application/data list response" message. A message 3100 shown in FIG. 31 is an "application/data list response" from the HTML browser 750 to the navigator 720. In a Source ID field 3101, "3" is stored as the sub program ID indicating the HTML browser 750 (see FIG. 18). In a Destination ID field 3102, "1" is stored as the sub program ID indicating the navigator 720 (see FIG. 18). In a Message ID field 3103, "12" is stored as the message ID indicating the "application/data list response" (see FIG. 19). In a Data Length field 3104, "27" indicating the data length is stored. In an application number field 3110, "2" indicating the number of pieces of data displayable by the HTML browser 750 is stored.

In FIG. 31, the Data field 3105 includes an application information (shown as "APPLN information" in FIG. 31) field 3111 for the first data and an application information (shown as "APPLN information" in FIG. 31) field 3112 for the second data. In an application ID field 3121, "1" is stored as the application ID indicating the first data. In an application name field 3124, "weather forecast" indicating the name of the data is stored. Here, each character of "weather forecast" is represented by a 2-byte code, and as a result, the application name length is 4 characters×2 bytes=8 bytes. In an application ID field 3125, "2" is stored as the application ID indicating the second data. In an application state ID field 3126, "1" is stored as the application state ID indicating "during execution". In an application name length field 3127, "12" indicating the application name length is stored. In an application name field 3128, "holiday outing information" indicating the name of the data is stored. Each character of "holiday outing information" is represented by a 2-byte code, and as a result, the application name length is 6 characters×2 bytes=12 bytes.

The description on the message formats is now completed.

Returning to FIG. 7, the communication section 731, when receiving a message from the navigator 720 or a format engine, examines the Destination ID field included in the message and delivers the message to the corresponding format engine or the navigator 720. When, for example, "0" is stored in the Destination ID field, the communication section 731 sends the message to all the format engines and the navigator 720 (see FIG. 18). Accordingly, when wishing to terminate all the format engines, the navigator 720 can send a message having "01" in the Destination ID field and "5" as the message ID to the communication section 731.

The state managing section 732 holds the operating state of a format engine and the operating state of the application executable by, and data displayable by, the format engine. Specifically, the state managing section 732 stores such information in the secondary memory section 108 or the primary memory section 109.

FIG. 32 through FIG. 34 show examples of the information held by the state managing section 732. FIG. 32 shows information on the format engines in a table form. In FIG. 32, format engine IDs for identifying the respective format engines are shown in the leftmost column. Here, the format engine ID of each format engine is the same as the sub program ID defined in FIG. 18. In the second column from the left, the names of the format engines are shown. In the third column from the left, the operating state IDs indicating the operating states of the respective format engines are shown. In the table shown in FIG. 32, an operating state ID is represented by a value defined in FIG. 21. In the rightmost column, pointers are shown indicating the storage positions of information on the applications executable by, or data displayable by, the respective format engines. For a format engine which does not have an executable application or displayable data, "NULL" is shown in this column.

In the table shown in FIG. 32, in the second row from the top, information on the Java middleware 740 is shown. In more detail, the format engine ID "2", the name "Java middleware", the operating state ID "3" indicating "at a stop", and the pointer of the information on the executable application "0x5678" in the hexadecimal representation are shown. In the third row from the top, information on the HTML browser 750 is shown. In more detail, the format engine ID "3", the name "HTML browser", the operating state ID "3" indicating "at a stop", and the pointer of the information on the displayable data "0x7162" in the hexadecimal representation are shown. In the fourth row from the top, information on the mailer 760 is shown. In more detail, the format engine ID "4", the name "mailer", and the operating state ID "3" indicating "at a stop" are shown. Since there is no information on the application/data, "NULL" is shown in the column of the pointer.

FIG. 33 shows information on the applications executable by the Java middleware 740 in a table form. This information is stored in the primary memory section 109 from the storage position 0x5678. In FIG. 33, in the left column, the application IDs assigned to the respective applications are shown. In the middle column, the names of the applications are shown. In the right column, the application state IDs are shown. In the second row from the top, the application ID "1", the name "EPG", and the application state ID "3" indicating "at a stop" are shown. In the third row from the top, the application ID "2", the name "card game", and the application state ID "3" indicating "at a stop" are shown.

FIG. 34 shows information on the data displayable by the HTML browser 750 in a table form. This information is stored in the primary memory section 109 from the storage position 0x7162. In FIG. 34, in the left column, the data IDs assigned to the respective data are shown. In the middle column, the names of the data are shown. In the right column, the application state IDs indicating the states of the respective data are shown. In the second row from the top, the application ID "1", the name "weather forecast", and the application state ID "1" indicating "during execution" are shown. In the third row from the top, the application ID "2", the name "holiday outing information", and the application state ID "1" indicating "during execution" are shown.

Returning to FIG. 7, the communication section 731 delivers the message in accordance with the data stored in the Destination ID field included in the message as described above. Here, the communication section 731 may deliver a "format engine state request" message and an "application/data list request" message to the state managing section 732, ignoring the Destination ID field. The state managing section 732 holds the state of each format engine, and therefore can generate a "format engine state request" message, a "format engine state response" message, or an "application/data list response" instead of each format engine. By the state managing section 732 generating these messages, inter-process communication and inter-thread communication can be omitted and therefore response in a short time can be realized.

The state managing section 732 always holds the latest operating state of a format engine. For this, the state managing section 732 obtains information from each format engine when necessary. In more detail, when the digital TV 100 is turned on, the state managing section 732 sends a "format engine state request" message to each format engine. The state managing section 732 receives a "format engine state response" message from each format engine, and stores the operating state of each format engine in the primary memory section 109 based on the received message. The state managing section 732 also sends an "application/data list request" message to each format engine. The state managing section 732 receives an "application/data list response" message from each format engine, and stores the application state of each application and data in the primary memory section 109 based on the received message.

Furthermore, when receiving a "format engine state changed" message from a format engine, the state managing section 732 sends a "format engine state request" message to the format engine. The state managing section 732 receives a "format engine state response" message from the format engine to which the "format engine state request" message was sent, and stores the operating state of the format engine in the primary memory section 109 based on the received message.

Next, with reference to FIG. 35 through FIG. 38, sending and receiving of messages when the operating state of the mailer 760 is changed will be described. FIG. 35 shows an example of a "format engine state changed" message sent from the mailer 760. A message 3500 shown in FIG. 35 is an example of the "format engine state changed" message from the mailer 760 to all the format engines. In the message 3500, in a Source ID field 3501, "4" is stored as the sub program ID indicating the mailer 760 (see FIG. 18). In a Destination ID field 3502, "0" is stored as the sub program ID indicating all the format engines (see FIG. 18). In a Message ID field 3503, "3" is stored as the operating state ID indicating the "format engine state changed" (see FIG. 19). In a Data Length field 3504, "0" indicating the data length is stored.

When receiving the message 3500 shown in FIG. 35, the state managing section 732 sends a message 3600 shown in FIG. 36 to the mailer 760. FIG. 36 shows an example of the message sent by the state managing section 732. In the message 3600 shown in FIG. 36, in a Source ID field 3601, "5" is stored as the sub program ID indicating the combining section 730 (see FIG. 18). In a Destination ID field 3602, "4" is stored as the sub program ID indicating the mailer 760 (see FIG. 18). In a Message ID field 3603, "1" is stored as the message ID indicating "format engine state request" (see FIG. 19). In a Data Length field 3604, "0" indicating the data length is stored.

When receiving the message 3600 shown in FIG. 36, the mailer 760 sends a message 3700 shown in FIG. 37 to the state managing section 732 in the combining section 730. FIG. 37 shows an example of the message sent by the mailer 760. In the message 3700 shown in FIG. 37, in a Source ID field 3701, "4" is stored as the sub program ID indicating the mailer 760 (see FIG. 18). In a Destination ID field 3702, "5" is stored as the sub program ID indicating the combining section 730 (see FIG. 18). In a Message ID field 3703, "2" is stored as the message ID indicating "format engine state response" (see FIG. 19). In a Data Length field 3704, "1" indicating the data length is stored. In a Data field 3705, "1" is stored as the operation ID indicating "during execution" (see FIG. 21).

As a result of the message 3700 shown in FIG. 37 being sent to the state managing section 732 in the combining section 730, the state managing section 732 can learn that the state of the mailer 760 has been changed to "during execution". If the state before receipt of the message 3700 is as shown in FIG. 32, the state managing section 732 updates the information stored in the primary memory section 109 as shown in FIG. 38. FIG. 38 shows a state after the state in FIG. 32 is changed. In FIG. 38, the operating state ID of the mailer 760 is "1".

When receiving an "application/data list changed" message from a format engine, the state managing section 732 obtains the latest state as in the case of the "format engine state changed" message. In more detail, the state managing section 732 sends an "application/data list request" message to the format engine which has sent the "format engine state changed" message. The state managing section 732 receives an "application/data list response" message from the format engine, and stores the application state of each application and data in the primary memory section 109 based on the received message.

In this manner, the state managing section 732 can hold the latest information of each format engine, applications executed by each format engine, and data displayed by each format engine.

Next, with reference to FIG. 39 through FIG. 44, the resource managing section 733 will be described. The resource managing section 733 is an element necessary for performing the above-described second operation example and is not necessary for performing the first operation example.

Figure 39:
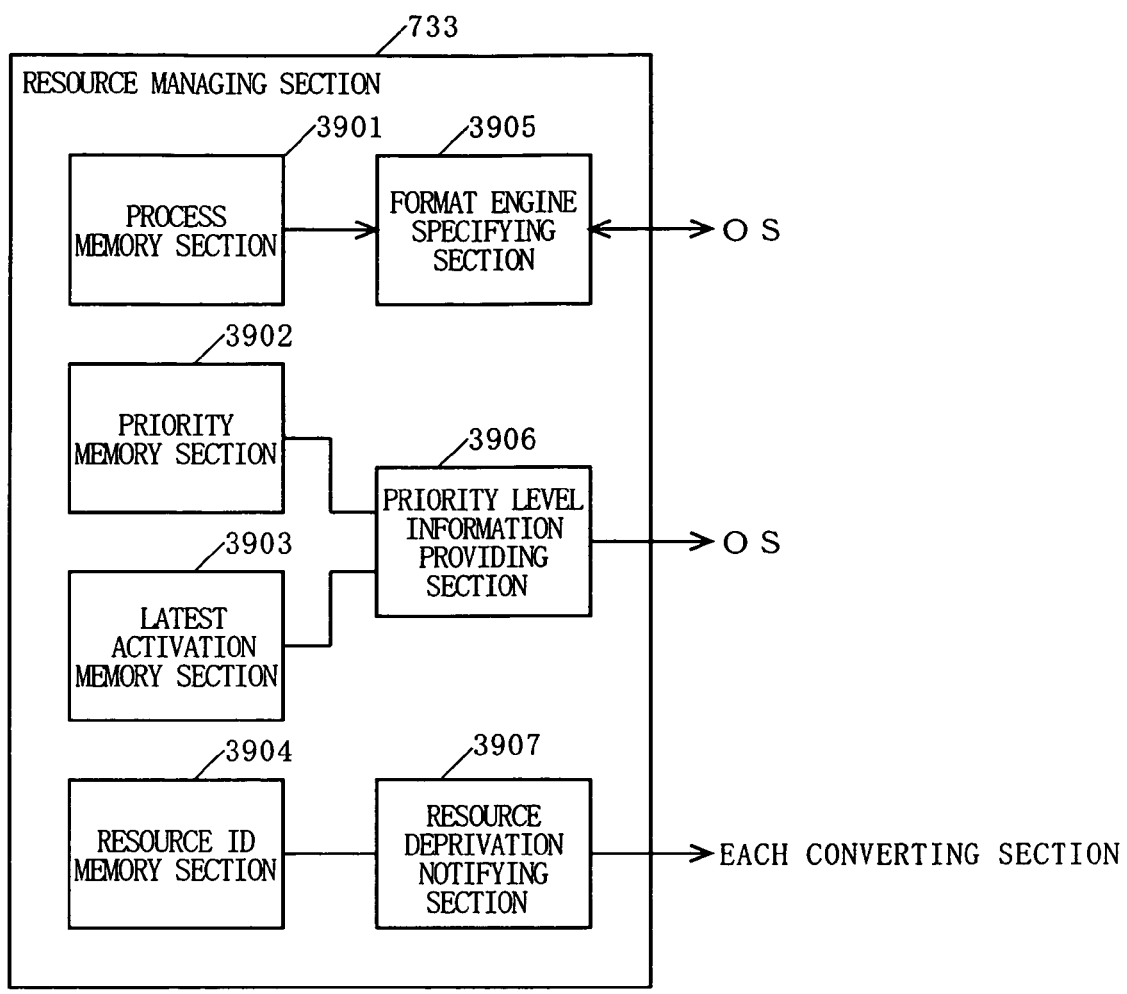
FIG. 39 is a block diagram showing an internal structure of a resource managing section 733.

The resource managing section 733 provides information for solving competition occurring among a plurality of format engines. FIG. 39 is a block diagram showing an internal structure of the resource managing section 733. In FIG. 39, the resource managing section 733 includes a process memory section 3901, a priority level memory section 3902, a latest activation memory section 3903, a resource ID memory section 3904, a format engine specifying section 3905, a priority level information providing section 3906, and a resource deprivation notifying section 3907.

The process memory section 3901 is implemented by the secondary memory section 108 or the primary memory section 109, and holds information on the process or thread which is executing each format engine. Herein, each format engine is implemented on a process.

FIG. 40 shows an example of the information stored in the process memory section 3901. In FIG. 40, the process memory section 3901 stores the process IDs executing the respective format engines in a table form. In FIG. 40, in the left column, format engine IDs (FIDs) are shown. In the right column, process IDs for identifying processes executing the respective format engines are shown. A process ID is an ID of a process generated by the kernel 711 of the OS 710. The resource managing section 733 receives a process ID from the kernel 711 and stores the process ID in the process memory section 3901. In the second row from the top, "2" as the format engine ID of the Java middleware 740 (FIG. 18) and "100" as the process ID of the process executing the Java middleware 740 are shown. In the third row from the top, "3" as the format engine ID of the HTML browser 750 (FIG. 18) and "110" as the process ID of the process executing the HTML browser 750 are shown. In the fourth row from the top, "4" as the format engine ID of the mailer 760 (FIG. 18) and "120" as the process ID of the process executing the mailer 760 are shown.

Returning to FIG. 39, the priority level memory section 3902 is implemented by the secondary memory section 108, the primary memory section 109, or the ROM 110. The priority level memory section 3902 stores the priority level of each format engine.

FIG. 41 shown an example of the information stored in the priority level memory section 3902. In FIG. 41, the priority level memory section 3902 stores the priority level of each format engine in a table form. In FIG. 41, in the left column, format engine IDs (FIDs) are shown. In the right column, the priority levels of the respective format engines are shown. Here, a larger value of the priority level indicates a higher priority level. In the second row from the top, "2" as the format engine ID of the Java middleware and "2" as the corresponding priority level are shown. In the third row from the top, "3" as the format engine ID of the HTML browser and "1" as the corresponding priority level are shown. In the fourth row from the top, "4" as the format engine ID of the mailer 760 (FIG. 18) and "4" as the corresponding priority level are shown.

Returning to FIG. 39, the latest activation memory section 3903 is implemented by the secondary memory section 108 or the primary memory section 109. The latest activation memory section 3903 stores the format engine ID described in the Destination ID field included in an "execute format engine" message or an "execute application/data" message sent from the navigator 720. Namely, the latest activation memory section 3903 stores the latest activation information. Latest activation information is information indicating the latest format engine requested by the user to execute.

FIG. 42 shows an example of the information stored in the latest activation memory section 3903. In FIG. 42, the latest activation memory section 3903 stores "4" as the format engine ID of the mailer 760. A case where the navigator 720 sends an "execute format engine" message or an "execute application/data" message to the HTML browser 750 via the combining section 730 in the state shown in FIG. 42 will be discussed. In this case, the resource managing section 733 updates the information stored in the latest activation memory section 3903 to "3", which is the format engine ID indicating the HTML browser 750.

Returning to FIG. 39, the resource ID memory section 3904 is implemented by the secondary memory section 108 or the ROM 110. The resource ID memory section 3904 stores a resource ID (RID) for identifying the resource which is a target of management of the resource managing section 733.

FIG. 43 shows an example of the information stored in the resource ID memory section 3904. In FIG. 43, the resource ID memory section 3904 stores resource IDs in a table form. In FIG. 43, in the left column, the resource IDs are shown. In the right column, the names of the corresponding resources are shown. In FIG. 43, the tuner 101, the TS decoder 103, the audio decoder 104, the video decoder 106, and the network interface 112 are defined as the resources which are the targets of management. The resource IDs are assigned to these resources. FIG. 44 shows an example of the definitions of the resource IDs described in the C language, which is a programming language.

Returning to FIG. 39, the format engine specifying section 3905 specifies the format engine requesting for a resource. Each format engine uses the function provided by the library 712 of the OS 710. For example, the tuner Lib 7121 for controlling the tuner 101 is called up such that tuning is performed to a specific frequency band. In order to realize this, a format engine calls up a function prepared by the tuner Lib 7121. When a format engine makes a request, i.e., when a format engine calls up a function, the tuner Lib 7121 inquires the format engine specifying section 3905 which format engine has called up the function. In response to this inquiry, the format engine specifying section 3905 specifies the process which has called up the function. The format engine specifying section 3905 refers to the process ID of the specified process, and a set of the format engine ID and the process ID stored in the process memory section 3901, to specify the format engine which has called up the function.

The priority level information providing section 3906 provides the library 712 with the priority levels of the format engines stored in the priority level memory section 3902 and the information on the latest format engine activated by the user stored in the latest activation memory section 3903. Using the format engine specifying section 3905 and the priority level information providing section 3906, the library 712 can determine to which format engine the resource is to be provided. Hereinafter, this will be described specifically.

For example, it is assumed that the tuner Lib 7121 is called up by the Java middleware 740 and is performing tuning. The tuner Lib 7121 knows that the Java middleware 740 is currently-using the tuner 101, using the format engine specifying section 3905. A case where the mailer 760 calls up the tuner Lib 7121 in an attempt to perform tuning to another frequency band in this state will be discussed. The tuner Lib 7121 learns that the mailer 760 uses the function of the tuner 101, using the format engine specifying section 3905. Next, the tuner Lib 7121 obtains information on the latest format engine activated from the priority level information providing section 3906. When the latest format engine activated is the mailer 760, the tuner Lib 7121 permits the mailer 760 to use the tuner 101. When the latest format engine activated is the Java middleware 740, the tuner Lib 7121 refuses the mailer 760 use of the tuner 101. When the latest format engine activated is neither the mailer 760 nor the Java middleware 740, the tuner Lib 7121 obtains the priority levels of the mailer 760 and the Java middleware 740 from the priority level information providing section 3906. When the priority level of the mailer 760 is higher than the priority level of the Java middleware 740, the tuner Lib 7121 permits the mailer 760 to use the tuner 110. When the priority level of the mailer 760 is lower than the priority level of the Java middleware 740, the tuner Lib 7121 refuses the mailer 760 use of the tuner 101. In this manner, the library 712 can determine to which format engine the resource is to be provided.

How the library 712 uses the information on the latest format engine activated or the priority level information is arbitrary, and the manner described above is merely one example. Any rule can be used for determining which format engine is to be permitted to use the resource. For example, the library 712 may use only the priority level information to determine which format engine is to be permitted to use the resource. Alternatively, the library 712 may permit the format engine which has been using the resource. Conversely, the library 712 may permit the latest format engine which made the call to use the resource.

In FIG. 39, the resource deprivation notifying section 3907 notifies the format engine which was not permitted to use the resource that the resource has been deprived. For example, a case where the mailer 760 calls up the tuner Lib 7121 in an attempt to use the tuner 101 when the Java middleware 740 has called up the tuner Lib 7121 and is using the tuner 101 will be discussed. If the tuner lib 7121 permits the mailer 760 to use the tuner 101, the tuning is performed to a frequency band which is different from the frequency band desired by the Java middleware 740. Therefore, there is a possibility that the application executed on the Java middleware 740 may not possibly continue operating normally. In order to prevent this, the tuner Lib 7121 asks the resource deprivation notifying section 3907 to notify the Java middleware 740 that the tuner resource has been deprived. For asking this, the format engine ID of the format engine which is to be notified of the deprivation of the resource and the resource ID are passed to the resource deprivation notifying section 3907. The library 712 can learn that the format engine ID by obtaining the format engine ID from the format engine specifying section 3905. The library 712 knows that the resource ID in advance by referring to the resource ID memory section 3904. When receiving the format engine ID and the resource ID, the resource deprivation notifying section 3907 notifies the format engine indicated by the format engine ID that the resource has been deprived. The operation of the format engine receiving the notice depends on each format engine. For a format engine which has difficulty continuing the operation, the operating state thereof may be changed from "during execution" to "at a stop" or "at a pause". The description on the resource managing section 733 is now completed.

Next, with reference to FIG. 45 through FIG. 71, each format engine will be described in detail.

First, with reference to FIG. 45 through FIG. 51, the Java middleware 740 will be described. The Java middleware 740 is a format engine for executing a Java application. In this structure example, DVB-MHP1.0 Standard (officially, ETSI TS 101 812 DVB-MHP Specification V1.0.2) will be described as a specific example. Alternatively, Java middleware operating in accordance with the other specifications, such as an applet viewer or the like, may be used. In this structure example, the detailed operation of the Java middleware 740 includes the contents of the DVB-MHP1.0 Standard. Accordingly, only the overview will be described here.

FIG. 45 is a block diagram showing a structure of the Java middleware 740. The Java middleware 740 includes a Java virtual machine (VM) 4501, a class library 4502, and an application manager 4503.

The Java VM 4501 is a Java virtual machine for analyzing and executing applications described in the Java (trademark) language one by one. A program described in the Java language is compiled to an intermediate code, called a byte code, which does not depend on hardware. A Java virtual machine is an interpreter for executing the byte code. Some Java virtual machines first translate the byte code into an execution form which is understandable by the CPU 113 and then pass the resultant code to the CPU 113 for execution. A part of, or the entirety of, the class library 4502 and the application manager 4503 is described in the Java language and executed by the Java VM 4501. In this structure example, the kernel 711 of the OS 710 specifies the application manager 4503 as the Java application to be executed first. The details of the Java language are explained in many books including "Java Language Specification (ISBN 0-201-63451-1)" and the like, and thus will not be described herein. The detailed operation or the like of the Java VM itself is explained in many books including "Java Virtual Machine Specification (ISBN 0-201-63451-X)" and the like, and thus will not be described herein.

The class library 4502 is an aggregate of a plurality of Java class libraries stored in the ROM 110. Most of the plurality of Java class libraries provide a Java API which can be called up by a Java application corresponding to the function provided by the library 712 of the OS 710. As a result, the Java application can use a function possessed by the digital TV 100. According to, for example, the DVB-MHP1.0 Standard, the org.davic.mpeg.tuning package is defined as an API for using the tuner 101, such that the Java application can control the tuner 101.

The application manager 4503 downloads and executes a Java application multiplexed in the broadcast waves. According to the MHP1.0 Standard, a table, called an AIT, defining Java applications is multiplexed and transmitted in the broadcast waves. The application manager 4503 first downloads the AIT. The AIT includes, for example, information for downloading applications, and names and control information of the applications.

FIG. 46 schematically shows a main part of an AIT. In FIG. 46, in the leftmost column, Java application IDs are shown. In the second column from the left, control information of the Java applications is shown. The control information includes "autostart", "present", "kill" and the like. "autostart" means that the Java middleware 740 executes the corresponding Java application immediately and automatically. "present" means that automatic execution is not performed. "kill" means that the Java application is stopped. In the third column from the left, the application names of the Java applications are shown. In the rightmost column, the priority levels of the Java applications are shown. When competition for a resource occurs among the Java applications, the resource is given, with priority, to the Java application having the highest priority level. A larger value of the priority level indicates a higher priority level.

In FIG. 46, in the second and third rows from the top, sets of information on the Java applications are shown. For the Java application defined in the second row from the top, the Java application ID is "1", the control information is "autostart", the application name is "EPG", and the priority level is "64". For the Java application defined in the third row from the top, the Java application ID is "2", the control information is "present", the application name is "card game", and the priority level is "32".

When receiving the AIT, the application manager 4503 downloads and executes the Java application having the application name "EPG". Here, a Java application defined by the DVG-MHP1.0 Standard has four operating states of "Loaded", "Paused", "Active" and "Destroyed".

FIG. 47 is a state transition diagram showing the four operating states of a Java application and transitions between the operating states. When the application manager 4503 downloads a Java application and the Java application is stored in the primary memory section 109, the operating state of the Java application becomes "Loaded". A transition from this operating state to another operating state is realized by the application manager 4503 calling up methods "initXlet", "startXlet", "pauseXlet" and "destroyxlet" included in the downloaded Java application.

When the application manager 4503 calls up the "initXlet" method in the operating state "Loaded", the operating state of the Java application transits to "Paused". When the application manager 4503 calls up the "startXlet" method in the operating state "Paused", the operating state of the Java application transits to "Active". When the application manager 4503 calls up the "pauseXlet" method in the operating state "Active", the operating state of the Java application transits to "Paused". In any operating state, when the application manager 4503 calls up the "destroyXlet" method, the operating state of the Java application transits to "Destroyed".

The application manager 4503 performs a state transition of the Java application in accordance with three instructions of (1) control information in the AIT in the broadcast waves, (2) an instruction of the Java application, and (3) an instruction sent by the navigator 720 via the combining section 730.

When the control information in the AIT is "autostart", the application manager 4503 downloads a Java application and then calls up the "initXlet" method and the "startXlet" method to transit the state to the "Active" state. The AIT changes as the time passes. For example, it is assumed that the AIT changes from the state in FIG. 46 to the state in FIG. 48. In FIG. 48, the control information of the application of the name "EPG" has been changed from "autostart" to "kill". At this point, the application manager 4503 calls up the "destroyXlet" method for the Java application to transit the state to the "Destroyed" state.

A Java application can transit the state of its own or the application state of another Java application. According to the DVB-MHP1.0 Standard, when a Java application wishes to transit the state of its own, the Java application calls up either one of the "notifyDestroyed", "notifyPaused" and "resumeRequest" methods. For a transition to the "Destroyed" state, the Java application calls up "notifyDestroyed". For a transition to the "Active" state, the Java application calls up the "resumeRequest" method. For a transition to the "Paused" state, the Java application calls up "notifyPaused". For transiting the state of another Java application, the Java application uses the method defined by the org.dvb.application package defined by the DVB-MHP1.0 Standard. In more detail, the Java application first specifies another Java application by the application ID and then calls up the method defined by the org.dvb.application package to transit the state of the specified Java application. Herein, this will not be described in detail.

Finally, a method for transiting the state of a Java application by an instruction from the navigator 720 will be described. The navigator 720 makes an instruction based on the common state, i.e., the operating state of the format engine defined by the combining section 730 or the operating state of an application executable by the format engine. This common state is different from the individual state, i.e., the operating state of the Java application executed by the application manager 4503 of the Java middleware 740. The gap between the common state and the individual state is buried by the first converting section 741. The first converting section 741 converts an instruction from the navigator 720 into an operating state dealt with by the Java middleware 740. As a result, the application manager 4503 receives an instruction equivalent to the control information in the AIT or the instruction from the Java application, and can transit the operating state of the Java application.

The first converting section 741 converts a message from the combining section 730 and conveys the message to the Java middleware 740, and also converts information on the Java middleware 740 and conveys the information to the combining section 730. In this manner, the first converting section 741 adapts the operation of the Java middleware 740 to the state defined by the combining section 730. So far, various messages have been described as being delivered to the Java middleware 740 via the combining section 730. Precisely, these messages are sent to the first converting section 741, not the Java middleware 740. When the first converting section 741 receives a "format engine state request" message from the combining section 730, the first converting section 741 determines the state of the Java middleware 740 based on the states of all the Java applications executable by the Java middleware 740. Then, the first converting section 741 creates a "format engine state response" message and sends the message to the combining section 730.

FIG. 49 is an exemplary conversion table indicating the correspondence between the operating states of all the Java applications executable by the Java middleware 740 and the operating states of the Java middleware 740. In FIG. 49, in the left column, the operating states of all the Java applications executable by the Java middleware 740 are shown. In the right column, the corresponding operating states of the Java middleware 740 are shown. The states of the Java middleware 740 are the states defined by the combining section 730, i.e., the common states. Specifically, the states of the Java middleware 740 are the three operating states of "during execution", "at a pause", and "at a stop" shown in FIG. 21. In the second through fourth rows from the top, the operating states of all the Java applications executable by the Java middleware 740 which correspond to these three operating states are defined.

First, in the second row from the top, with a case in which at least one of all the Java applications is in the operating state "Active", "during execution" is associated as the operating state of the Java middleware 740. Such a correspondence is defined because a Java application in the "Active" state generally has a high possibility of using a minimum resource.

In the third row from the top, with a case in which no Java application is in the "Active" state and at least one of all the Java applications is in the "Paused" state, "at a pause" is associated as the operating state of the Java middleware 740. According to the DVB-MHP1.0 Standard, a Java application in the "Paused" state should release resources other than the minimum necessary resource. Therefore, such a correspondence is defined.

In the fourth row from the top, "at a stop" is associated with cases other than the cases shown in the second and third rows from the top. The cases other than the cases shown in the second and third rows from the top refer to, specifically, cases in which all the Java applications are in the operating state "Loaded" or "Destroyed", or in an operating state where even reading has not been completed. In such cases, no Java application code has been executed, and therefore it is appropriate to associate such cases with "at a stop" where no resource is used.

As described above, the application manager 4503 of the Java middleware 740 transits the state of a Java application by a change in the control information in the AIT or an instruction from a Java application. The first converting section 741 receives a notice of state change from the application manager 4503. In the case where the common state of the Java middleware 740 is changed as a result, the first converting section 741 refers to the conversion table in FIG. 49 to generate a "format engine state changed" message and notifies the change to the combining section 730. In this case, the first converting section 741 stores the common state of the Java middleware in the primary memory section 109. The first converting section 741 compares the stored common state with the common state of the Java middleware after the state of the Java application is changed. Alternatively, the first converting section 741 may generate a "format engine state changed" message and notify the change to the combining section 730 whenever being notified of the state change of a Java application by the application manager 4503.

When receiving an "execute format engine" message from the combining section 730, the first converting section 741 instructs the application manager 4503 to transit the state of a predetermined Java application defined by the AIT to the "Active" state. A predetermined Java application may be all the Java applications defined by the AIT, or a Java application having the highest priority level. For transiting the state of the predetermined Java application to the "Active" state, the function of the org.dvb.application package defined by the DVB-MHP1.0 Standard can be used. By specifying the ID of the Java application, the state of which should be changed, and then specifying the post-transition state "Active", the state of the Java application as the target of transition can be transited to the "Active" state. The first converting section 741 may be structured to do nothing when there is already a Java application in the "Active" state.

When receiving a "stop format engine" message from the combining section 730, the first converting section 741 instructs the application manager 4503 to transit the states of all the Java applications defined by the AIT to the "Destroyed" state. For a Java application which has not been read, it is not necessary to do anything. For transiting the states of all the Java applications to the "Destroyed" state, the function of the org.dvb.application package defined by the DVB-MHP1.0 Standard can be used. By specifying the ID of a Java application and then specifying the post-transition state "Destroyed", the state of the Java application as the target of transition can be transited to the "Destroyed" state. This operation can be performed to all the Java applications defined by the AIT.

When receiving a "pause format engine" message from the combining section 730, the first converting section 741 finds a Java application in the "Active" state among the Java applications defined by the AIT and instructs the application manager 4503 to transit the state of that Java application to the "Paused" state. For realizing this processing, the function of the org.dvb.application package defined by the DVB-MHP1.0 Standard can be used. After the ID of the Java application is specified, the state of that Java application is obtained. If the state is "Active", the post-transition state "Paused" is specified. In this manner, the state of the Java application as the target of transition can be transited to the "Paused" state. This operation can be performed to all the Java applications defined by the AIT.

When receiving an "application/data list request" message from the combining section 730, the first converting section 741 creates an "application/data list response" message based on all the Java applications defined by the AIT and the states thereof, and sends the message to the combining section 730. As the application name included in the "application/data list response" message, the application name defined by the AIT is used as it is. The state ID included in the "application/data list response" message is created by converting the state of each Java application into a common state defined by the combining section 730 using the conversion table.

FIG. 50 shows an exemplary conversion table for converting an operating state of each Java application into a common state. In FIG. 50, in the left column, individual states, i.e., the operating states of the Java applications defined by the DVB-MHP1.0 Standard are shown. In the right column, the corresponding common states are shown. As shown in the second row from the top, the operating state "Active" of a Java application defined by the DVB-MHP1.0 Standard is associated with the common state "during execution". Such a correspondence is defined because a Java application in the "Active" state generally has a high possibility of using a minimum resource.

In FIG. 50, as shown in the third row from the top, the operating state "Paused" of a Java application defined by the DVB-MHP1.0 Standard is associated with the common state "at a pause". According to the DVB-MHP1.0 Standard, a Java application in the "Paused" state should release resources other than the minimum necessary resource. Therefore, such a correspondence is defined.

As shown in the fourth row from the top, with cases other than the cases shown in the second and third rows from the top, the common state "at a stop" is associated. The cases other than the cases shown in the second and third rows from the top refer to, specifically, cases in which the Java applications are in the "Loaded" state or the "Destroyed" state, or in an operating state where even reading has not been completed. In such cases, no Java application code has been executed, and therefore it is appropriate to associate such cases with "at a stop" where no resource is used.

Now, a case where the AIT defines that the operating state of the application having the name "EPG" is "Active" and the operating state of the application having the name "card game" is "Destroyed" will be discussed. In this case, when receiving an "application/data list request" message, the first converting section 741 creates an "application/data list response" message 5100 shown in FIG. 51 and sends the message to the combining section 730.

FIG. 51 shows a specific example of the message sent by the first converting section 741. The message 5100 shown in FIG. 51 is an "application/data list response" from the Java middleware 740 to the navigator 720. In a Source ID field 5101, "2" is stored as the sub program ID indicating the Java middleware 740 (see FIG. 18). In a Destination ID field 5102, "1" is stored as the sub program ID indicating the navigator 720 (see FIG. 18). In a Message ID field 5103, "12" is stored as the message ID indicating the "application/data list response" (see FIG. 19). In a Data Length field 5104, "27" indicating the data length is stored. In an application number field 5110, "2" indicating the number of the Java applications defined by the AIT received by the Java middleware 740 is stored.

In FIG. 51, a Data field 5105 includes an application information field 5111 for the first Java application and an application information field 5112 for the second Java application. In an application ID field 5121, "1" is stored as the application ID indicating the first Java application. In an application state ID field 5122, "1" is stored as the application state ID indicating "during execution". The "during execution" state is obtained as a result of converting the operating state "Active" of the Java application. In an application name length field

5123, "6" indicating the length of the application name is stored. In an application name field 5124, the application name "EPG" defined by the AIT is stored. Here, each character of "EPG" is represented by a 2-byte code, and as a result, the application name length is 3 characters×2 bytes=6 bytes. In an application ID field 5125, "2" is stored as the application ID indicating the second Java application. In an application state ID field 5126, "3" is stored as the application state ID indicating "at a stop". The "at a stop" state is obtained as a result of converting the operating state "Destroyed" of the Java application. In an application name length field 5127, "14" indicating the length of the application name is stored. In an application name field 5128, the application name "card game" defined by the AIT is stored. Each character of "card game" is represented by a 2-byte code, and as a result, the application name length is 7 characters×2 bytes=14 bytes.

As described above, the application manager 4503 of the Java middleware 740 transits the operating state of a Java application by a change in the control information in the AIT or an instruction from a Java application. The first converting section 741 receives a notice of state change from the application manager 4503. At this point, the first converting section 741 generates an "application/data list changed" message and notifies the change to the combining section 730. When receiving an "execute application/data" message from the combining section 730, the first converting section 741 instructs the application manager 4503 to transit the state of the Java application specified in the Data field 175 of the message to the "Active" state. For transiting the state of the Java application to the "Active" state, the function of the org.dvb.application package defined by the DVB-MHP1.0 Standard can be used. By specifying the ID of the Java application, the state of which should be changed, and then specifying the post-transition state "Active", the state of the Java application as the target of transition can be transited to the "Active" state. The first converting section 741 may be structured to do nothing when the Java application is already in the "Active" state.

When receiving a "stop application/data" message from the combining section 730, the first converting section 741 instructs the application manager 4503 to transit the state of the Java application specified in the Data field 175 of the message to the "Destroyed" state. For a Java application which has not been read, it is not necessary to do anything. For transiting the state of the Java application to the "Destroyed" state, the function of the org.dvb.application package defined by the DVB-MHP1.0 Standard can be used. By specifying the ID of the Java application and then specifying the post-transition state "Destroyed", the state of that Java application as the target of transition can be transited to the "Destroyed" state. When receiving a "pause application/data" message from the combining section 730, the first converting section 741 instructs the application manager 4503 to transit the state of the Java application specified in the Data field 175 of the message to the "Paused" state. For realizing this processing, the function of the org.dvb.application package defined by the DVB-MHP1.0 Standard can be used. By specifying the ID of the Java application and then specifying the post-transition state "Paused", the state of the Java application as the target of transition can be transited to the "Paused" state.

The first converting section 741 may be notified of resource deprivation by the resource managing section 733 of the combining section 730. The first converting section 741 may cause the application manager 4503 to transit the state of the Java application in accordance with the deprived resource. In the case where a resource indispensable to execute the Java application is deprived, the first converting section 741 transits the states of all the Java applications to "Destroyed". In the case where the other resources, i.e., the resources which are not absolutely necessary to execute the Java application are deprived, the first converting section 741 does not need to do anything.

The Java middleware 740 may directly receive a resource deprivation notice and perform corresponding processing. The description on the Java middleware 740 is now completed.

Next, with reference to FIG. 52 through FIG. 71, the HTML browser 750 will be described. The HTML browser 750 is a format engine for interpreting and displaying HTML data. In this structure example, DVB-HTML defined by DVB-MHP1.1 Standard (officially, ETSI TS 101 812 DVB-MHP Specification V1.1) will be described as a specific example. Alternatively, HTML browsers operating in accordance with the other specifications, such as XHTML1.0 or the like, may be used. In this structure example, the detailed operation of the HTML browser 450 includes the contents of the DVB-MHP1.1 Standard. Accordingly, only the overview will be described here.

Figure 52:
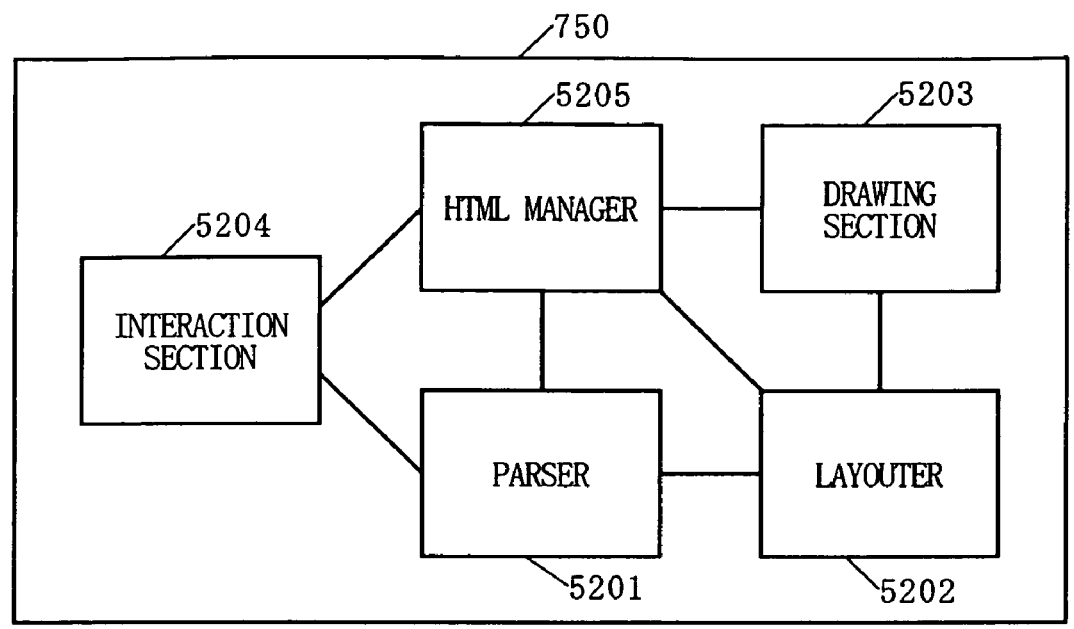
FIG. 52 is a block diagram showing a structure of an HTML browser 750.

FIG. 52 is a block diagram showing a structure of the HTML browser 750. The HTML browser 750 includes a parser 5201, a layouter 5202, a drawing section 5203, an interaction section 5204, and an HTML manager 5205.

Figure 55:
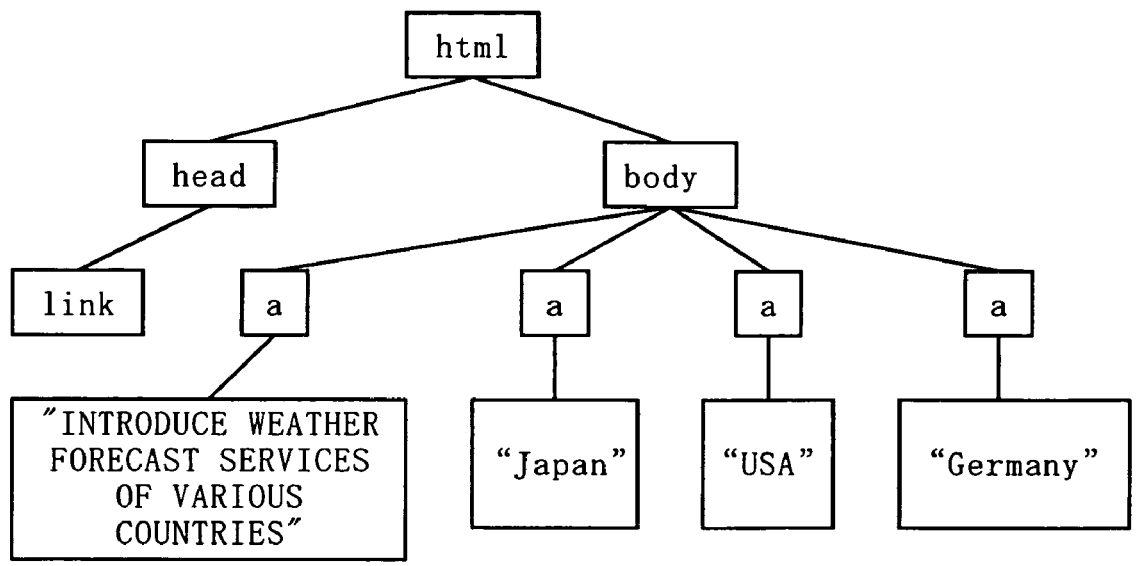
FIG. 55 is a diagram showing an exemplary DOM tree.

The parser 5201 analyzes DVB-HTML data downloaded by the HTML manager 5205 and constructs a DOM (document object model) tree. FIG. 53 shows an example of DVB-HTML data. The parser 5201 constructs a DOM tree as shown in FIG. 55 for the DVB-HTML data.

The layouter 5202 calculates and determines a display position on the display 107 of each element of the DOM tree constructed by the parser 5201. FIG. 54 shows an exemplary style sheet for determining the layout of DVB-HTML data. Each row shown in FIG. 54 specifies the display positions of elements 5311, 5312, 5313 and 5314 in the DVB-HTML data shown in FIG. 53. Here, CSS defined by the DVB-MHP (expanded specification of CSS2 defined by W3C) is used as an example of the style sheet. Alternatively, a style sheet in accordance with the other specifications such as CSS2 or the like may be used as long as the style sheet can be analyzed by the layouter as the style sheet of the HTML data, the layout of which is to be determined. The layouter 5202 determines a display position on the display 107 of each element of the DOM tree based on the style sheet. For example, in the case where the display position indicated by (50, 50) is determined for "weather forecast" shown in FIG. 55, the character stream "weather forecast" is displayed such that the upper left coordinate position is at the position which is 50 px from the top and 50 px from the left of the display. In the case where the display position indicated by (200, 200) is determined for "Japan" shown in FIG. 55, the character stream "Japan" is displayed such that the upper left coordinate position is at the position which is 200 px from the top and 200 px from the left of the display.

The layouter may have a parser of the style sheet, the style sheet may be analyzed and calculated by the parser receiving an instruction from the HTML manager after the DOM tree is constructed, and the display positions as a result of the calculation may be notified to the layouter. Alternatively, the HTML browser may have a default style sheet, and when there is no style sheet, the layouter may calculate and determine the display position on the display 107 of each element of the DOM tree in accordance with the default style sheet of the HTML browser.

Figure 56:
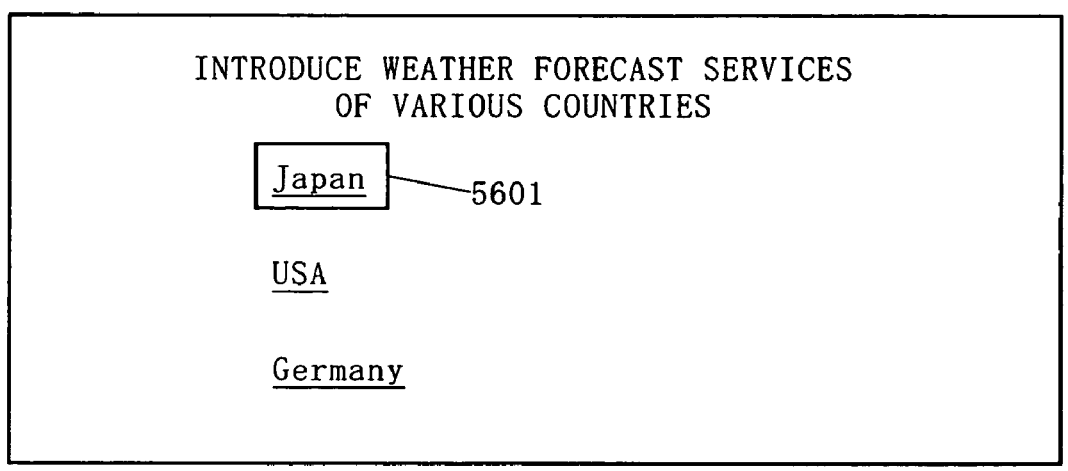
FIG. 56 shows the display 107 when the DOM tree shown in FIG. 55 is drawn.

Returning to FIG. 52, the drawing section 5203 draws each element of the DOM tree in accordance with the display position calculated by the layouter 5202. FIG. 56 shows the display 107 when the DOM tree shown in FIG. 55 is drawn.

The interaction section 5204 performs processing corresponding to an instruction input by the user to the links, buttons and the like included in the DVB-HTML data which has been drawn. For example, it is assumed that DVB-HTML data has a link to another DVB-HTML data defined therein. When the user inputs a click on the link from the input section 111, the interaction section 5204 passes information on the DVB-HTML data defined in the link to the HTML manager 5205.

The HTML manager 5205 downloads the DVB-HTML data based on the passed information on the DVB-HTML data. The HTML manager 5205 uses the parser 5201, the layouter 5202, and the drawing section 5203 to interpret and display the DVB-HTML data. In the DVB-HTML data shown in FIG. 53, links to other pieces of DVB-HTML data are defined.

In FIG. 56, when the user inputs a click on the link destination "dvb://1.2.1/Japan_Weather.html" represented as the character stream "Japan" on the display, the interaction section 5204 passes the information on the DVB-HTML data "dvb://1.2.1/Japan_Weather.html" to the HTML manager 5205. Here, "inputting a click on a link destination" means to press the OK button 305 when that link destination is selected by a focus 5601. The HTML manager 5205 downloads the DVB-HTML data based on the information on the DVB-HTML "dvb://1.2.1/Japan_Weather.html". The HTML manager 5205 uses the parser 5201, the layouter 5202, and the drawing section 5203 to interpret and display the DVB-HTML data. FIG. 57 shows an example of the DVB-HTML data which is displayed after the user clicks the link destination represented as the character stream "Japan".

For example, it is assumed that a button defined in the DVB-HTML data has a script for changing the structure of the DOM tree defined therein. When the user inputs a click on the button from the input section 111, the interaction section 5204 receives the DVB-HTML data from the parser 5201, executes the script defined in the button, and changes the structure of the DOM tree. In accordance with the change, the layouter re-calculates the display positions, and the drawing section 5203 re-draws. It is notified to the HTML manager 5202 that the DOM tree has been changed.

In the DVB-HTML data shown in FIG. 58, as a script 5801 for changing the structure of the DOM tree, "changeDOMTree( )" (specifically, for example, a table element is described in the DOMtree) is defined. It is defined that the script 5801 is executed when a button 5802 is clicked. In the script 5801, a source code for changing the structure of the DOM tree is omitted. The script may be, for example, according to the DOM Standard defined by the DVB-MHP (expanded specification of DOM2 defined by W3C) or other specifications such as DOM1, DOM2 or the like.

Figure 59:
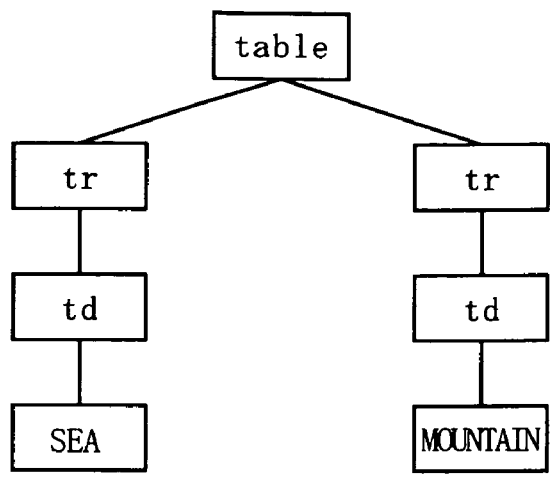
FIG. 59 is a diagram showing a part of a DOM tree constructed by a parser 5201 for the DVB-HTML data shown in FIG. 58.
Figure 60:
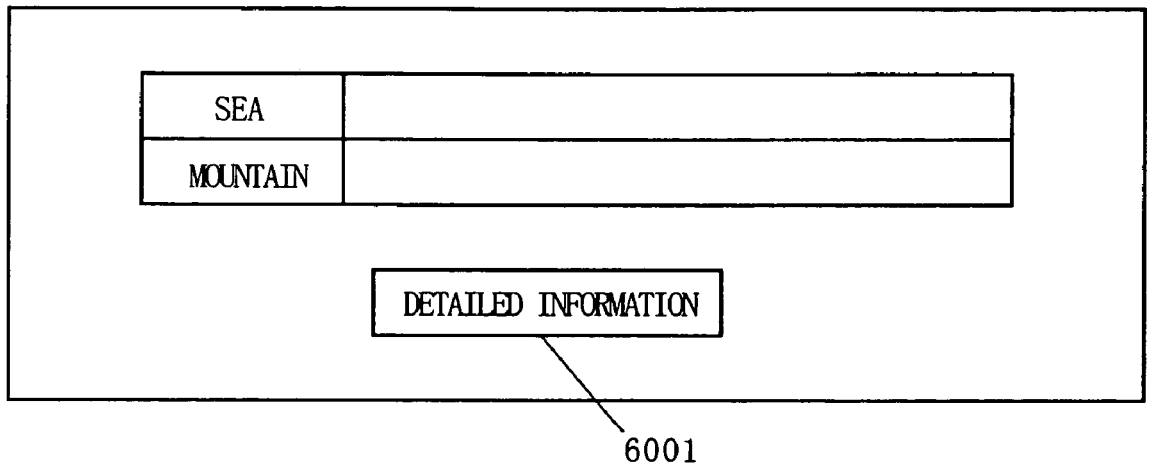
FIG. 60 shows an display example realized by a layouter 5202 and a drawing section 5203.
Figure 61:
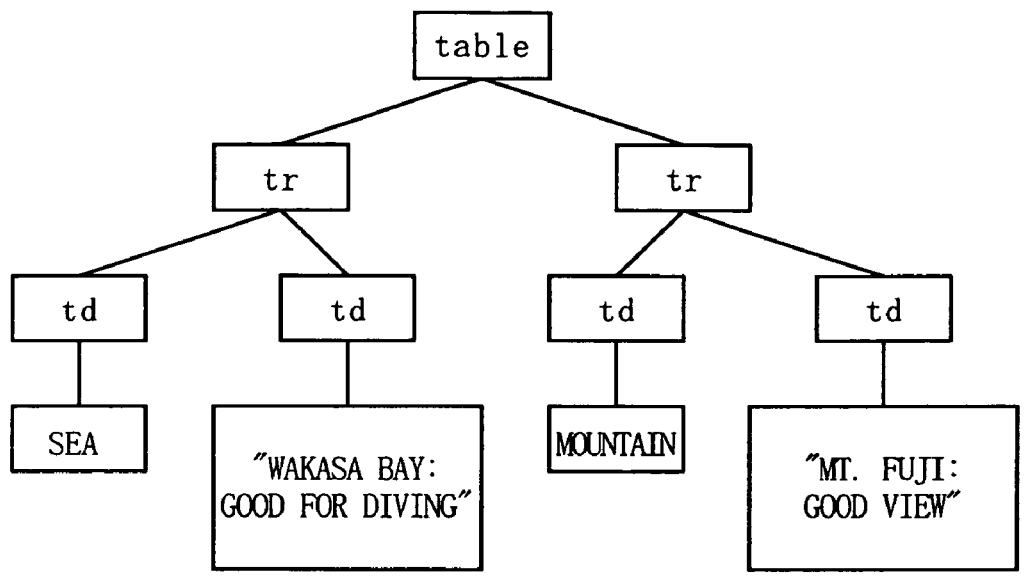
FIG. 61 is a diagram showing an example of the result of change of the DOM tree.
Figure 62:
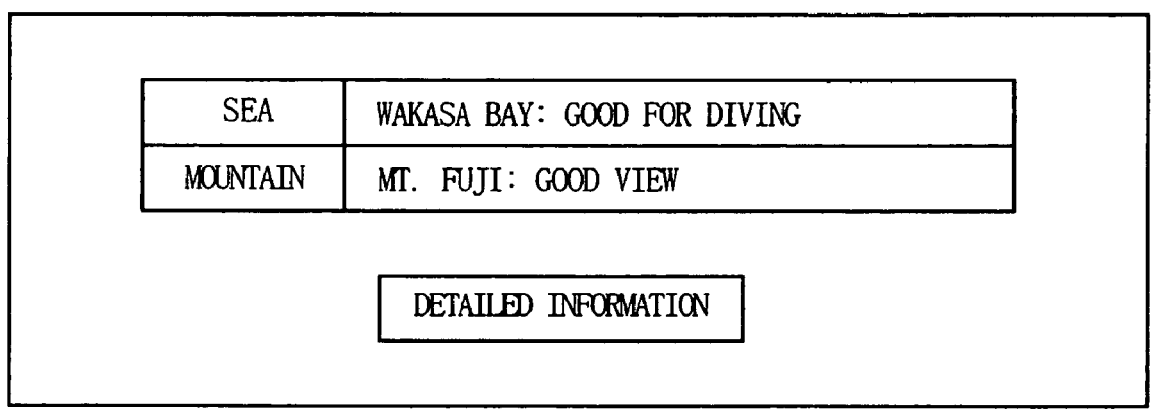
FIG. 62 shows an example of the result of change of the display.

FIG. 59 shows a part of a DOM tree constructed by the parser 5201 for the DVB-HTML data shown in FIG. 58. FIG. 60 shows a display example realized by the layouter 5202 and the drawing section 5203. In FIG. 60, when the user inputs a click on the button 5802 represented as a label "detailed information" 6001, the interaction section 5204 receives the DVB-HTML data from the parser 5201. The interaction section 5204 executes the script 5801 defined in the button 5802 to change the structure of the DOM tree. The layouter 5202 re-calculates the display positions. The drawing section 5203 re-draws. It is notified to the HTML manager 5205 that the DOM tree has been changed. FIG. 61 shows a result of the change of the DOM tree in accordance with the user clicking the button. FIG. 62 shows an example of the result of the change of the display.

The HTML manager 5205 downloads DVB-HTML data multiplexed in the broadcast waves. The HTML manager 5205 uses the parser 5201, the layouter 5202, and the drawing section 5203 to interpret and display the DVB-HTML data. According to the MHP1.1 standard, a table, called an AIT, defining HTML data is multiplexed and transmitted in the broadcast waves. The HTML manager 5205 first downloads the AIT. The AIT includes, for example, information for downloading DVB-HTML data, and names and control information of the DVB-HTML data.

Figures 63, 64, 65:
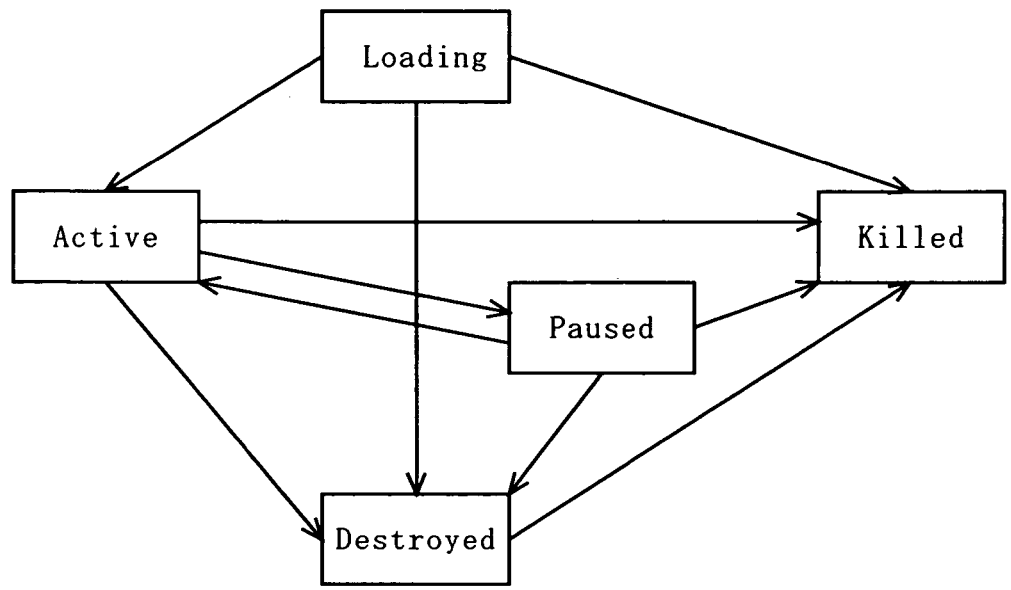
FIG. 63 schematically shows a main part of an AIT.
FIG. 64 is a state transition diagram showing five operating states of DVB-HTML data and transitions between the states.
FIG. 65 schematically shows a main part of an AIT.

FIG. 63 schematically shows a main part of the AIT. In FIG. 63, in the leftmost column, DVB-HTML data IDs are shown. In the second column from the left, control information of the DVB-HTML data is shown. The control information includes "autostart", "present", "kill" and the like. "autostart" means that the HTML browser 750 interprets and displays the corresponding DVB-HTML data immediately and automatically. "present" means that automatic interpretation and display are not performed. "kill" means that the display of the DVB-HTML data is erased. In the third column from the left, the names of the DVB-HTML data are shown. In the rightmost column, the priority levels of the DVB-HTML data are shown. When competition for a resource occurs while a plurality of pieces of DVB-HTML data are displayed, the resource is given, with priority, to the DVB-HTML data having the highest priority level. A larger value of the priority level indicates a higher priority level.

In FIG. 63, in the second and third rows from the top, sets of information on the DVB-HTML data are shown. For the DVB-HTML data defined in the second row from the top, the ID is "1", the control information is "autostart", the data name is "weather forecast", and the priority level is "54". For the DVB-HTML data defined in the third row from the top, the ID is "2", the control information is "present", the data name is "holiday outing information", and the priority level is "22".

When receiving the AIT shown in FIG. 63, the HTML manager 5205 downloads, and interprets and displays the DVB-HTML data having the data name "weather forecast". Here, DVB-HTML data defined by the DVG-MHP1.1 Standard has states of "Loaded", "Paused", "Active", "Destroyed" and "Killed".

FIG. 64 is a state transition diagram showing the five states of DVB-HTML data and transitions between the states. When the HTML manager 5205 downloads DVB-HTML data and the DVB-HTML data is stored in the primary memory section 109, the state of the DVB-HTML data becomes "Loaded". The arrows connecting the states show possible transitions between the states, and transitions between states with no arrows do not occur. For example, there is no transition from the "Destroyed" state to the "Active" state.

The HTML manager 5205 performs a state transition of the DVB-HTML data in accordance with three instructions of (1) control information in the AIT in the broadcast waves, (2) an instruction of the DVB-HTML data, and (3) an instruction sent by the navigator 720 via the combining section 730.

When the control information in the AIT is "autostart", the HTML manager 5205 downloads DVB-HTML data and then instructs the parser 5201, the layouter 5202, and the drawing section 5203 to interpret and display the DVB-HTML data. Thus, the state of the DVB-HTML data transits to the "Active" state. The AIT changes as the time passes. For example, it is assumed that the AIT changes from the state shown in FIG. 63 to the state shown in FIG. 65. In FIG. 65, the control information of the DVB-HTML data having the data name "weather forecast" has been changed from "autostart" to "kill". At this point, the HTML manager 5205 transits the display state of the DVB-HTML data to the "Killed" state.

Figure 66:
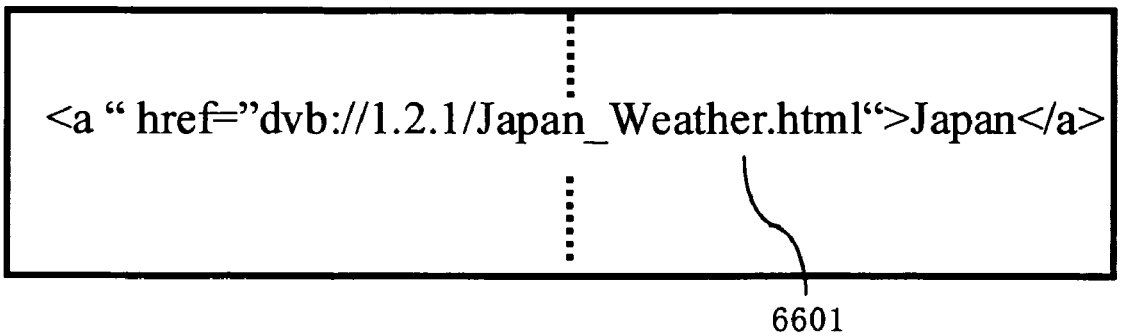
FIG. 66 shows an example of DVB-HTML data having a link to another DVB-HTML data defined therein.
Figure 67:
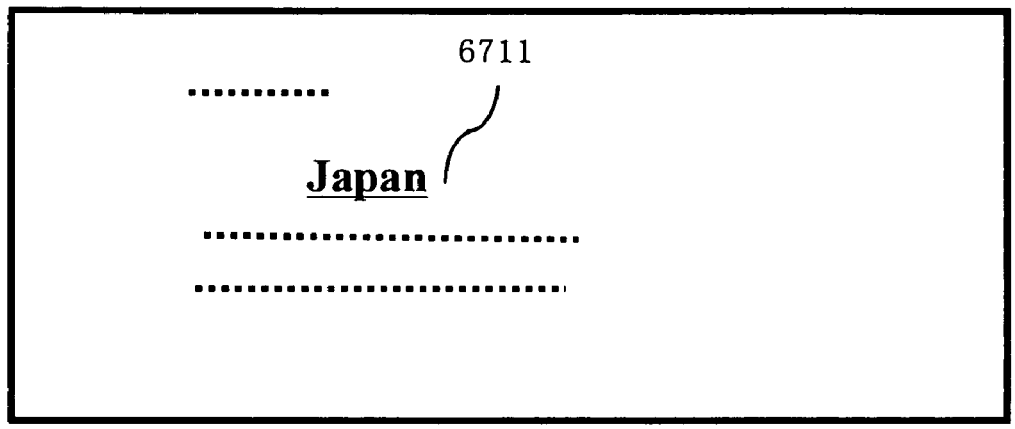
FIG. 67 shows a display example of the DVB-HTML data shown in FIG. 66.
Figure 68:
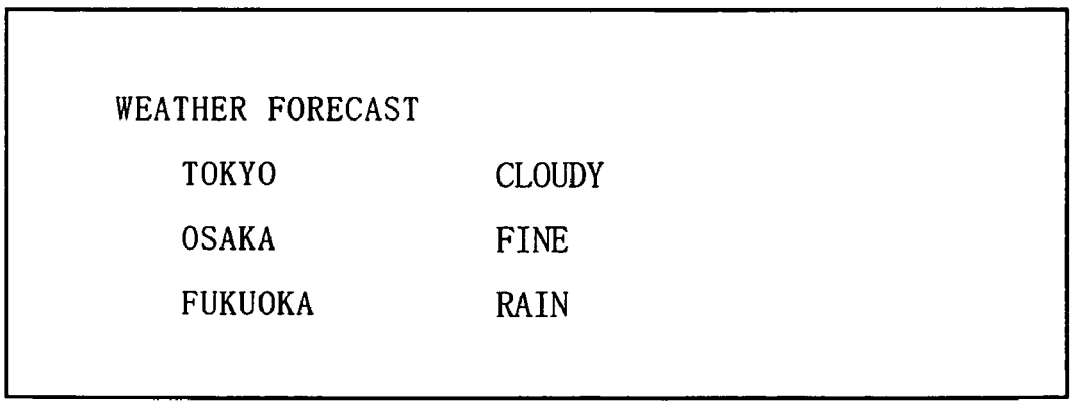
FIG. 68 shows a display example of DVB-HTML data.

DVB-HTML data can generate a state transition by an input by the user on the DVB-HTML data. FIG. 66 shows an example in which DVB-HTML data has a link to another DVB-HTML data defined therein. FIG. 67 shows a display example of the DVB-HTML data shown in FIG. 66. In FIG. 67, a display 6711 corresponds to a link 6601. When the user inputs a click on the link 6601 from the input section 111, the interaction section 5204 passes the information on the DVB-HTML data defined in the link to the HTML manager 5205. Herein, the information on the DVB-HTML data is "dvb://1.2.1/Japan_Weather.html", referring to FIG. 66. The HTML manager 5205 downloads the DVB-HTML data based on the passed information on the DVB-HTML. The HTML manager 5205 then uses the parser 5201, the layouter 5202, and the drawing section 5203 to interpret and display the DVB-HTML data. By this processing, the HTML manager 5205 transits the state of the original DVB-HTML data from "Active" to "Killed". The state of new DVB-HTML data corresponding to the information "dvb://1.2.1/Japan_Weather.html" transits from "Loaded" to "Active". FIG. 68 shows a display example of the new DVB-HTML data corresponding to the information "dvb://1.2.1/Japan_Weather.html".

Finally, a method for transiting the display state of DVB-HTML data by an instruction from the navigator 720 will be described. The navigator 720 makes an instruction based on the common state, i.e., the operating state of the format engine defined by the combining section 730 and the operating state of data displayable by the format engine. This common state is different from the individual state, i.e., the display state of the DVB-HTML data displayed by the HTML manager 5205 of the HTML browser 750 or the state transition. The gap between the common state and the individual state is buried by the second converting section 751. The second converting section 751 converts an instruction from the navigator 720 into a state dealt with by the HTML browser 750 and a state transition. As a result, the HTML manager 5205 receives an instruction equivalent to the control information in the AIT or the instruction from the DVB-HTML data, and can transit the display state of the DVB-HTML data.

The second converting section 751 converts a message from the combining section 730 and conveys the message to the HTML browser 750, and also converts information on the HTML browser 750 and conveys the information to the combining section 730. In this manner, the second converting section 751 adapts the operation of the HTML browser 750 to the state defined by the combining section 730. So far, various messages have been described as being delivered to the HTML browser 750 via the combining section 730. Precisely, these messages are sent to the second converting section 751, not the HTML browser 750. When the second converting section 751 receives a "format engine state request" message from the combining section 730, the second converting section 751 determines the state of the HTML browser 750 based on the states of all the HTML data displayable by the HTML browser 750. Then, the second converting section 751 creates a "format engine state response" message and sends the message to the combining section 730.

FIG. 69 is an exemplary conversion table indicating the correspondence between the states of all the HTML data displayable by the HTML browser 750 and the operating states of the HTML browser 750. In FIG. 69, in the left column, the states of all the HTML data displayable by the HTML browser 750 are shown. In the right column, the corresponding operating states of the HTML browser 750 are shown. The states of the HTML browser 750 are the states defined by the combining section 730, i.e., the common states. Specifically, the states of the HTML browser 750 are the three operating states of "during execution", "at a pause", and "at a stop" shown in FIG. 21. In the second through fourth rows from the top, the states of all the HTML data displayable by the HTML browser 750 which correspond to these three states are shown.

First, in the second row from the top, with a case in which at least one of all the HTML data is in the "Active" state, "during execution" is associated as the common state of the HTML browser 750. Such a correspondence is defined because there is generally a high possibility that a minimum resource is used for interaction between the display of HTML data in the "Active" state and the user.

Next, in the third row from the top, with a case in which no HTML data is in the "Active" state and at least one of all the HTML data is in the "Paused" state, "at a pause" is associated as the common state of the HTML browser 750. According to the DVB-MHP1.1 Standard, some resources are unusable for displaying of HTML data in the "Paused" state. Therefore, such a correspondence is defined.

In the fourth row from the top, "at a stop" is associated to the cases other than the cases shown in the second and third rows from the top. The cases other than the cases shown in the second and third rows from the top refer to, specifically, cases in which all the pieces of HTML data are in the "Loaded" state, the "Destroyed" state or the "Killed" state, or in a state where even reading has not been completed. In such cases, no interaction processing on HTML data has been executed, and therefore it is appropriate to associate such cases to "at a stop" where no resource is used.

As described above, the HTML manager 5205 of the HTML browser 750 transits the state of HTML data by a change in the control information in the AIT or an instruction from HTML data. The second converting section 751 receives a notice of state change from the HTML manager 5205. In the case where the state of the HTML browser 750 is changed as a result, the second converting section 751 refers to the conversion table in FIG. 69 to generate a "format engine state changed" message and notifies the change to the combining section 730. In this case, the second converting section 751 stores the common state of the HTML browser 750 in the primary memory section 109. The second converting section 751 compares the stored common state with the common state of the HTML browser 750 after the state of the HTML data is changed. Alternatively, the second converting section 751 may generate a "format engine state changed" message and notify the change to the combining section 730 whenever being notified of the state change of HTML data by the HTML manager 5205.

When receiving an "execute format engine" message from the combining section 730, the second converting section 751 instructs the HTML browser 750 to transit the state of predetermined HTML data defined by the AIT to the "Active" state. Predetermined HTML data may be all the HTML data defined by the AIT, or HTML data having the highest priority level. For transiting the state of the predetermined HTML data to the "Active" state, the function of the org.dvb.application package defined by the DVB-MHP1.1 Standard can be used. By specifying the ID of the HTML data, the state of which should be changed, and then specifying the post-transition state "Active", the state of the HTML data as the target of transition can be transited to the "Active" state. The second converting section 751 may be structured to do nothing when there is already HTML data in the "Active" state.

When receiving a "stop format engine" message from the combining section 730, the second converting section 751 instructs the HTML browser 750 to transit the states of all the HTML data defined by the AIT to the "Killed" state. For HTML data which has not been read, it is not necessary to do anything. For transiting the states of all the HTML data to the "Killed" state, the function of the org.dvb.application package defined by the DVB-MHP1.1 Standard can be used. By specifying the ID of the HTML data and then specifying the post-transition state "Killed", the state of the HTML data as the target of transition can be transited to the "Killed" state. This operation can be performed to all the HTML data defined by the AIT.

When receiving a "pause format engine" message from the combining section 730, the second converting section 751 finds HTML data in the "Active" state among the HTML data defined by the AIT and instructs the HTML browser 750 to transit the state of that HTML data to the "Paused" state. For realizing this processing, the function of the org.dvb.application package defined by the DVB-MHP1.1 Standard can be used. After the ID of the HTML data is specified, the state of that HTML data is obtained. If the state is "Active", the post-transition state "Paused" is specified. In this manner, the state of the HTML data as the target of transition can be transited to the "Paused" state. This operation can be performed to all the HTML data defined by the AIT.

When receiving an "application/data list request" message from the combining section 730, the second converting section 751 creates an "application/data list response" message based on all the HTML data defined by the AIT and the states thereof, and sends the message to the combining section 730. As the application name included in the "application/data list response" message, the application name defined by the AIT is used as it is. The state ID included in the "application/data list response" message is created by converting the state of each HTML data into a common state defined by the combining section 730 using the conversion table.

FIG. 70 shows an exemplary conversion table for converting a state of each HTML data into a common state. In FIG. 70, in the left column, the states of the HTML data defined by the DVB-MHP1.1 Standard are shown. In the right column, the corresponding common states are shown. As shown in the second row from the top, the state "Active" of HTML data defined by the DVB-MHP1.1 Standard is associated with the common state "during execution". Such a correspondence is defined because there is generally a high possibility that a minimum resource is used for interaction between the display of HTML data in the "Active" state and the user.

In FIG. 70, as shown in the third row from the top, the state "Paused" of HTML data defined by the DVB-MHP1.1 Standard is associated with the common state "at a pause". According to the DVB-MHP1.1 Standard, there is limited resources for interaction processing between the display of HTML data in the "Paused" state and the user. Therefore, such a correspondence is defined.

As shown in the fourth row from the top, with cases other than the cases shown in the second and third rows from the top, the common state "at a stop" is associated. The cases other than the cases shown in the second and third rows from the top refer to, specifically, cases in which the HTML data is in the "Loaded" state, the "Destroyed" state, or the "Killed" state, or in a state where even reading has not been completed. In such cases, neither interpretation and display processing of the HTML data nor interaction processing with the user has been executed, and therefore it is appropriate to associate such cases with "at a stop" where no resource is used.

Now, a case where the AIT defines that the state of the HTML data having the data name "weather forecast" is "Active" and the state of the HTML data having the data name "holiday outing information" is "Destroyed" will be discussed. In this case, when receiving an "application/data list request" message, the second converting section 751 creates an "application/data list response" message 7100 shown in FIG. 71 and sends the message to the combining section 730.

FIG. 71 shows a specific example of the message sent by the second converting section 751. The message 7100 shown in FIG. 71 is an "application/data list response" from the HTML browser 750 to the navigator 720. In a Source ID field 7101, "3" is stored as the sub program ID indicating the HTML browser 750 (see FIG. 18). In a Destination ID field 7102, "1" is stored as the sub program ID indicating the navigator 720 (see FIG. 18). In a Message ID field 7103, "12" is stored as the message ID indicating the "application/data list response" (see FIG. 19). In a Data Length field 7104, "27" indicating the data length is stored. In an application number field 7110, "2" indicating the number of the pieces of HTML data defined by the AIT received by the HTML browser 750 is stored.

In FIG. 71, a Data field 7105 includes an application information field 7111 for the first HTML data and an application information field 7112 for the second HTML data. In an application ID field 7121, "1" is stored as the application ID indicating the first HTML data. In an application ID field 7122, "1" is stored as the application state ID indicating "during execution". The "during execution" state is obtained as a result of converting the state "Active" of the HTML data. In an application name length field 7123, "8" indicating the length of the application name is stored. In an application name field 7124, the data name "weather forecast" defined by the AIT is stored. Here, each character of "weather forecast" is represented by a 2-byte code, and as a result, the application name length is 4 characters×2 bytes=8 bytes. In an application ID field 7125, "2" is stored as the application ID indicating the second HTML data. In an application state ID field 7126, "3" is stored as the application state ID indicating "at a stop". The "at a stop" state is obtained as a result of converting the operating state "Destroyed" of the HTML data. In an application name length field 7127, "12" indicating the length of the application name is stored. In an application name field 7128, the data name "holiday outing information" defined by the AIT is stored. Each character of "holiday outing information" is represented by a 2-byte code, and as a result, the application name length is 6 characters×2 bytes=12 bytes.

As described above, the HTML manager 5205 of the HTML browser 750 transits the state of HTML data by a change in the control information in the AIT or an instruction from HTML data. The second converting section 751 receives a notice of state change from the HTML manager 5205. At this point, the second converting section 751 generates an "application/data list changed" message and notifies the change to the combining section 730. When receiving an "execute application/data" message from the combining section 730, the second converting section 751 instructs the HTML manager 5205 to transit the state of HTML data defined by the Data field 175 of the message to the "Active" state. For transiting the state of the HTML data to the "Active" state, the function of the org.dvb.application package defined by the DVB-MHP1.1 Standard can be used. By specifying the ID of the HTML data, the state of which should be changed, and then specifying the post-transition state "Active", the state of the HTML data as the target of transition can be transited to the "Active" state. The second converting section 751 may be structured to do nothing when the HTML data is already in the "Active" state.

When receiving a "stop application/data" message from the combining section 730, the second converting section 751 instructs the HTML manager 5205 to transit the state of the HTML data specified in the Data field 175 of the message to the "Killed" state. For HTML data which has not been read, it is not necessary to do anything. For transiting the state of the HTML data to the "Killed" state, the function of the org.dvb.application package defined by the DVB-MHP1.1 Standard can be used. By specifying the ID of the HTML data and then specifying the post-transition state "Killed", the state of the HTML data as the target of transition can be transited to the "Destroyed" state.

When receiving a "pause application/data" message from the combining section 730, the second converting section 751 instructs the HTML manager 5205 to transit the state of the HTML data specified in the Data field 175 of the message to the "Paused" state. For realizing this processing, the function of the org.dvb.application package defined by the DVB-MHP1.1 Standard can be used. By specifying the ID of the HTML data and then specifying the post-transition state "Paused", the state of the HTML data as the target of transition can be transited to the "Paused" state.

The second converting section 751 may be notified of resource deprivation by the resource managing section 733 of the combining section 730. The second converting section 751 may cause the HTML manager 5205 to transit the state of the HTML data in accordance with the deprived resource. In the case where a resource indispensable to display the HTML data is deprived, the second converting section 751 transits the states of all the HTML data to "Killed". In the case where the other resources are deprived, the second converting section 751 may be structured to do nothing.

The HTML browser 750 may directly receive a resource deprivation notice and perform corresponding processing. The description on the HTML browser 750 is now completed.

Next, with reference to FIG. 72 and FIG. 73, the mailer 760 will be described. The mailer 760 is a format engine for reading and writing electronic mails. Unlike the Java middleware 740 and the HTML browser 750, states of applications or data to be dealt with by the mailer 760 are not defined. States of the mailer 760 are not specifically defined. Here, it is assumed that the mailer 760 has two states of "during execution" and "at a stop". The mailer 760 has general functions of electronic mail software. The functions of the mailer 760 are known and will not be described herein.

The third converting section 761 converts a message from the combining section 730 and conveys the message to the mailer 760, and also converts the operating state of the mailer 760 and conveys the operating state to the combining section 730. In this manner, the third converting section 761 adapts the operating state of the mailer 760 to the common state defined by the combining section 730. So far, various messages have been described as being delivered to the mailer 760 via the combining section 730. Precisely, these messages are sent to the third converting section 761, not the mailer 760.

When the third converting section 761 receives a "format engine state request" message from the combining section 730, the third converting section 761 creates a "format engine state respond" message based on the operating state of the mailer 760, and sends the message to the combining section 730.

Figures 72, 73:
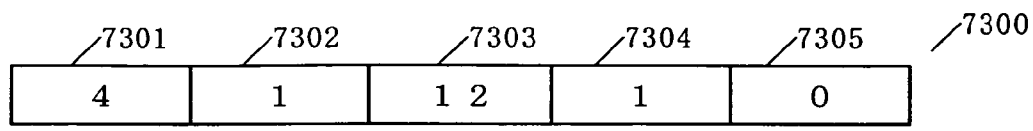
FIG. 72 shows an exemplary conversion table indicating the correspondence between the states of a mailer 760 and the common states defined by a combining section 730.
FIG. 73 is a diagram showing a specific example of an "application/data list response" message generated by a third converting section 761.

FIG. 72 shows an exemplary conversion table indicating the correspondence between the states of the mailer 760 and the common states defined by the combining section 730. In FIG. 72, in the left column, the individual states of the mailer 760 are shown. In the right column, the corresponding common states of the mailer 760 are shown. The common states are, specifically, the two states of "during execution" and "at a stop" shown in FIG. 21. In the second and third rows from the top, the individual states of the mailer 760 corresponding to these two states are shown.

First, in the second row from the top, with a case in which the mailer 760 is active, "during execution" is associated as the common state of the mailer 760. Such a correspondence is defined because there is generally a high possibility that a mailer in an active state uses a minimum resource such as the network interface of the like.

Next, in the third row from the top, with a case in which the mailer 760 is at a stop, "at a stop" is associated as the common state of the mailer 760. When the mailer 760 is at a stop, the mailer 760 does not use any resource. Therefore, it is appropriate to associate such a state with "at a stop". For the mailer 760, there is no individual state corresponding to the common state "at a pause".

When an unexpected situation occurs, the mailer 760 may possibly terminate the mailer 760 itself. The third converting section 761 receives this change from the mailer 760. At this point, the third converting section 761 generates a "format engine state changed" message and notifies the change to the combining section 730. When receiving an "execute format engine" message from the combining section 730, the third converting section 761 activates the mailer 760. When receiving a "stop format engine" message from the combining section 730, the third converting section 761 terminates the mailer 760. When receiving a "pause format engine" message from the combining section 730, the third converting section 761 terminates the mailer 760. As shown in FIG. 72, the mailer 760 does not have a state corresponding to "at a pause". Here, "at a pause" means that a minimum resource is not used (see FIG. 21). For realizing this, there is no other way than terminating the mailer 760.

When receiving an "application/data list request" message from the combining section 730, the third converting section 761 creates an "application/data list response" message, and sends the message to the combining section 730. Since the mailer 760 does not have any application or data to deal with, a message with the application number "0" is generated.

FIG. 73 shows a specific example of the "application/data list response" message created by the third converting section 761. A message 7300 shown in FIG. 73 is an "application/data list response" from the mailer 760 to the navigator 720. In a Source ID field 7301, "4" is stored as the sub program ID indicating the mailer 760. In a Destination ID field 7302, "1" is stored as the subprogram ID indicating the navigator 720. In a Message ID field 7303, "12" is stored as the message ID indicating the "application/data list response". In a Data Length field 7304, "1" indicating the data length is stored. In an application number field 7305, "0" is stored.

When receiving an "execute application/data" message, a "stop application/data" message, or a "pause application/data" message from the combining section 730, the third converting section 761 does nothing. The reason is that the mailer 760 does not have any state of application or data to deal with. The third converting section 761 does not create any "application/data list changed" message.

The third converting section 761 may be notified of resource deprivation by the resource managing section 733 of the combining section 730. The third converting section 761 may terminate the mailer 760 in accordance with the deprived resource. In the case where a resource indispensable to execute the mailer 760, for example, the network interface or the like, is deprived, the third converting section 761 terminates the mailer 760. In the case where the other resources are deprived, the third converting section 761 may be structured to do nothing.

The mailer 760 may directly receive a resource deprivation notice and perform corresponding processing. The description on the mailer 760 is now completed. The description on the specific structure of the information processor is now completed.

(Detailed Operation)

Next, with reference to FIG. 74 through FIG. 84, the first operation example and the second operation example performed in the digital TV described in the above structure example will be described.

DETAILED OPERATION OF THE FIRST OPERATION EXAMPLE

Figure 74:
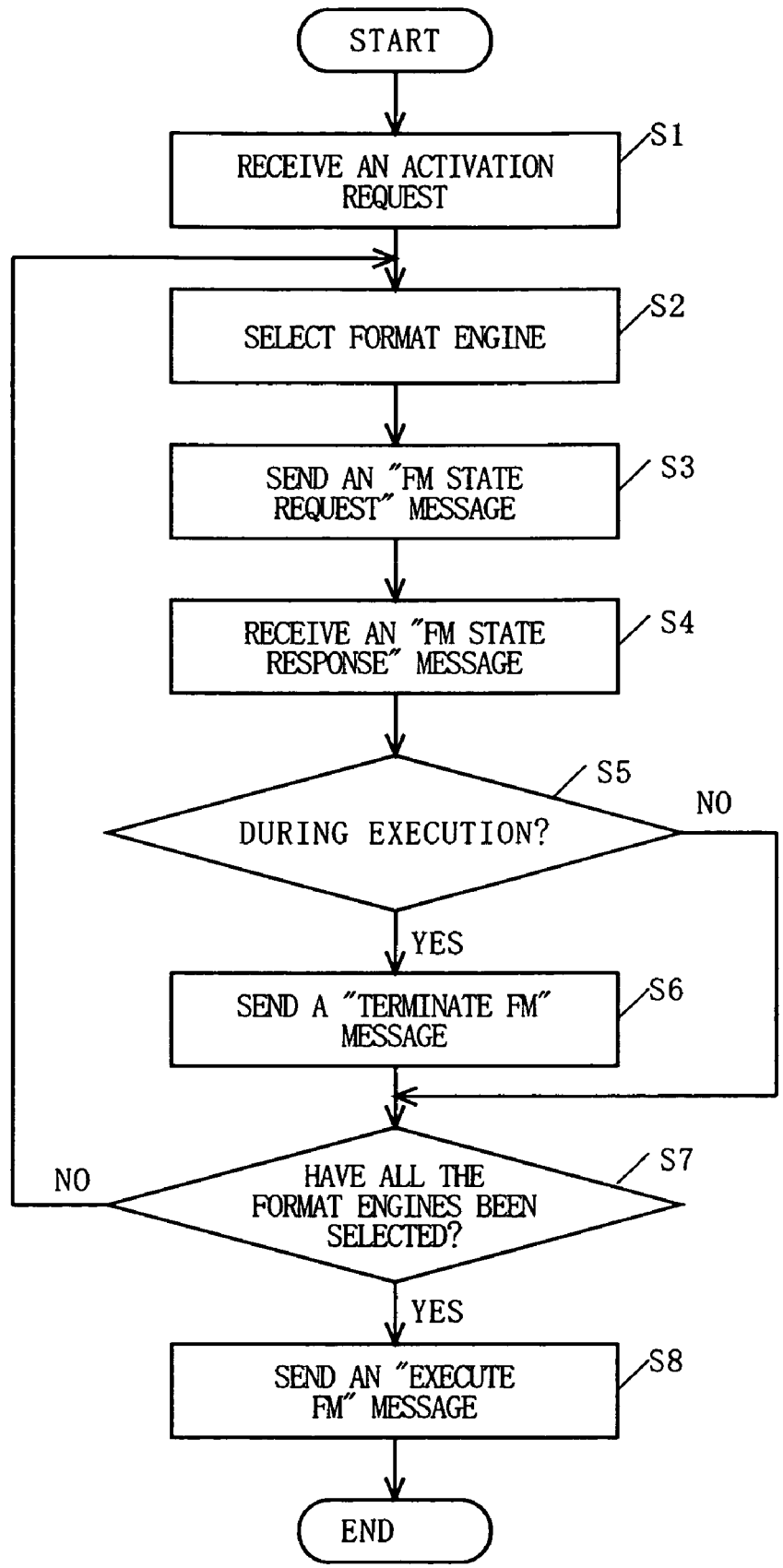
FIG. 74 is a flow chart showing a flow of processing performed in the digital TV for performing a first operation example.

First, with reference to FIG. 74 through FIG. 81, the detailed operation of the first operation example will be described. FIG. 74 is a flowchart showing a flow of processing performed in the digital TV for performing the first operation example. In FIG. 74, the navigator 720 receives an activation request for a format engine (step S1). An activation request is typically made by the user. For example, an activation request for the Java middleware 740 is made when, in the state shown in FIG. 8, the user presses the OK button 305 of the input section 111.

Next, the navigator 720 selects one of the format engines (step S2). The subsequent steps S3 through S6 will be performed for the format engine selected in step S2. Then, the navigator 720 sends a "format engine (shown as "FM" in the figure) state request" message for the format engine selected in step S2 to the combining section 730 (step S3). This message is sent by the combining section 730 to the converting section corresponding to the format engine.

Figure 75:
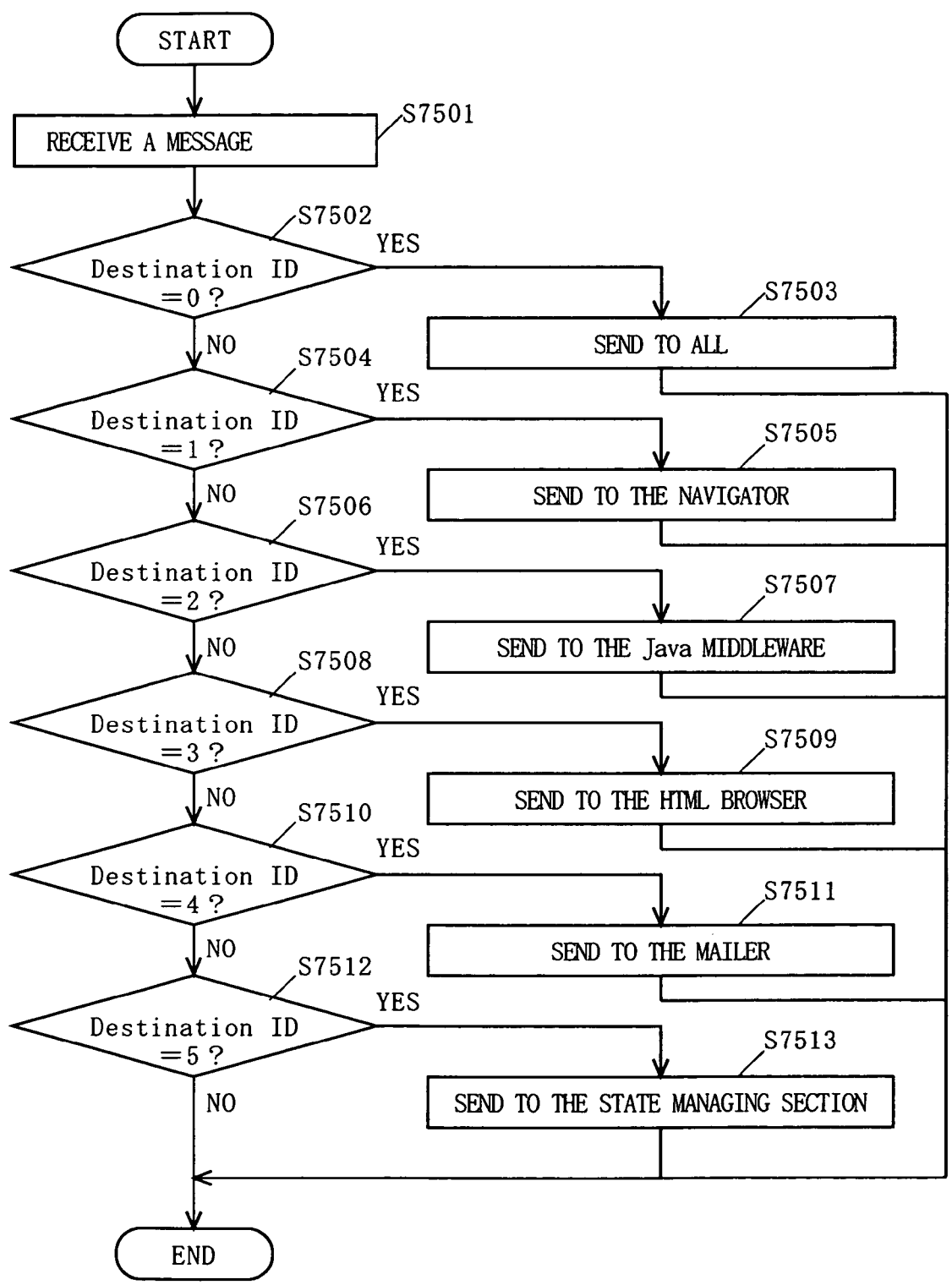
FIG. 75 is a flow chart showing a flow of processing of sending a message performed by a communication section 731.

Here, processing performed by the communication section 731 for sending the message will be described. FIG. 75 is a flowchart showing a flow of processing of sending a message performed by the communication section 731. When receiving a message (step S7501), the communication section 731 refers to the value of the Destination ID field in the message. When the value of the Destination ID field is "0" (step S7502), the communication section 731 sends the message to the navigator 720, the Java middleware 740, the HTML browser 750, the mailer 760, and the state managing section 732 of the combining section 730 (step S7503). When the value of the Destination ID field is "1" (step S7504), the communication section 731 sends the message to the navigator 720 (step S7505). When the value of the Destination ID field is "2" (step S7506), the communication section 731 sends the message to the Java middleware 740 (step S7507). When the value of the Destination ID field is "3" (step S7508), the communication section 731 sends the message to the HTML browser 750 (step S7509). When the value of the Destination ID field is "4" (step S7510), the communication section 731 sends the message to the mailer 760 (step S7511). When the value of the Destination ID field is "5" (step S7512), the communication section 731 sends the message to the state managing section 732 of the combining section 730 (step S7513) By the above processing, the message from each sub program is sent to an appropriate sub program. The communication section 731 performs the above processing each time receiving a message.

Next, a flow of processing of each converting section when receiving the "format engine state request" message in step S3 will be described.

Figure 76:
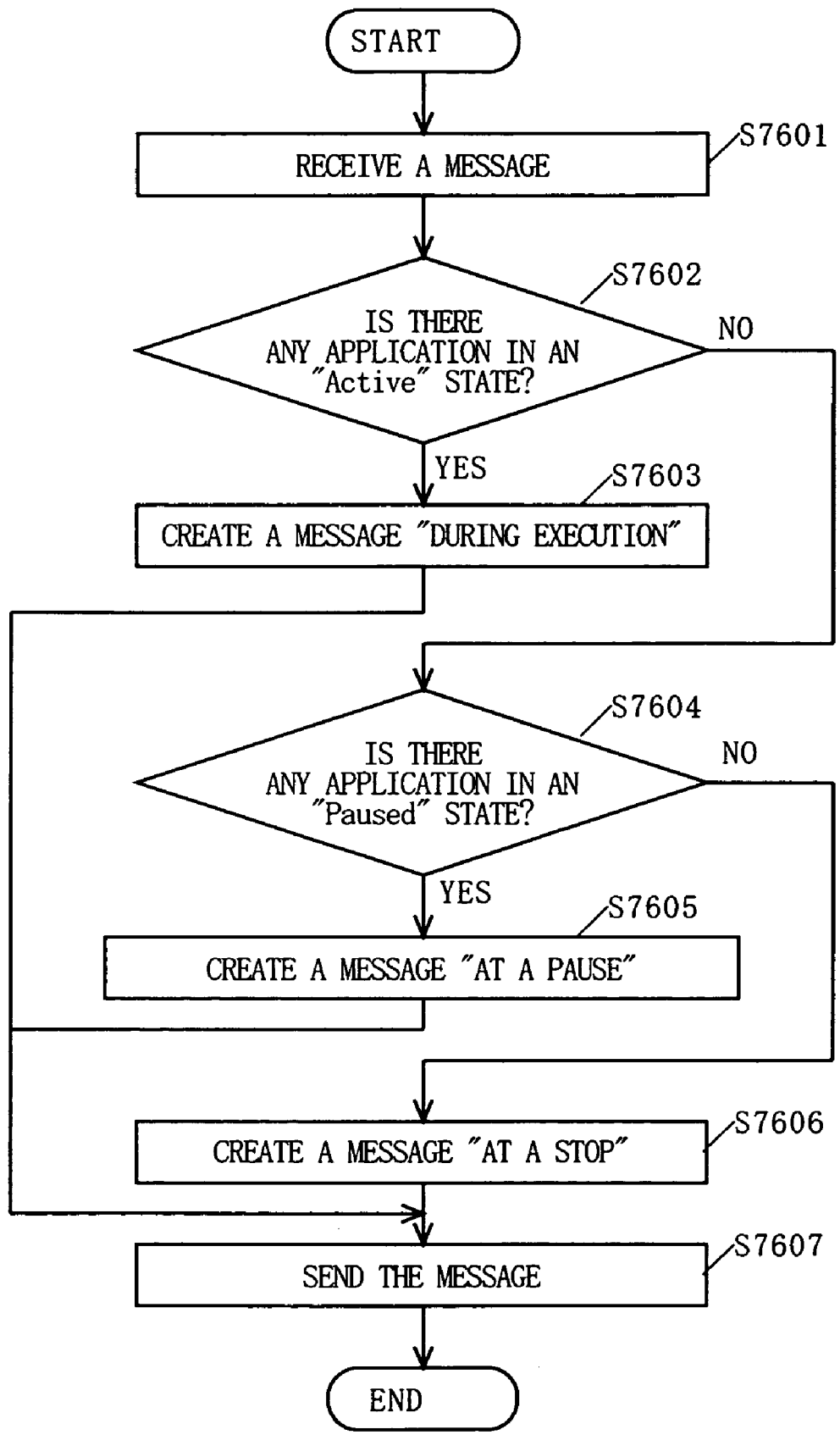
FIG. 76 is a flowchart showing a flow of processing when the first converting section 741 receives a "format engine state request" message.

FIG. 76 is a flowchart showing a flow of processing when the first converting section 741 receives the "format engine state request" message. When receiving the "format engine state request" message (step S7601), the first converting section 741 examines whether or not there is a Java application in an "Active" state (step S7602). When there is a Java application in an "Active" state, the first converting section 741 creates a "format engine state response" message indicating that the Java middleware 740 is "during execution" (step S7603). When there is no Java application in an "Active" state, the first converting section 741 examines whether or not there is a Java application in a "Paused" state (step S7604). When there is a Java application in a "Paused" state, the first converting section 741 creates a "format engine state response" message indicating that the Java middleware 740 is "at a pause" (step S7605). When there is no Java application in a "Paused" state, the first converting section 741 creates a "format engine state response" message indicating that the Java middleware 740 is "at a stop" (step S7606). After step S7603, S7605 or S7606, the first converting section 741 sends the created "format engine state response" message to the combining section 730 (step S7607).

The flow of processing when the second converting section 751 receives the "format engine state request" message is in accordance with the flowchart shown in FIG. 76.

Figure 77:
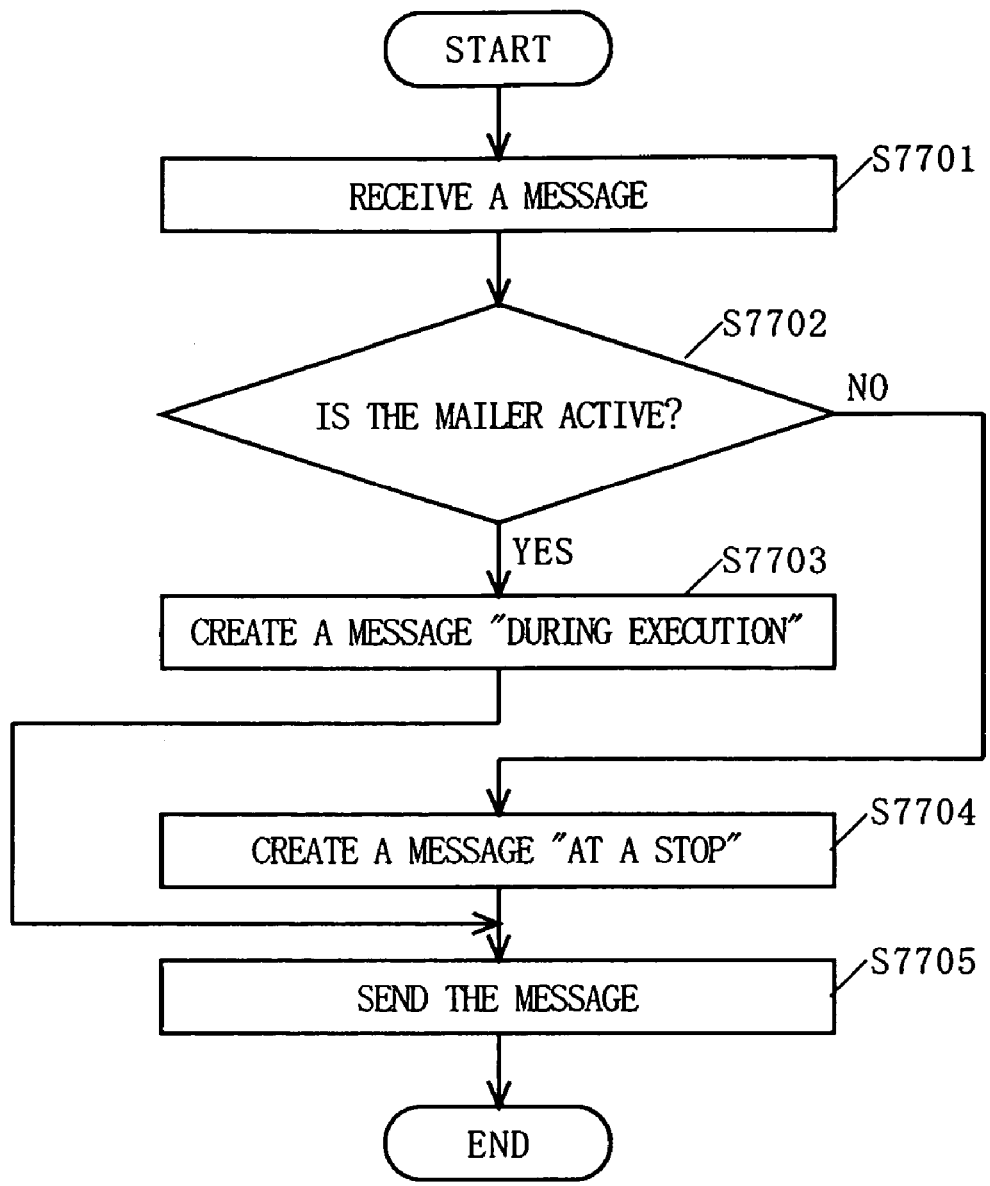
FIG. 77 is a flowchart showing a flow of processing when the third converting section 761 771 receives a "format engine state request" message.

FIG. 77 is a flowchart showing a flow of processing when the third converting section 761 receives the "format engine state request" message. When receiving the "format engine state request" message (step S7701), the third converting section 761 examines whether or not the mailer 760 is active (step S7702). When the mailer 760 is active, the third converting section 761 creates a "format engine state response" message indicating that the mailer 760 is active (step S7703). When the mailer 760 is not active, the third converting section 761 creates a "format engine state response" message indicating that the mailer 760 is at a stop (step S7704). After step S7703 or S7704, the third converting section 761 sends the created "format engine state response" message to the combining section 730 (step S7705).

By the processing shown in FIG. 76 and FIG. 77, the "format engine state response" message is sent to the navigator 720. Returning to FIG. 74, after step S3, the navigator 720 receives the "format engine state response" message (step S4). Then, based on the received message, the navigator 720 determines whether or not the format engine selected in step S2 is during execution (step S5).

When the format engine is determined not to be during execution in step S5, the navigator 720 skips the processing in step S6 and performs the processing in step S7. When the format engine is determined to be during execution, the navigator 720 sends a "stop format engine" message for the format engine to the combining section 730 (step S6). This message is sent by the combining section 730 to the converting section corresponding to the format engine.

Next, a flow of processing of each converting section when receiving the "stop format engine" message in step S6 will be described.

Figure 78:
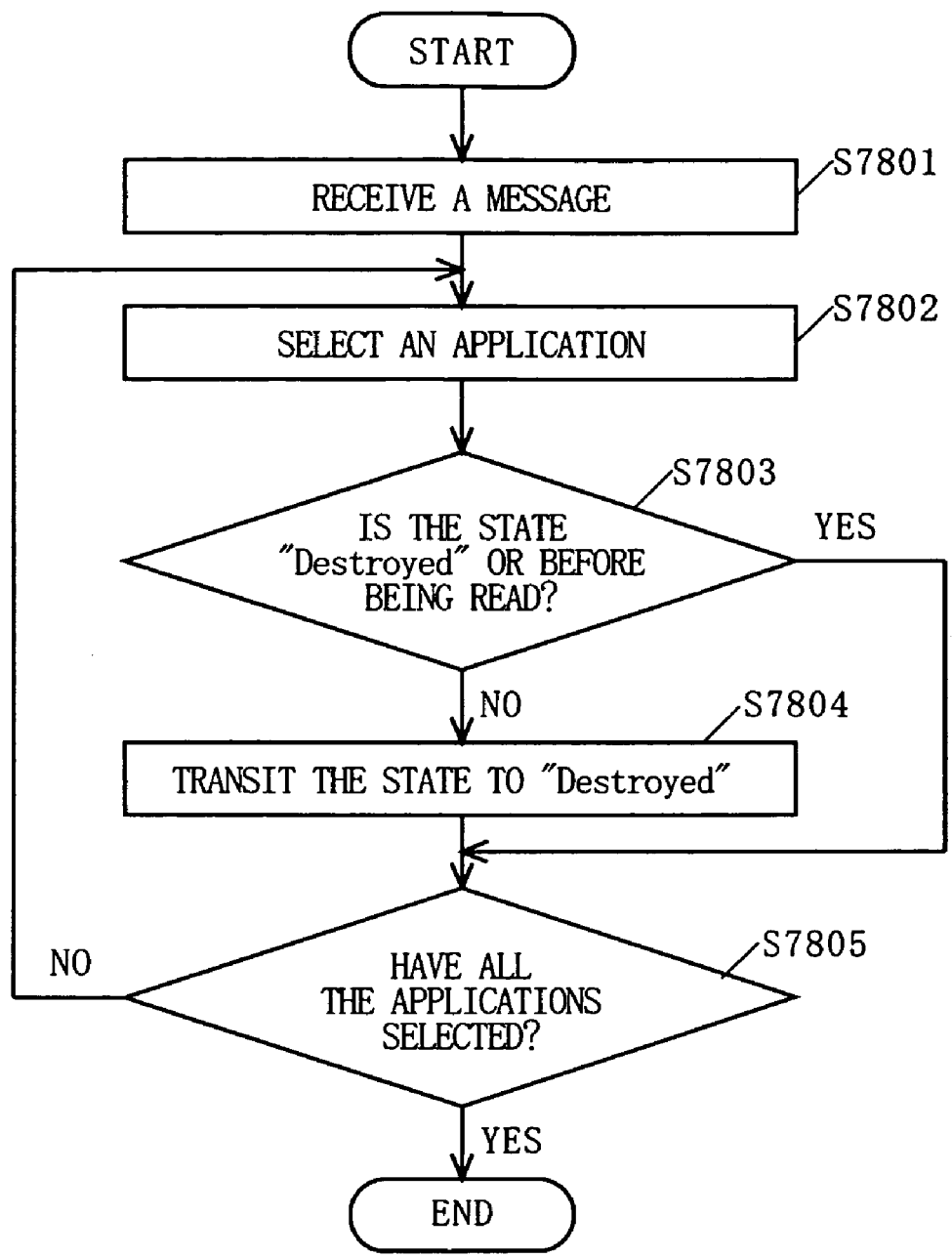
FIG. 78 is a flowchart showing a flow of processing when the first converting section 741 receives a "stop format engine" message.

FIG. 78 is a flowchart showing a flow of processing when the first converting section 741 receives the "stop format engine" message. When receiving the "stop format engine" message (step S7801), the first converting section 741 selects one Java application from the AIT (step S7802). Then, the first converting section 741 examines whether the state of the selected Java application is one of the "Destroyed" state and the state before being read (step S7803). When the state of the selected Java application is neither "Destroyed" nor before being read, the first converting section 741 transits the state of the selected Java application to "Destroyed" (step S7804). When the state of the selected Java application is either "Destroyed" or before being read, the first converting section 741 skips the processing in step S7804 and performs the processing in step S7805. In more detail, the first converting section 741 determines whether or not all the Java applications have been selected in step S7802. When there is at least one Java application which has not been selected, the first converting section 741 performs the processing in step S7802. Then, the first converting section 741 repeats the processing in steps S7802 through S7805. When all the Java applications have been selected, the first converting section 741 terminates the processing in FIG. 78. As described above, the first converting section 741 performs the processing in steps S7802 through S7804 on all the Java applications.

Figure 79:
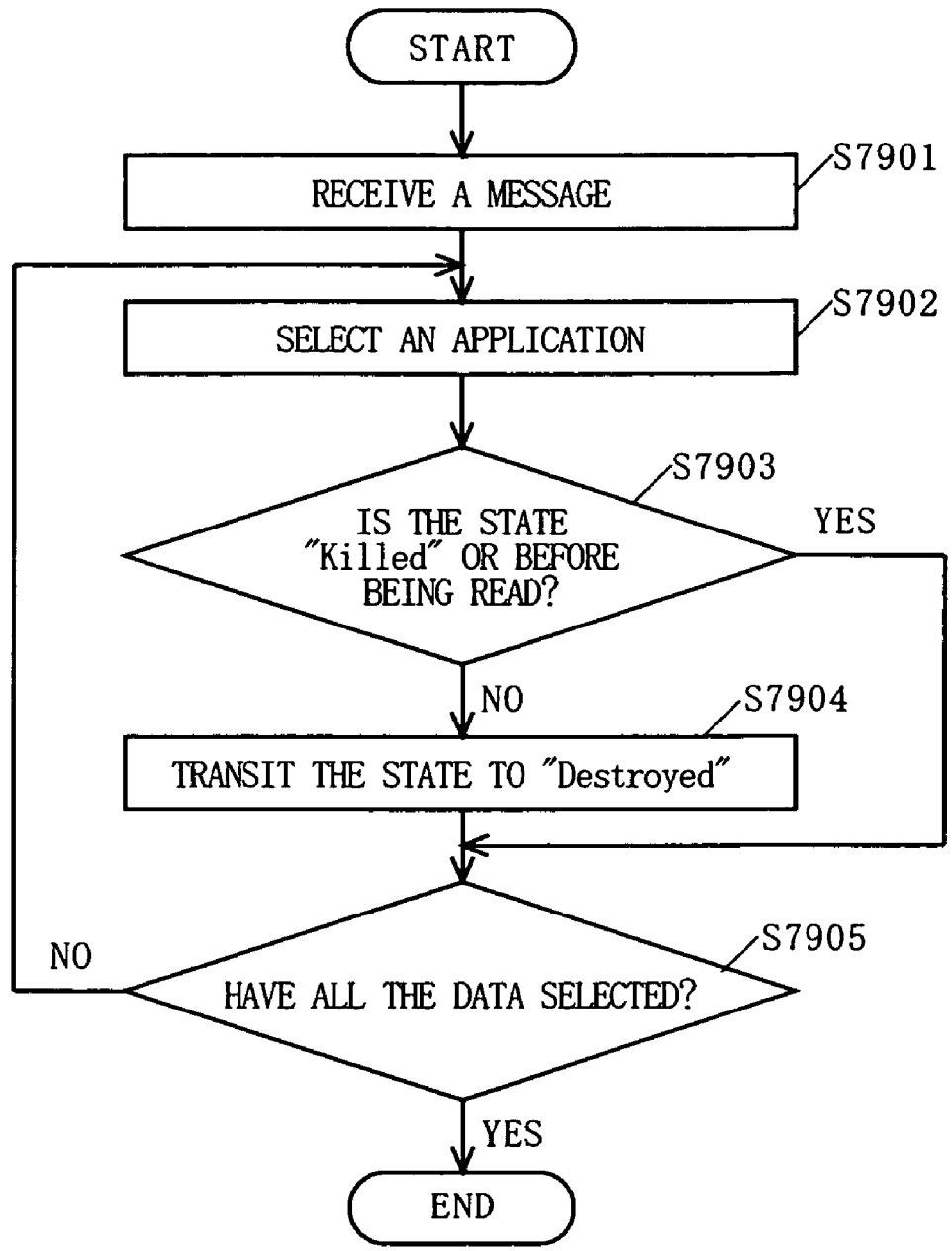
FIG. 79 is a flowchart showing a flow of processing when the second converting section 751 receives a "stop format engine" message.

FIG. 79 is a flowchart showing a flow of processing when the second converting section 751 receives the "stop format engine" message. When receiving the "stop format engine" message (step S7901), the second converting section 751 selects one HTML data from the AIT (step S7902). Then, the second converting section 751 examines whether the state of the selected HTML data is one of the "Killed" state and the state before being read (step S7903). When the state of the selected HTML data is neither "Killed" nor before being read, the second converting section 751 transits the state of the selected HTML data to "Killed" (step S7904). When the state of the selected HTML data is either "Killed" or before being read, the second converting section 751 skips the processing in step S7904 and performs the processing in step S7905. Thus, the second converting section 751 performs the processing in steps S7902 through S7904 on all the HTML data (step S7905).

Figure 80:
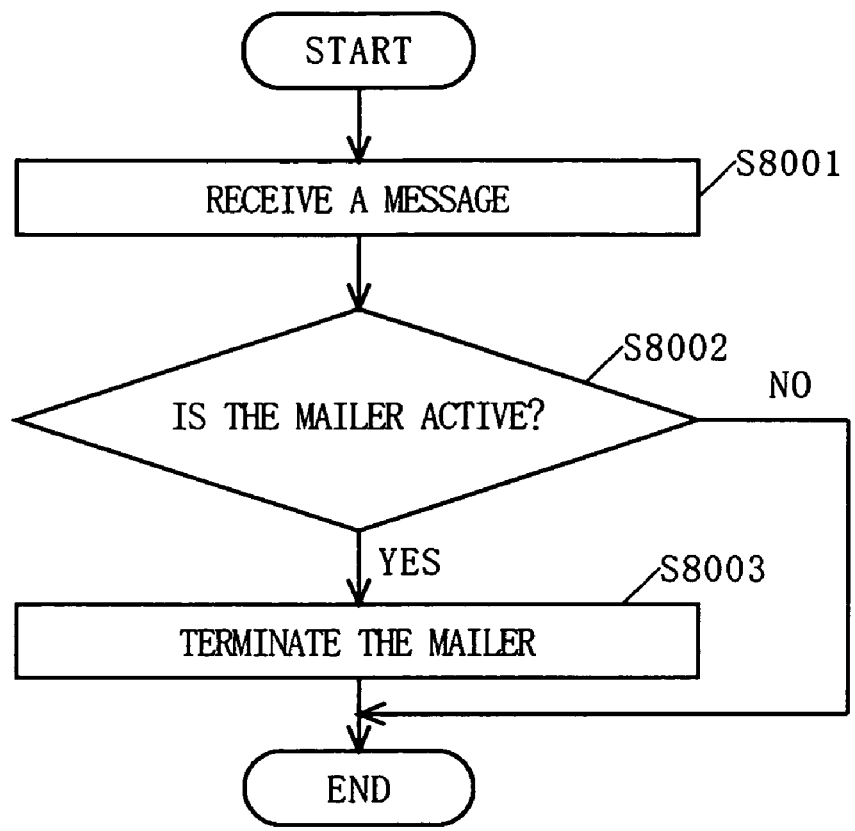
FIG. 80 is a flowchart showing a flow of processing when the third converting section 761 receives a "stop format engine" message.

FIG. 80 is a flowchart showing a flow of processing when the third converting section 761 receives the "stop format engine" message. When receiving the "stop format engine" message (step S8001), the third converting section 761 examines whether or not the mailer 760 is active (step S8002). When the mailer 760 is active, the third converting section 761 terminates the mailer 760 (step S8003), and terminates the processing shown in FIG. 80. When the mailer 760 is not active, the third converting section 761 skips the processing in step S8003 and terminates the processing shown in FIG. 80. By the processing shown in FIG. 78 through FIG. 80, the format engine in the operating state "during execution" is terminated. Returning to FIG. 74, after step S5 or S6, the navigator 720 determines whether or not all the format engines except for the format engine as the target of activation request have been selected in step S2 (step S7). When there is at least one format engine which has not been selected, the navigator 720 performs the processing in step S2. Then, the navigator 720 repeats the processing in steps S2 through S7. When all the format engines have been selected, the navigator 720 sends an "execute format engine" message for the format engine as the target of activation request to the combining section (step S8). Then, the navigator 740 terminates the processing in FIG. 74.

Next, a flow of processing of each converting section when receiving the "execute format engine" message in step S8 will be described.

Figure 81:
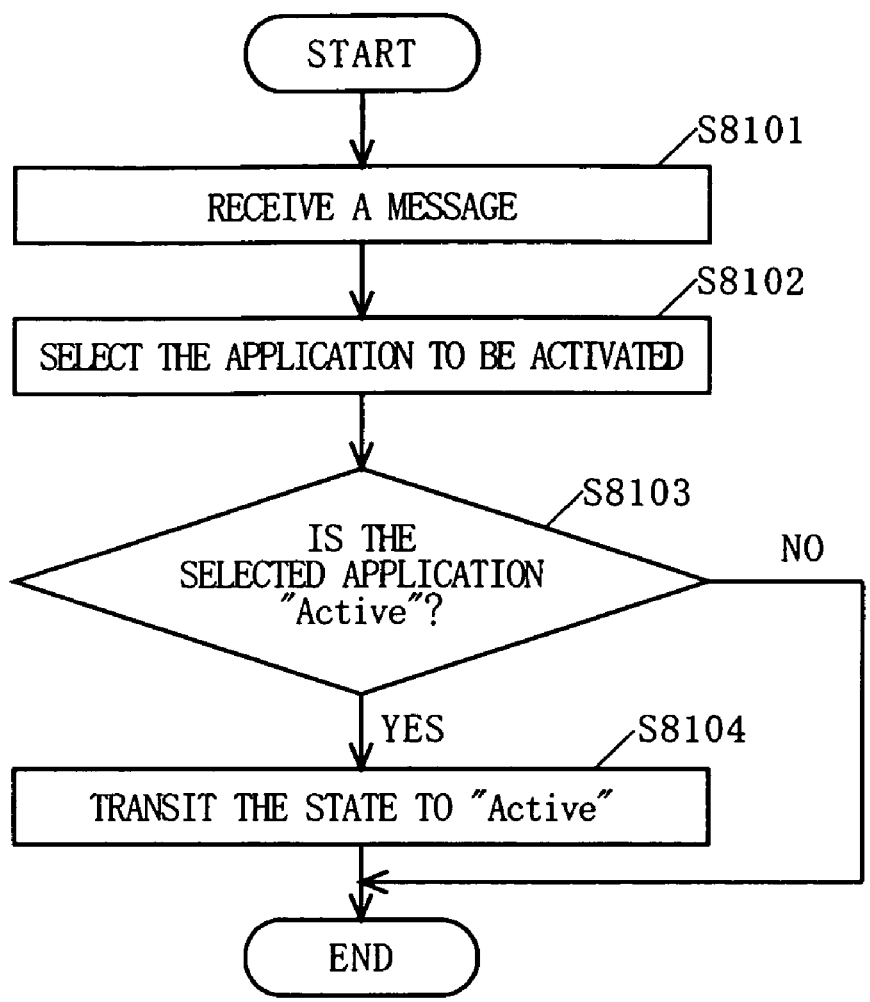
FIG. 81 is a flowchart showing a flow of processing when the first converting section 741 receives an "execute format engine" message.

FIG. 81 is a flowchart showing a flow of processing when the first converting section 741 receives the "execute format engine" message. When receiving the "execute format engine" message (step S8101), the first converting section 741 determines the Java application to be executed (step S8102). This determination is performed by, for example, selecting the Java application having the highest priority level from the AIT. Then, the first converting section 741 determines whether or not the state of the Java application determined in step S8102 is "Active" (step S8103). When the state of the Java application is not "Active", the first converting section 741 transits the state of the Java application to "Active" (step S8104), and terminates the processing shown in FIG. 81. When the state of the Java application is "Active", the first converting section 741 skips the processing in step S8104 and terminates the processing shown in FIG. 81.

The flow of processing when the second converting section 751 receives the "execute format engine" message is in accordance with the flowchart shown in FIG. 81.

The flow of processing when the third converting section 761 receives the "execute format engine" message is in accordance with the flowchart shown in FIG. 81.

As described above, by the "execute format engine" message which is sent in step S8 shown in FIG. 74, the format engine as the target of activation request is activated. Since the other format engines (the format engines which are not targets of activation request) are not in the state "during execution", competition for a minimum resource can be avoided.

In step S6 in FIG. 74, the navigator 720 sends a "stop format engine" message. Alternatively, the navigator 720 may send a "pause format engine" message. In this case also, the other format engines (the format engines which are not targets of activation request) are not in the state "during execution", and therefore competition for a minimum resource can be avoided.

Next, a flow of processing of each converting section when receiving the "pause format engine" message will be described.

Figure 82:
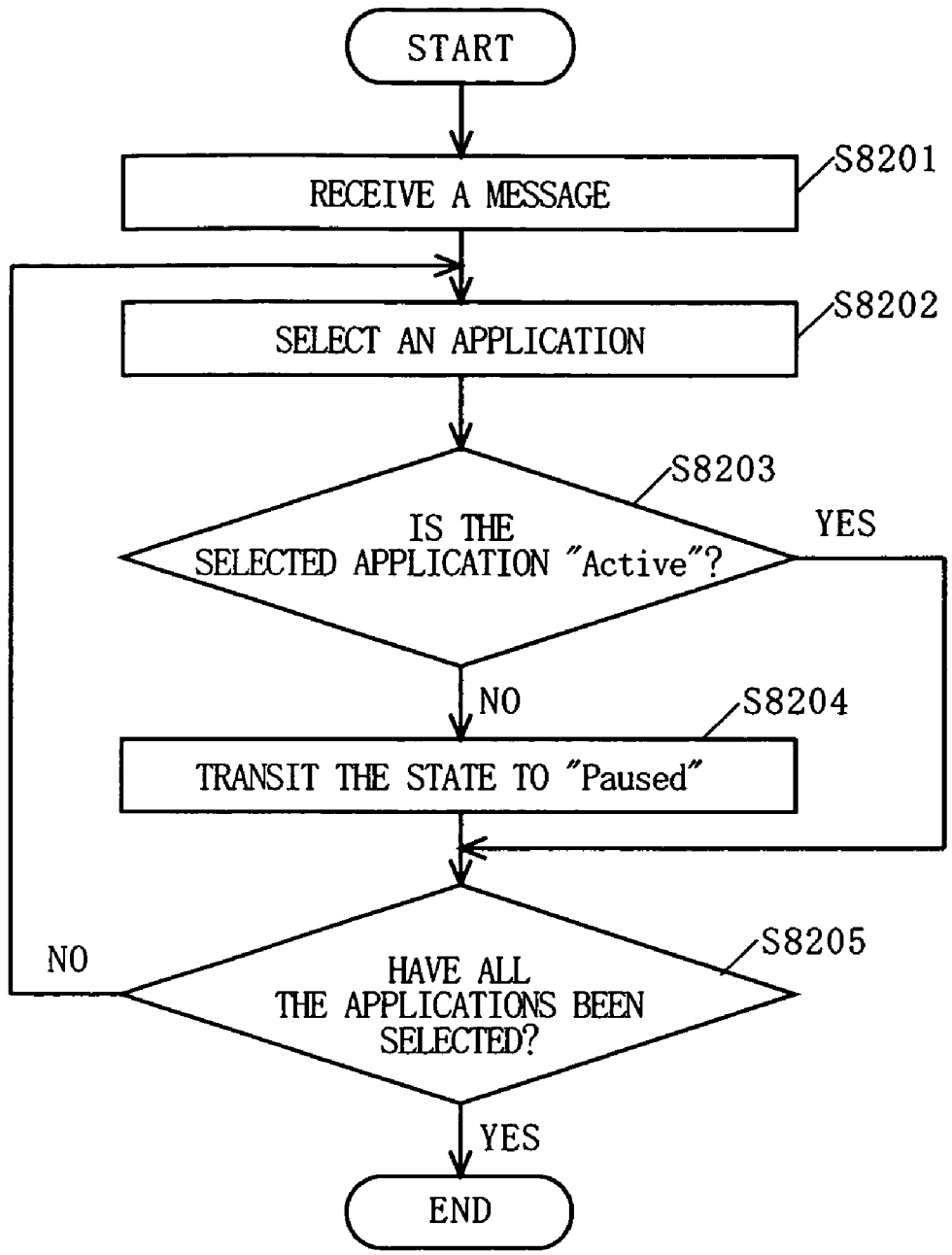
FIG. 82 is a flowchart showing a flow of processing when the first converting section 741 receives a "pause format engine" message.

FIG. 82 is a flowchart showing a flow of processing when the first converting section 741 receives the "pause format engine" message. When receiving the "pause format engine" message (step S8201), the first converting section 741 selects one Java application form the AIT (step S8202). Then, the first converting section 741 determines whether or not the state of the selected Java application is "Active" (step S8203). When the state of the selected Java application is "Active", the first converting section 741 transits the state of the selected Java application to "Paused" (step S8204). When the state of the selected Java application is not "Active", the first converting section 741 skips the processing in step S7804 and performs the processing in step S8205. Thus, the first converting section 741 performs the processing in steps S8202 through S8204 on all the Java applications (step S8205).

The flow of processing when the second converting section 751 receives the "pause format engine" message is in accordance with the flowchart shown in FIG. 82.

The flow of processing when the third converting section 761 receives the "pause format engine" message is the same as that when receiving the "stop format engine" message.

DETAILED OPERATION OF THE SECOND OPERATION EXAMPLE

Figure 83:
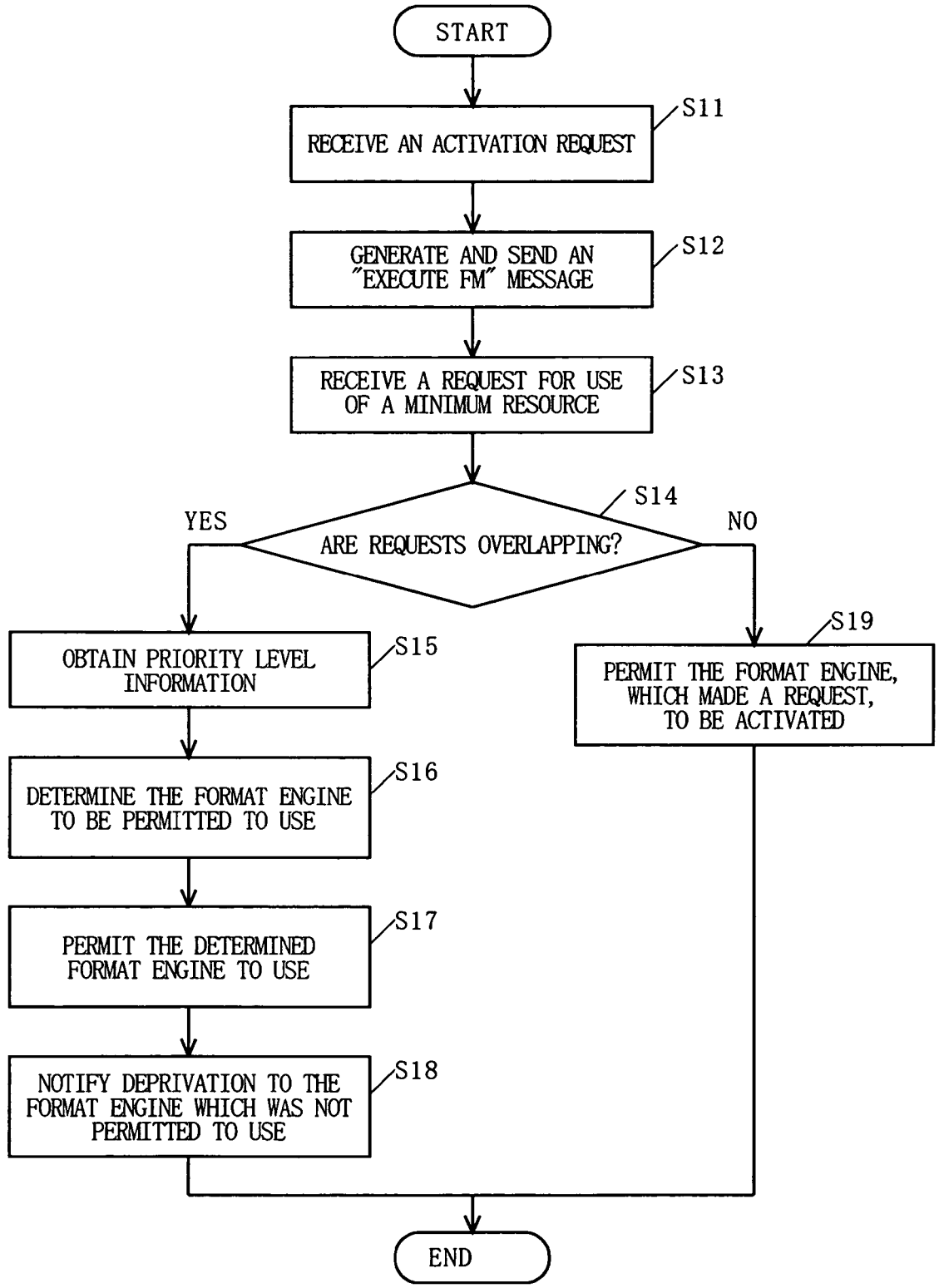
FIG. 83 is a flowchart showing a flow of processing performed in the digital TV for performing a second operation example.

Next, the detailed operation of the second operation example will be described. FIG. 83 is a flowchart showing a flow of processing performed in the digital TV for performing the second operation example. In FIG. 83, the navigator 720 receives an activation request for a format engine (step S11). The processing in step S11 is substantially the same as that in step S1 in the first operation example.

Next, the navigator 720 sends an "execute format engine" message for the format engine as the target of activation request to the combining section 730 (step S12). The processing of the converting section which has received the message via the combining section 730 is substantially the same as that in the first operation example.

Each format engine, after being activated in response to the "execute format engine" message, requests the library 712 for use of a resource when necessary. Whether use of a resource is requested or not is pre-defined for each format engine. Hereinafter, the description will be given on the assumption that the format engine has requested for use of a resource. When the format engine does not request for use of a minimum resource, the format engine continues operating as it is.

After step S12, the library 712 receives a request for use of a minimum resource from the activated format engine (step S13). At this stage, the format engine has not been permitted to use the minimum resource. Then, the library 712 determines whether or not there are overlapping requests for use of the minimum resource (step S14). Here, "there are overlapping requests for use of a minimum resource" means that there are a plurality of requests for use of a single minimum resource. Accordingly, even there is a request for use of each of two different minimum resources, it does not mean that there are overlapping requests for use of a minimum resource. Hereinafter, the determination processing in step S14 will be described in detail.

In step S14, the library 712 inquires the format engine specifying section 3905 to which the format engine the activation request has been made. In response to this inquiry, the format engine specifying section 3905 refers to the process memory section 3901 to specify the format engine to which the activation request has been made. Then, the format engine specifying section 3905 notifies the library 712 of the specified format engine. The format engine which has already used the minimum resource has already been specified. Accordingly, the library 712 can determine whether or not there are overlapping requests for use of the minimum resource, based on the format engine which has already used the minimum resource (without this format engine, it is determined that there are no overlapping requests) and the format engine notified by the format engine specifying section 3905.

When there are no overlapping requests in step S14, the library 712 permits the format engine, which has made the request +for use the minimum resource, to use the minimum resource (step S19), and terminates the processing shown in FIG. 83.

When there are overlapping requests in step S14, the library 712 obtains the priority level information (step S15). Specifically, the library 712 requests the priority level information providing section S3906 of the resource managing section 733 to provide the priority level information. Here, priority level information conceptually includes priority levels stored in the priority level memory section 3902 and priority levels stored in the latest activation memory section 3903. In other words, in response to the request from the library 712, the priority level information providing section S3906 sends the priority levels stored in the priority level memory section 3902 and the latest activation information stored in the latest activation memory section 3903.

The library 712 uses the information sent from the priority level information providing section 3906 to determine the format engine which is to be permitted to use the minimum resource (step S16). By step S16, the function of the permission determination section 61 shown in FIG. 6 is implemented. In the above, the processing in step S16 is performed by the library. Alternatively, the priority level information providing section 3906 may determine the format engine which is to be permitted to use the minimum resource and notify the library 712 of the determined format engine.

The processing in step S16 is performed, for example, as follows. Herein, the format engine to which the activation request has been made in step S11 is referred to as format engine A, and the format engine which has already used the minimum resource is referred to as format engine B.

The library 712 first determines whether or not the latest format engine activated is format engine A, based on the latest activation information. When the latest format engine activated by the user is format engine A, the library 712 determines to permit format engine A to use the minimum resource. When the latest format engine activated by the user is not format engine A, the library 712 determines whether or not the latest format engine activated is format engine B. When the latest format engine activated by the user is format engine B, the library 712 determines to permit format engine B to use the minimum resource. Namely, the library 712 determines to permit the latest format engine activated by the user to use the minimum resource.

When the latest format engine activated by the user is neither format engine A nor format engine B, the library 712 uses the information stored in the priority level information memory section 3902 to determine which format engine is to be permitted to use the minimum resource. In more detail, the library 712 determines to permit the format engine having a higher priority level in the priority level information memory section 3902 to use the minimum resource.

After step S16, the library 712 permits the format engine determined in step S16 to use the minimum resource (step S17). Then, the library 712 notifies the format engine which is not the format engine determined in step S16 that the resource has been deprived (step S18). Specifically, the library 712 requests the resource deprivation notifying section 3907 of the resource managing section 733 to send a resource deprivation notice to that format engine. In accordance with this, the resource deprivation notifying section 3907 sends the resource deprivation notice to that format engine. After step S18, the library 712 terminates the processing shown in FIG. 83.

By the above processing, the resource deprivation notice is sent to the converting section corresponding to the format engine which was not permitted to use the minimum resource. The converting section performs the following processing in accordance with the resource deprivation notice.

Figure 84:
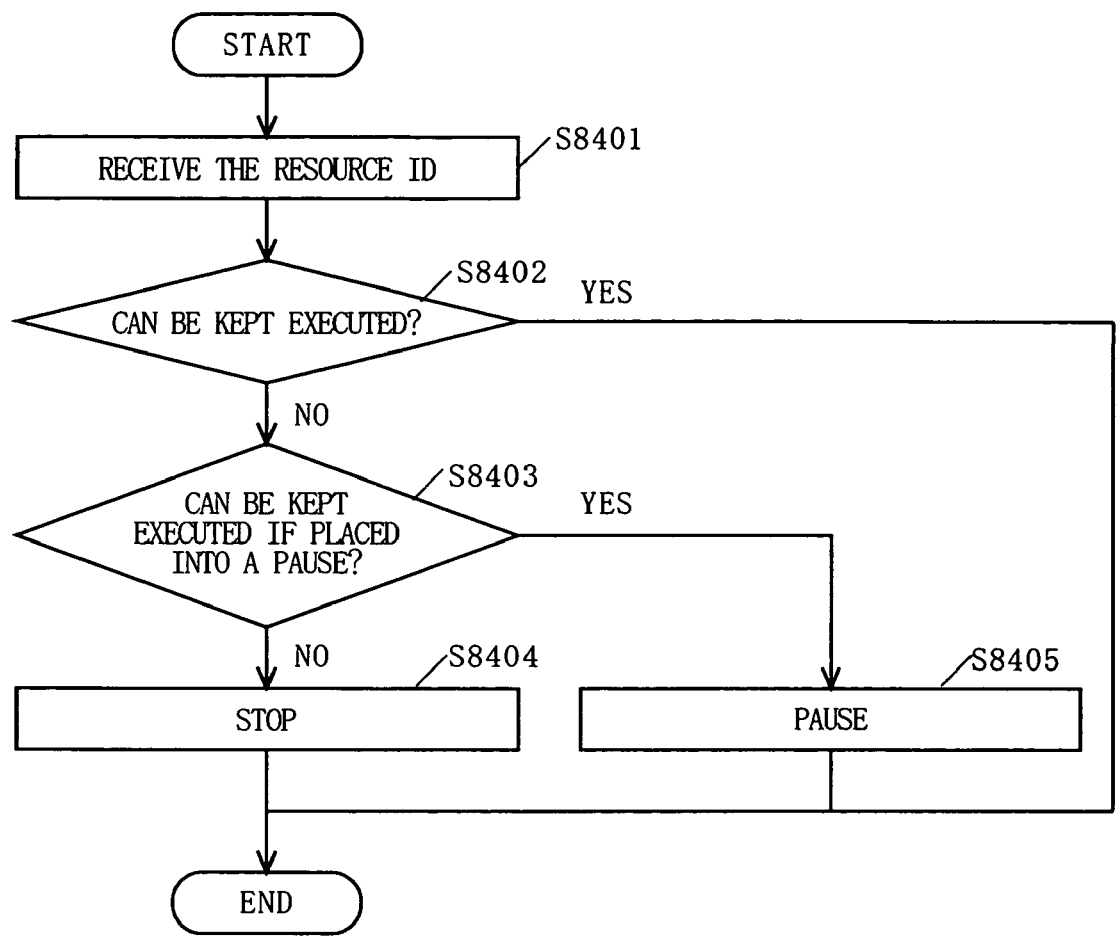
FIG. 84 is a flowchart showing a flow of processing of a converting section which has received a resource deprivation notice.

FIG. 84 is a flowchart showing a flow of processing of a converting section which receives the resource deprivation notice. The processing shown in FIG. 84 is performed by the converting section. Alternatively, the format engine may perform the same operation. First, the converting section receives the resource ID of the resource which has been deprived from the resource deprivation notifying section 3907 (step S8401). Next, the converting section determines whether or not the format engine can be kept executed (step S8402). Here, "the format engine can be kept executed" means that "the format engine can be kept executed even without the resource (deprived resource)". When the format engine can be kept executed in step S8402, the converting section terminates the processing shown in FIG. 84. The format engine deprived of the resource is kept executed.

When the format engine cannot be kept executed in step S8402, the converting section determines whether or not the format engine can be executed if the format engine is placed into a pause (step S8403). When the format engine cannot be kept executed in step S8403, the converting section stops the format engine (step S8404). When the format engine can be kept executed, the converting section pauses the format engine (step S8405).

In FIG. 84, the format engine is the target of stopping or pausing. In the case where states are defined for applications executed by, or data displayed by, the format engine (the Java applications or HTML data described above), the state of such applications or data may be changed in addition to changing the operating state of the format engine. The states described with reference to FIG. 84 are common states. The converting section converts a common state appropriately in accordance with the operating state of the format engine to transit the state of the format engine.

In FIG. 83, the library 712 uses the priority levels stored in the priority level memory section 3902 and the latest activation information stored in the latest activation memory section 3903 as priority level information to make the determination in step S16. Alternatively, the library 712 may first obtain only the latest activation information, and after it is found that the latest format engine activated by the user is neither format engine A nor format engine B, obtain the priority levels stored in the priority level memory section 3902. The library 712 may use only the priority levels stored in the priority level memory section 3902 to make the determination in step S16. The description on the detailed description of the second operation example is now completed.

OTHER OPERATION EXAMPLES

In the above structure example, various types of messages other than those shown in FIG. 74 through FIG. 84 are sent and received. Hereinafter, processing of the converting sections for sending and receiving messages other than those shown in FIG. 74 through FIG. 84 will be described.

Figure 85:
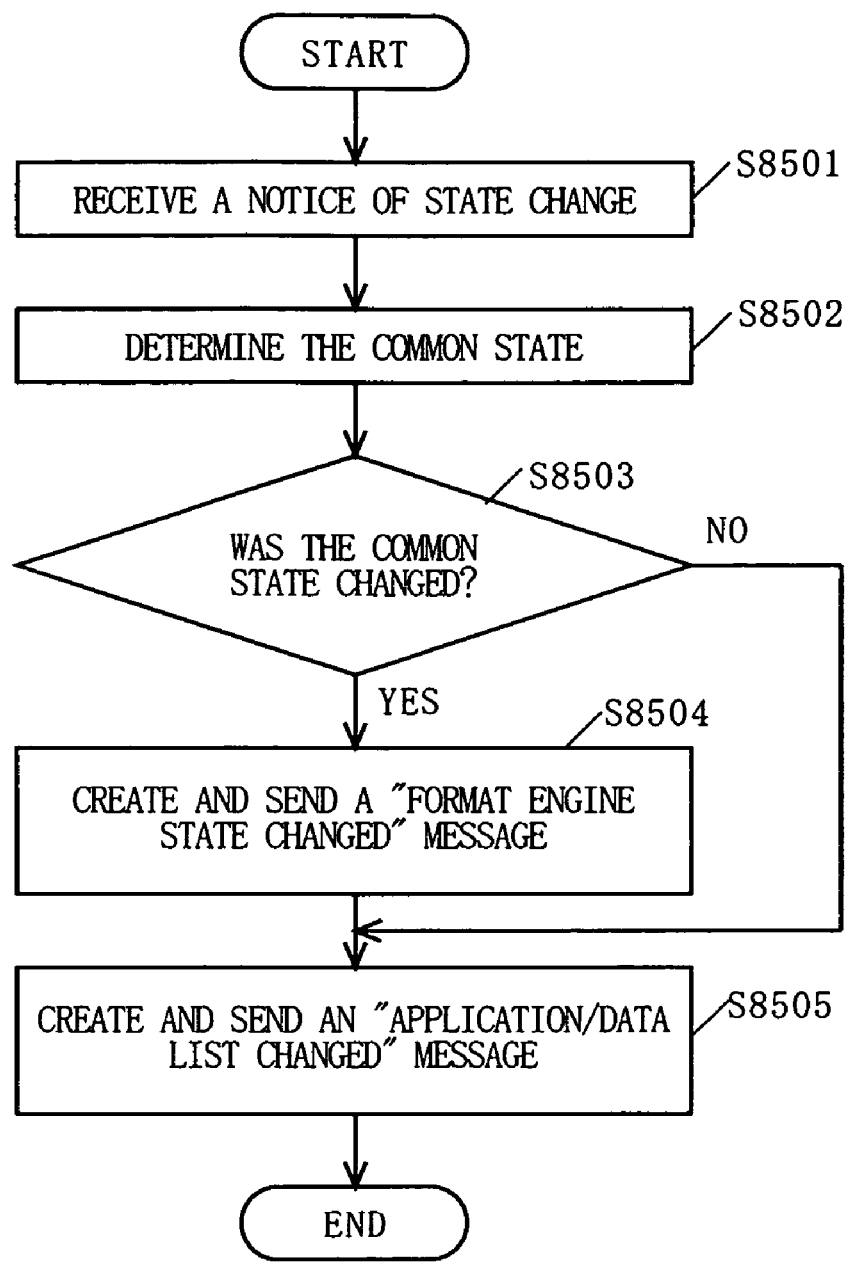
FIG. 85 is a flowchart showing a flow of processing when the first converting section 741 receives a notice of state change of a Java application from an application manager 4503.

FIG. 85 is a flowchart showing a flow of processing when the first converting section 741 receives a notice of state change of a Java application from the application manager 4503. When receiving the notice of state change of the Java application from the application manager 4503 (step S8501), the first converting section 741 determines the common state of the Java middleware 740 based on the operating state of the Java application (step S8502). The first converting section 741 also compares the pre-change common state of the Java middleware 740 stored in the primary memory section 109 with the common state of the Java middleware 740 determined in step S8502, and determines whether or not the common state was changed after the change (step S8503) When the common state is determined to have been changed, the first converting section 741 creates a "format engine changed" message and sends the message to the combining section (step S8504). Finally, the first converting section 741 creates an "application/data list changed" message regarding the Java application, the state of which has been changed, and sends the message to the combining section 730 (step S8505).

The flow of processing when the second converting section 751 receives a notice of state change from the HTML manager 5205 is in accordance with the processing shown in FIG. 85.

FIG. 86 is a flowchart showing a flow of processing when the first converting section 741 receives an "application/data list request" message. When receiving the "application/data list request" message, (step S8601), the first converting section 741 obtains a list of Java applications from the AIT (step S8602). Next, the first converting section 741 obtains the state of each Java application from the Java middleware 740 (step S8603). The first converting section 741 converts the obtained state of each Java application into a common state of the application/data (step S8604). Finally, the first converting section 741 creates an "application/data list response" message and sends the message to the combining section 730 (step S8605).

The flow of processing when the second converting section 751 receives an "application/data list request" message is in accordance with the processing shown in FIG. 86.

Figure 87:
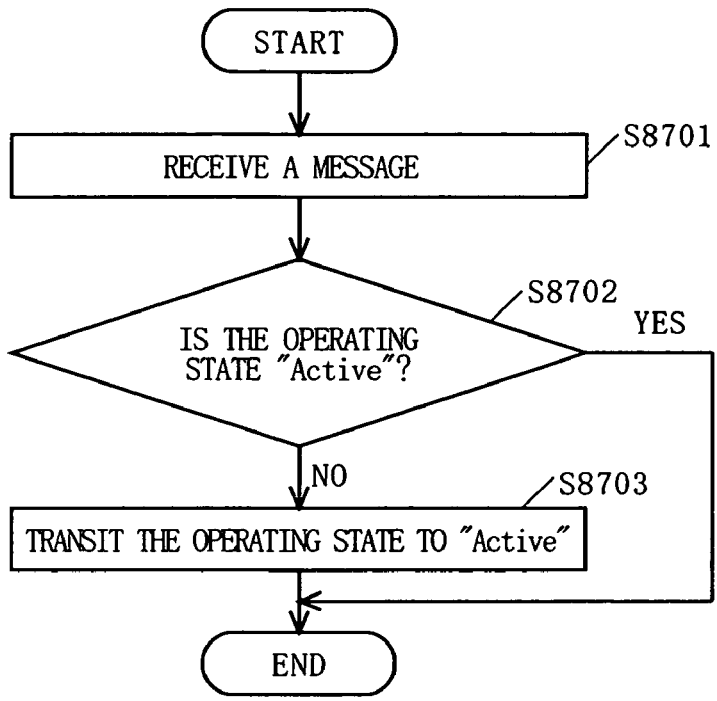
FIG. 87 is a flowchart showing a flow of processing when the first converting section 741 receives an "execute application/data" message.

FIG. 87 is a flowchart showing a flow of processing when the first converting section 741 receives an "execute application/data" message. When receiving the "execute application/data" message, (step S8701), the first converting section 741 determines whether or not the operating state of the Java application specified in the "execute application/data" message is "Active" (step S8702). When the state of the Java application is determined not to be "Active", the first converting section 741 transits the operating state of the specified Java application to "Active" (step S8703). When the operating state of the Java application is determined to be "Active", the first converting section 741 terminates the processing shown in FIG. 87.

The flow of processing when the second converting section 751 receives an "execute application/data" message is in accordance with the processing shown in FIG. 87.

Figure 88:
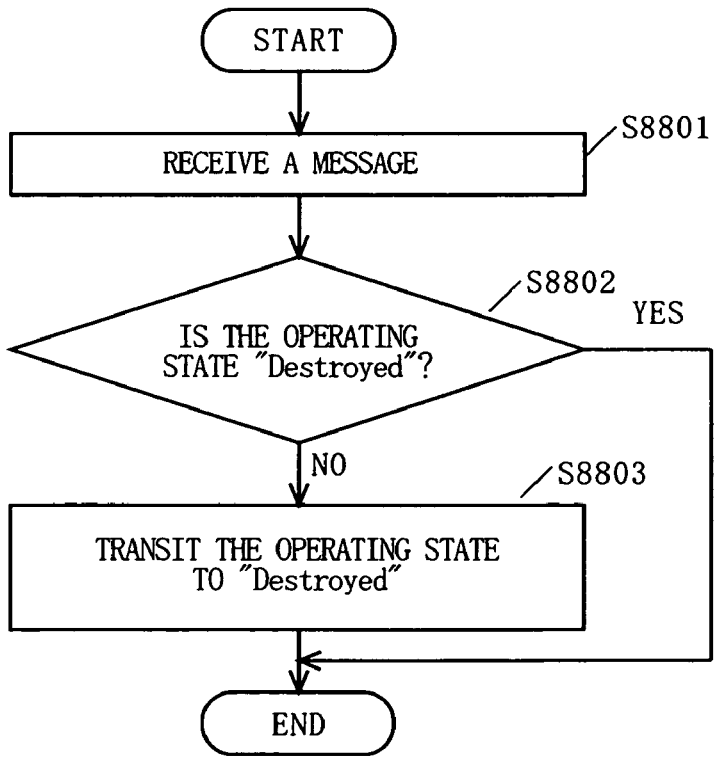
FIG. 88 is a flowchart showing a flow of processing when the first converting section 741 receives a "stop application/data" message.

FIG. 88 is a flowchart showing a flow of processing when the first converting section 741 receives a "stop application/data" message. When receiving the "stop application/data" message, (step S8801), the first converting section 741 determines whether or not the operating state of the Java application specified in the "stop application/data" message is "Destroyed" (step S8802). When the state of the Java application is determined not to be "Destroyed", the first converting section 741 transits the operating state of the specified Java application to "Destroyed" (step S8803). When the operating state of the Java application is determined to be "Destroyed", the first converting section 741 terminates the processing shown in FIG. 88.

The flow of processing when the second converting section 751 receives a "stop application/data" message is in accordance with the processing shown in FIG. 88.

Figure 89:
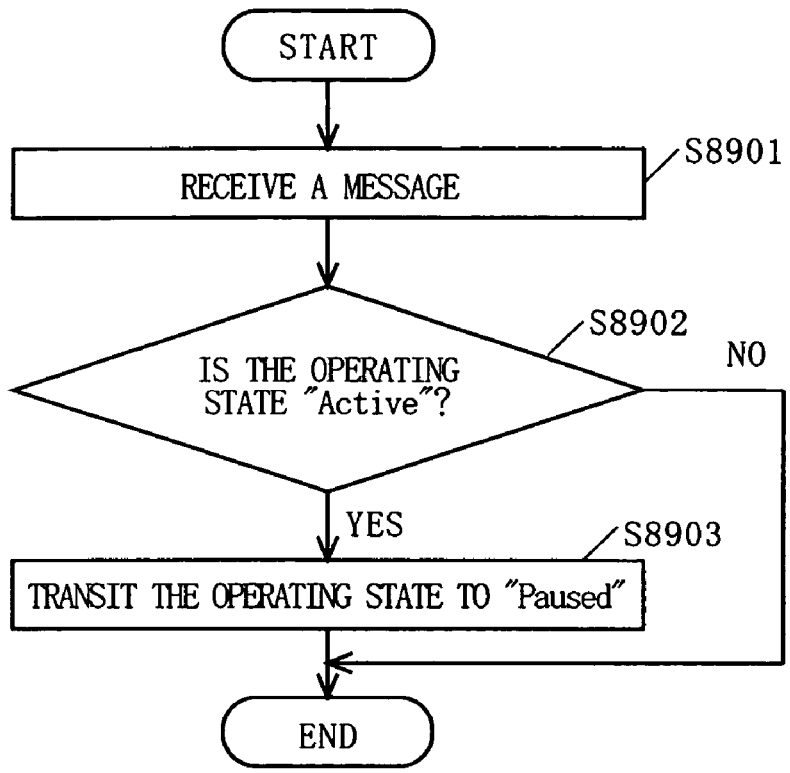
FIG. 89 is a flowchart showing a flow of processing when the first converting section 741 receives a "pause application/data" message.

FIG. 89 is a flowchart showing a flow of processing when the first converting section 741 receives a "pause application/data" message. When receiving the "pause application/data" message, (step S8901), the first converting section 741 determines whether or not the state of the Java application specified in the "pause application/data" message is "Active" (step S8902). When the state of the Java application is determined to be "Active", the first converting section 741 transits the state of the specified Java application to "Paused" (step S8903). When the operating state of the Java application is determined not to be "Active", the first converting section 741 terminates the processing shown in FIG. 89.

The flow of processing when the second converting section 751 receives a "pause application/data" message is in accordance with the processing shown in FIG. 89.

Figure 90:
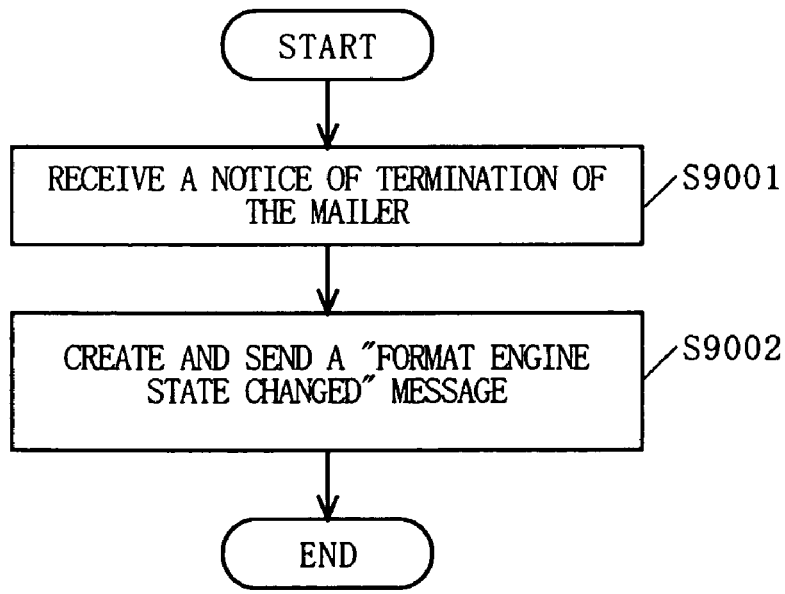
FIG. 90 is a flowchart showing a flow of processing when the third converting section 761 receives, from the mailer 760, a notice that the mailer 760 is terminated.

FIG. 90 is a flowchart showing a flow of processing when the third converting section 761 receives, from the mailer 760, a notice that the mailer 760 has been terminated. When receiving, from the mailer 760, the notice that the mailer 760 has been terminated (step S9001), the third converting section 761 creates a "format engine state changed" message and sends the message to the combining section (step S9002).

Figure 91:
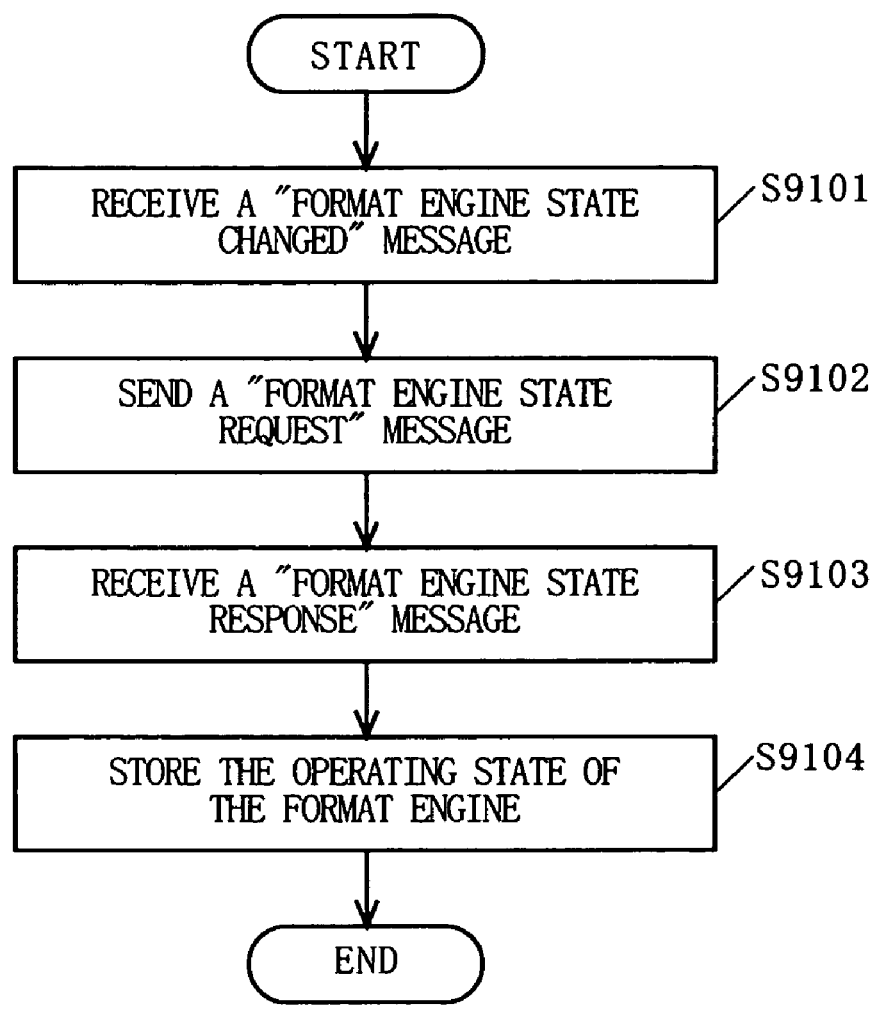
FIG. 91 is a flowchart showing a flow of processing of the state managing section 732 of the combining section 730 when the combining section 730 receives a "format engine state changed" message.

FIG. 91 is a flowchart showing a flow of processing of the state managing section 732 of the combining section 730 when the combining section 730 receives a "format engine state changed" message. First, the combining section 730 receives the "format engine state changed" message (step S9101). Next, the combining section 730 refers to the Source ID field of the received message to specify the format engine, the state of which has been changed, and sends a "format engine state request" message for the specified format engine (step S9102). As a result, the state managing section 732 of the combining section 730 receives a "format engine state response" message (step S9103), and stores the state of the format engine in the primary memory section 109 (step S9104).

Figure 92:
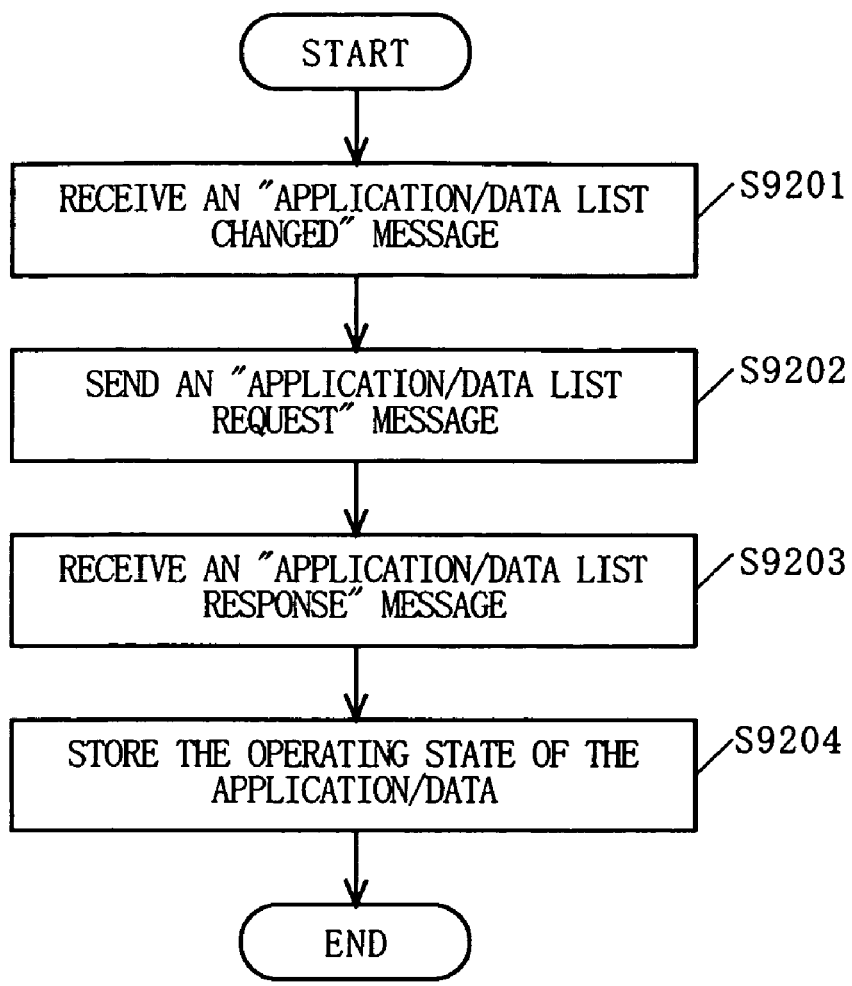
FIG. 92 is a flowchart showing a flow of processing of the state managing section 732 of the combining section 730 when the combining section 730 receives an "application/data list changed" message.
Figure 94:
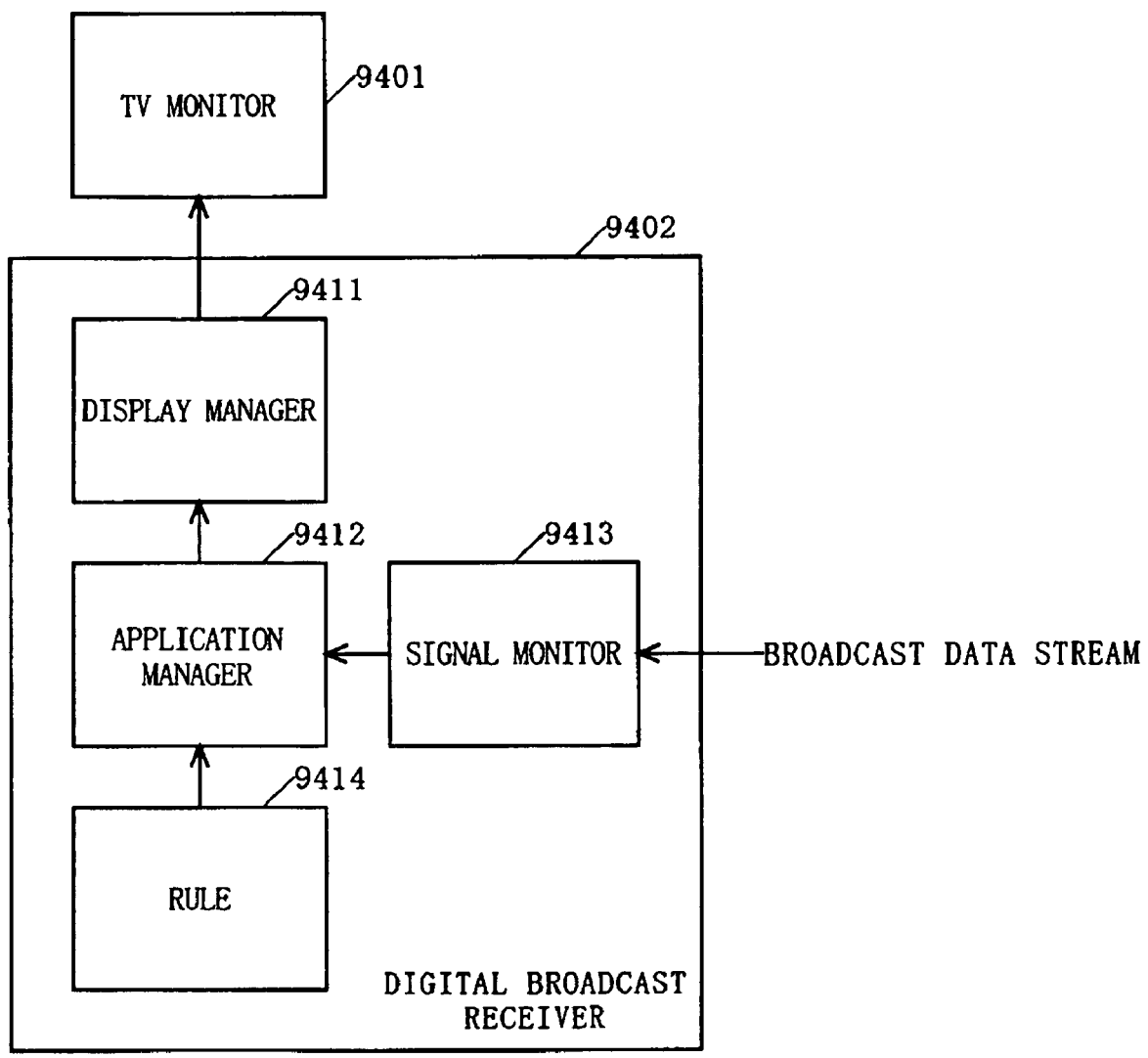
FIG. 94 shows an exemplary structure of a conventional digital broadcast receiver.
Figure 95:
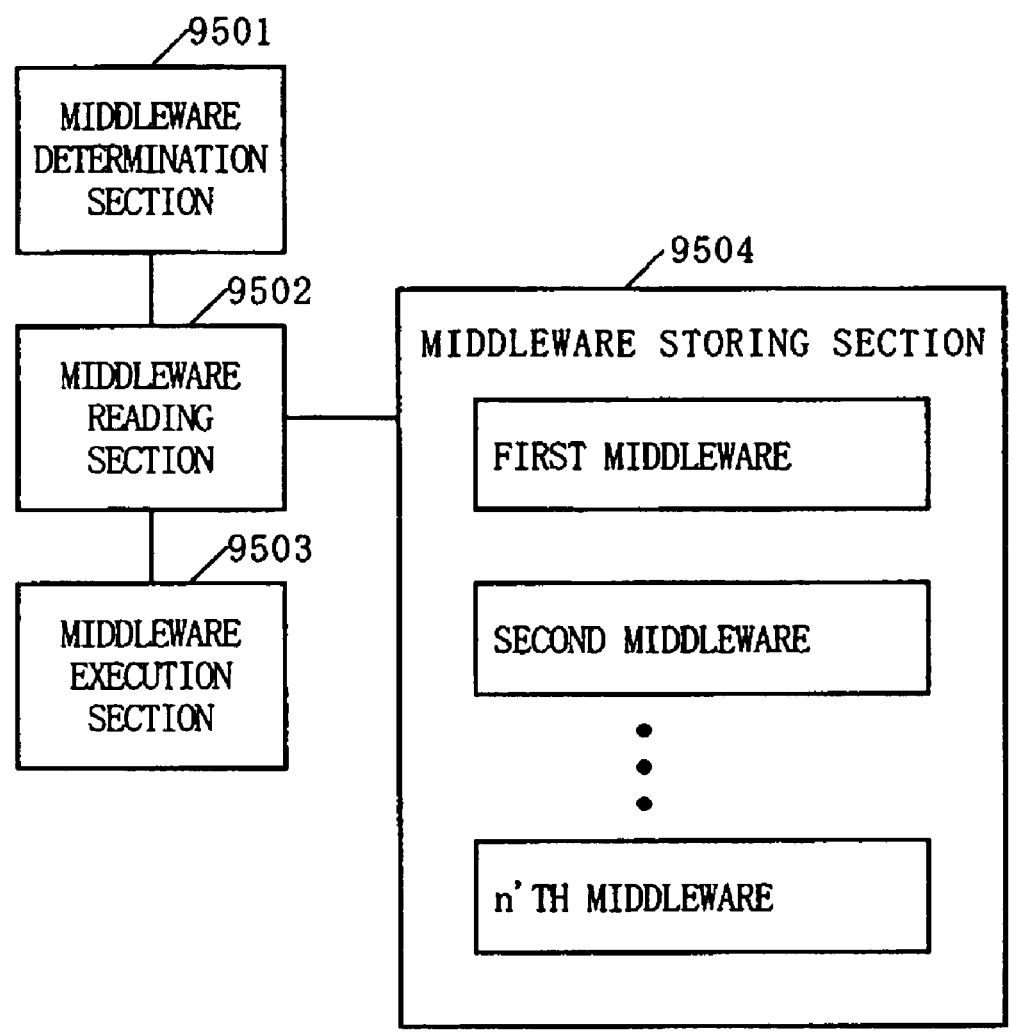
FIG. 95 shows a structure of a middleware switching device used in a conventional digital TV.

FIG. 92 is a flowchart showing a flow of processing of the state managing section 732 of the combining section 730 when the combining section 730 receives an "application/data list changed" message. First, the combining section 730 receives the "application/data list changed" message (step S9201). Next, the combining section 730 refers to the Source ID field of the received message to specify the format engine which is executing the application or displaying the data, the state of which has been changed, and sends an "application/data list request" message for the specified format engine (step S9202). As a result, the state managing section 732 of the combining section 730 receives an "application/data list response" message (step S9203), and stores the state of the application/data in the primary memory section 109 (step S9204).

In the above, the state managing section 732 may be deleted from the combining section 730 by providing the navigator 720 with the function of the state managing section 732. With such a structure, the navigator 720 manages the states of all the format engines.

In this structure example, each format engine does not restrict the sending source of the messages which are sent. Accordingly, the format engine can change the operating state of the other format engines, or the state of the application which is being executed by the format engine or the state of the data which is being displayed by the format engine. For example, it is clear that the Java middleware 740 can stop the HTML browser 750 by sending an "execute format engine" message to the HTML browser 750.

In this structure example, in the case where the contents which are stored in the ROM 110 are stored in the secondary memory section 108 instead, the ROM 110 can be omitted. The secondary memory section 108 may include a plurality of sub secondary memory sections, in which each sub secondary memory section stores different information. For example, one sub secondary memory section may store the state of the format engine stored in the state managing section 732, another sub secondary memory section may store the state of the Java middleware 740 stored in the first converting section 741, and still another sub secondary memory section may store the state of the HTML browser 750 stored in the second converting section 751. Thus, each memory section can be further divided.

As described above, according to this embodiment, for combining a plurality of format engines, a converting section for connecting the combining section 730 and each format engine is used. Thus, the implementation of each format engine does not need to be significantly changed. Accordingly, a plurality of format engines can be combined at a smaller number of steps.

By using a common state defined by the combining section 730, even when more format engines are to be combined, the navigator 720 only needs to increase the sending destination of the message. Thus, the added format engine can be easily dealt with.

By using a common state, the navigator 720 and the combining section 730 can easily grasp the states of the plurality of format engines. Accordingly, the plurality of format engines can be easily managed. Specifically, the plurality of format engines can be easily controlled simultaneously.

FIG. 93 shows combinations of states which do not influence the other format engines even when one format engine is executed. As shown in FIG. 93, a case in which all the format engines are at a stop or at a pause means that no format engine uses a minimum resource. Accordingly, in the case shown in FIG. 93, any format engine can be activated. For example, in the case shown in FIG. 93, the mailer 760 can be activated without stopping the Java middleware 740 and the HTML browser 750.

When no common state is defined in the combining section 730, the navigator 720 needs to grasp combinations of unique states which are defined for each individual format engine. In such a case, it is very difficult for the navigator 720 to determine whether simultaneous execution is possible or not in a given situation. Especially, in this structure example, regarding the Java middleware 740 and the HTML browser 750, the states of applications to be executed by, and data displayed by, these elements are defined, but no state thereof as format engines is defined. Therefore, in the above case, the navigator 720 needs to grasp combinations of all the states in which the Java applications executed by the Java middleware 740 and the data displayed by the HTML browser 750 can be placed. In the case where a format engine other than the Java middleware 740, the HTML browser 750, and the mailer 760 described in this structure example is added, it is also necessary to consider the combinations of the states defined for the added format engine. This makes it more difficult to manage the plurality of format engines.

INDUSTRIAL APPLICABILITY

In the above, a digital TV is described as an exemplary embodiment. The present invention is not limited to digital TVs, and is applicable to information processors which operate a plurality of format engines, such as personal computers, cellular phones, mobile information terminals and the like.

The invention claimed is:

1. An information processing apparatus storing a plurality of format engines each for executing data described in a different format, the information processing apparatus comprising:

format engine managing means for pre-defining common states which define operating states of each format engine in a representation common to all the format engines, and managing an operation of each format engine;

individual state obtaining means, provided in correspondence with each format engine, for obtaining an individual state of each format engine and sending common state information indicating the common state corresponding to the obtained individual state to the format engine managing means; and operation control means, provided in correspondence with each format engine, for pre-defining a correspondence between the common states and individual states which define the operating states of each format engine in a representation different for each format engine, and controlling operations of the format engines such that each format engine is in an arbitrary individual state;

wherein for changing a format engine to a predetermined common state, the format engine managing means sends a message including common state information indicating the predetermined common state to the operation control means provided in correspondence with the format engine, and when the message is sent from the format engine managing means, the operation control means controls the format engine such that the format engine is in the individual state corresponding to the common state indicated by the common state information included in the message; and wherein the format engine managing means manages an operation of each format engine based on the common state indicated by the common state information which is outputted from the individual state obtaining means;

further comprising a minimum resource which is used by a format engine during execution and cannot be used simultaneously by a plurality of format engines; wherein: when the individual state obtained from a format engine shows an operating state using the minimum resource, the individual state obtaining means outputs common state information indicating a predetermined state to the format engine managing means as the common state information of the format engine; and when the individual state obtained from a format engine show an operating state not using the minimum resource, the individual state obtaining means outputs common state information indicating a state other than the predetermined state to the format engine managing means as the common state information of the format engine; and the format engine managing means manages the operation of each format engine such that the common state information of only one format engine indicates the predetermined state.

2. An information processor according to claim 1, further comprising table storage means, provided in correspondence with each format engine, for storing a table including sets of an individual state of each format engine and a common state corresponding to the individual state;

wherein the operation control means determines the individual state from the common state by referring to the table.

3. An information processor according to claim 1, wherein: the format engine managing means comprises: activation receiving means for receiving an activation request for activating a format engine; common state obtaining means for obtaining common state information of each format engine from the individual state obtaining means in response to the activation receiving means receiving the activation request; operation stopping means for, when the common state information of a format engine obtained by the common state obtaining means indicates a during-execution state, sending a message for stopping the operation of the format engine to the operation control means provided in correspondence with the format engine; and activation means for, after the operation of the format engine is stopped by the operation stopping means, sending a message for activating a format engine corresponding to the activation request to the operation control means provided in correspondence with the format engine.

4. An information processor according to claim 1, further comprising, as the format engine, Java middleware for executing a Java program and a browser for displaying HTML contents.

5. An information processor according to claim 1, further comprising:

a minimum resource which is used by a format engine during execution and cannot be used simultaneously by a plurality of format engines;

resource control means for permitting a format engine to use the resource in response to a request from a format engine;

priority level information storing means for storing priority level information indicating a relative priority level of each format engine regarding use of the minimum resource; and permission determination means for, when there are overlapping requests to use the minimum resource from a plurality of format engines, determining a format engine which is to be permitted to use the minimum resource based on the priority level information;

wherein when there are overlapping requests to use the minimum resource from a plurality of format engines, the resource control means permits only the format engine determined by the permission determination means to use the minimum resource; and when there are no overlapping requests to use the minimum resource from a plurality of format engines, the resource control means permits the format engine, which made the request, to use the minimum resource.

6. An information processor according to claim 5, wherein:

a plurality of the minimum resources are provided; and a plurality of resource control means are provided in correspondence with the plurality of the minimum resources.

7. A program stored on a computer-readable storage medium and executable by a computer of an information processor storing format engines each for executing data described in a different format, wherein the program causes the computer to function as:

format engine managing means for pre-defining common states which define operating states of each format engine in a representation common to all the format engines, and managing an operation of each format engine;

individual state obtaining means, provided in correspondence with each format engine, for obtaining an individual state of each format engine and sending common state information indicating the common state corresponding to the obtained individual state to the format engine managing means; and operation control means, provided in correspondence with each format engine, for pre-defining a correspondence between the common states and individual states which define the operating states of each format engine in a representation different for each format engine, and controlling operations of the format engines such that each format engine is in an arbitrary individual state;

wherein for changing a format engine to a predetermined common state, the format engine managing means sends a message including common state information indicating the predetermined common state to the operation control means provided in correspondence with the format engine, and when the message is sent from the format engine managing means, the operation control means controls the format engine such that the format engine is in the individual state corresponding to the common state indicated by the common state information included in the message; and wherein the format engine managing means manages an operation of each format engine based on the common state indicated by the common state information which is outputted from the individual state obtaining means;

further comprising a minimum resource which is used by a format engine during execution and cannot be used simultaneously by a plurality of format engines; wherein: when the individual state obtained from a format engine shows an operating state using the minimum resource, the individual state obtaining means outputs common state information indicating a predetermined state to the format engine managing means as the common state information of the format engine; and when the individual state obtained from a format engine show an operating state not using the minimum resource, the individual state obtaining means outputs common state information indicating a state other than the predetermined state to the format engine managing means as the common state information of the format engine; and the format engine managing means manages the operation of each format engine such that the common state information of only one format engine indicates the predetermined state.

* * * * *